(12) United States Patent
Pattantyus-Abraham et al.

(10) Patent No.: US 6,681,915 B2
(45) Date of Patent: Jan. 27, 2004

(54) HIGH SPEED MANUFACTURING SYSTEM

(75) Inventors: Imre A. Pattantyus-Abraham, Rocky River, OH (US); Chad E. Law, Huron, OH (US); Patrick J. Weber, Strongsville, OH (US); Stanley W. Stedman, North Ridgeville, OH (US); Stephen T. Chang, Richmond Heights, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 10/253,052

(22) Filed: Sep. 24, 2002

(65) Prior Publication Data

US 2003/0066733 A1 Apr. 10, 2003

Related U.S. Application Data

(62) Division of application No. 09/815,319, filed on Mar. 22, 2001, which is a division of application No. 09/317,577, filed on May 24, 1999, now Pat. No. 6,325,198
(60) Provisional application No. 60/090,860, filed on Jun. 26, 1998.

(51) Int. Cl.$^7$ .......................... B65G 15/26; B65G 17/12
(52) U.S. Cl. .................. 198/339.1; 198/440; 198/575; 198/576; 198/577; 198/578; 198/579; 198/594; 198/794
(58) Field of Search .............................. 198/339.1, 440, 198/575, 576, 577, 578, 579, 594, 794

(56) References Cited

U.S. PATENT DOCUMENTS 2,932,376 A * 4/1960 Millington ............. 198/341.03
5,660,264 A * 8/1997 van der Schoot ........... 198/594
5,680,746 A * 10/1997 Hornisch ..................... 53/475

* cited by examiner

Primary Examiner—Christopher P. Ellis
Assistant Examiner—Mark A. Deuble
(74) Attorney, Agent, or Firm—Michael C. Pophal

(57) ABSTRACT

A high speed manufacturing system for processing articles of manufacture requiring processes to be performed on the articles at a pre-selected processing rate includes a trunk for simultaneously conveying a plurality of the articles of manufacture at the pre-selected processing rate in a first mode of motion from the beginning of the manufacturing system to the end of the system. At least one branch processing station is positioned intermediate the beginning and the end of the trunk wherein the branch processing station during its operation performs at least one process on articles of manufacture conveyed on the branch processing station and where the articles are conveyed in a second mode of motion. At least one transfer device is positioned intermediate the trunk and the branch processing station to continuously extract articles of manufacture from the trunk and transition the movement of the extracted articles of manufacture from the first mode of motion to the second mode of motion for transfer to the branch processing station. The transfer device also extracts each of the processed articles of manufacture from the branch processing station and transitions the movement of the articles from the second mode of motion to the first mode of motion for transfer to the trunk.

24 Claims, 51 Drawing Sheets

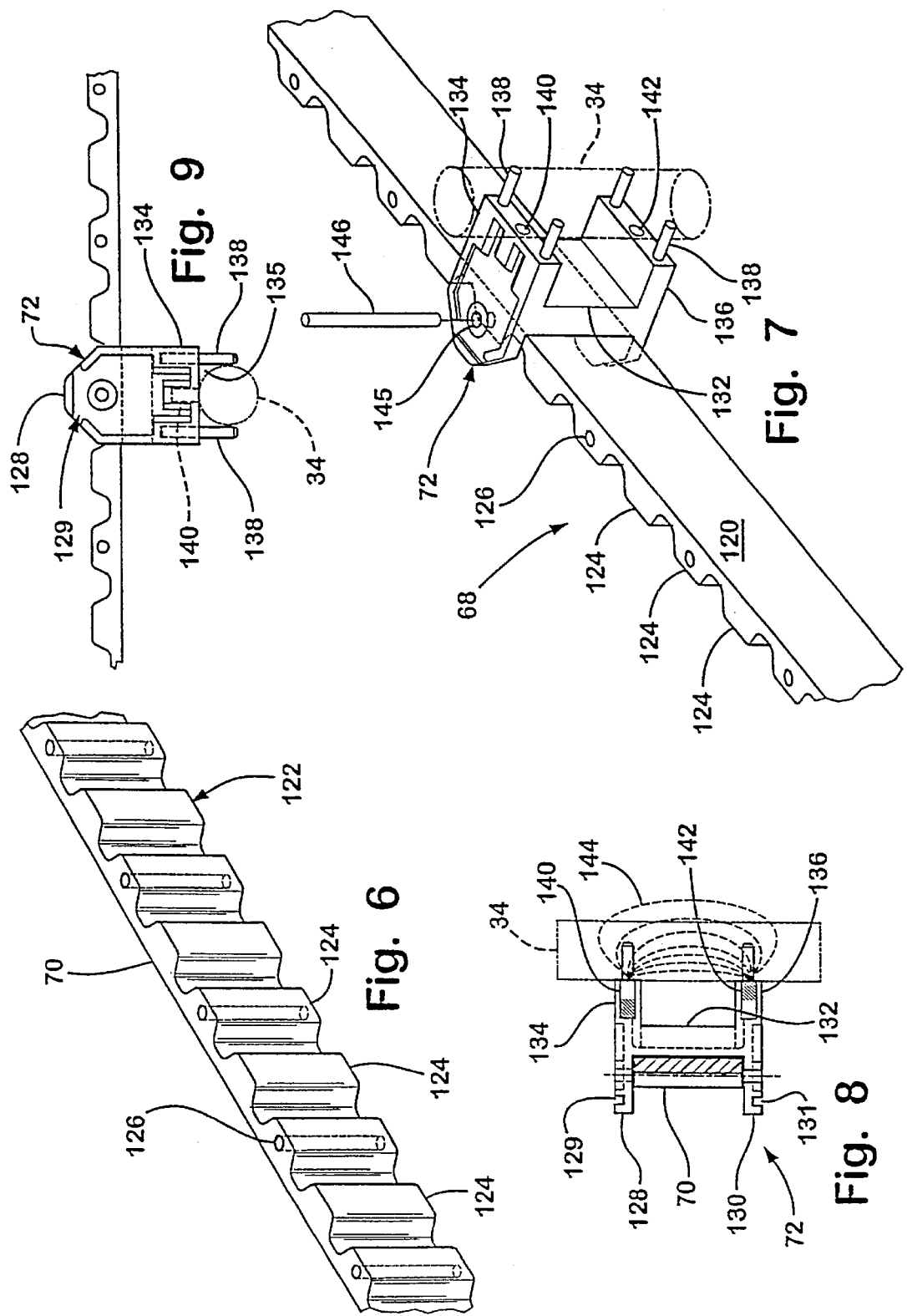

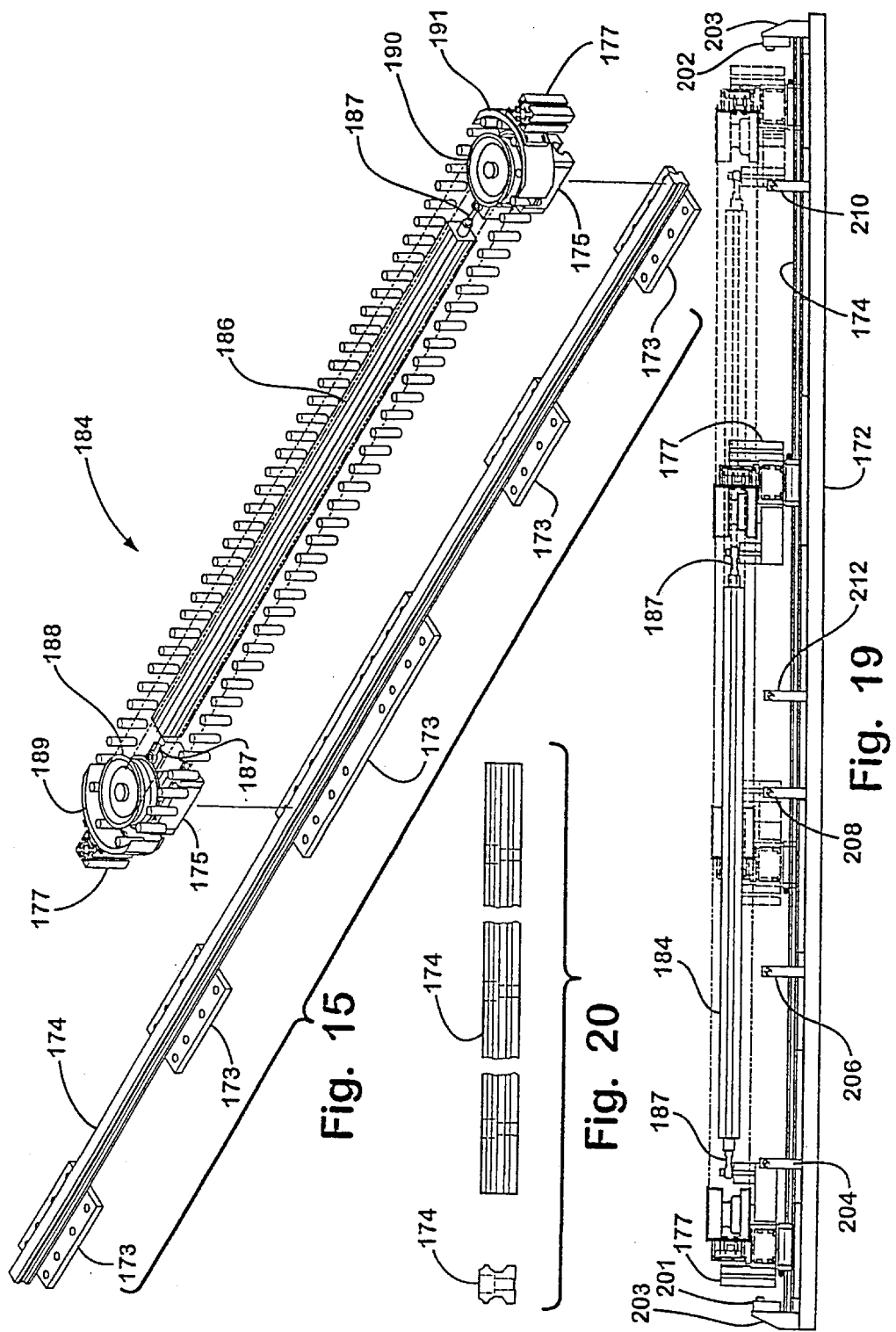

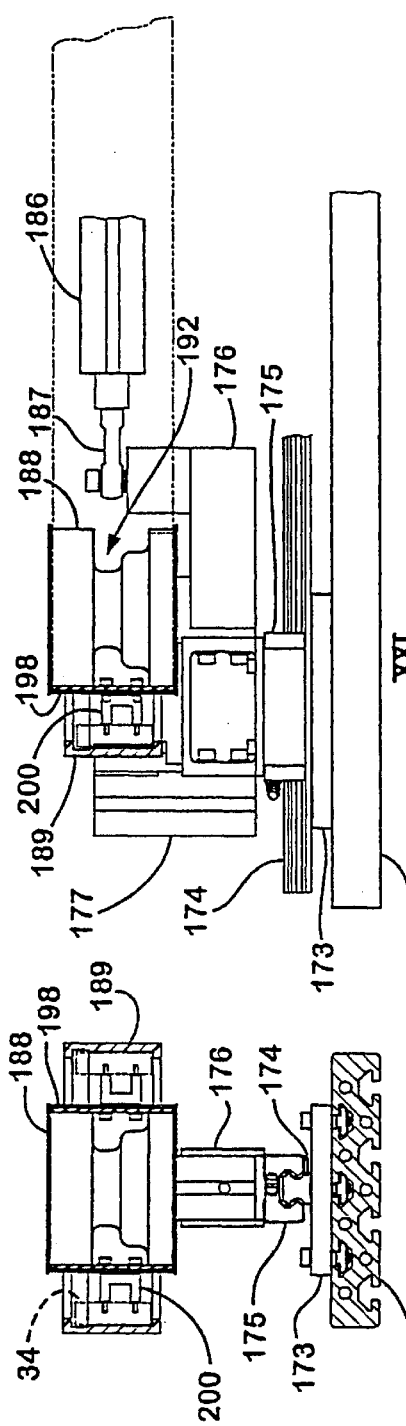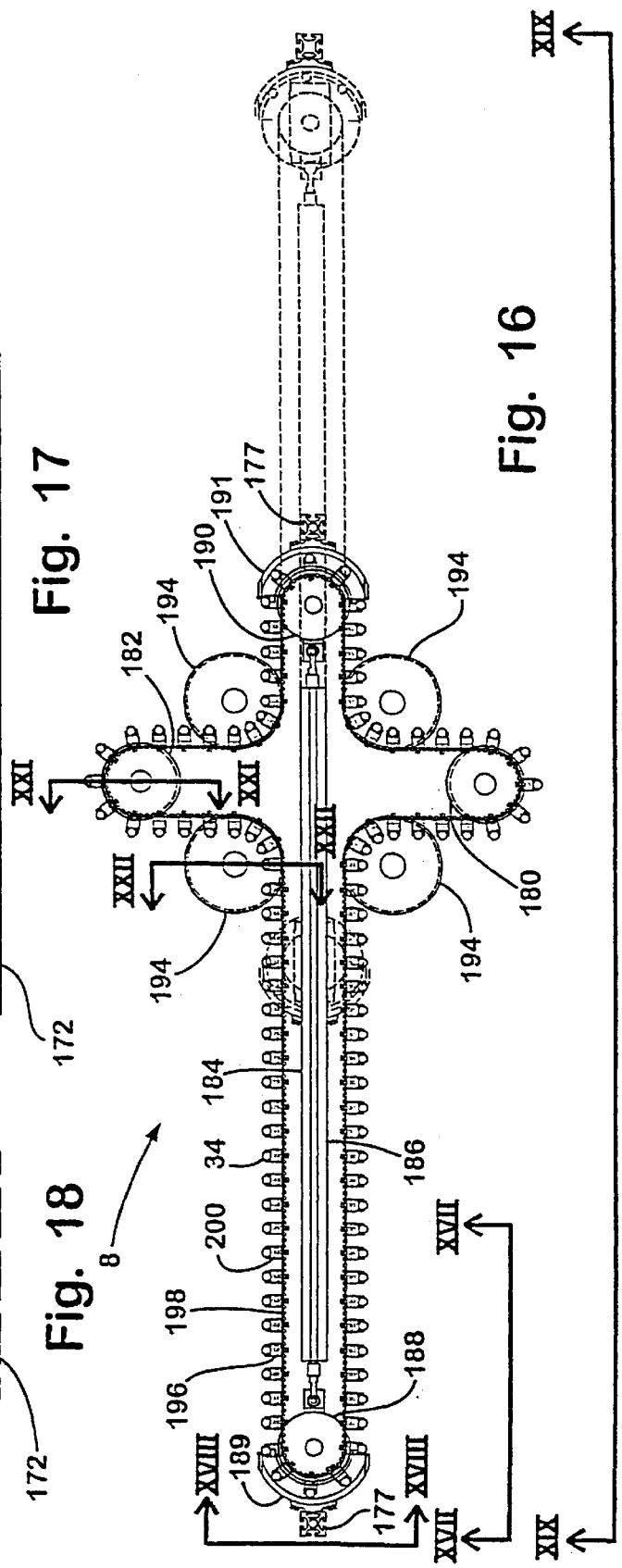

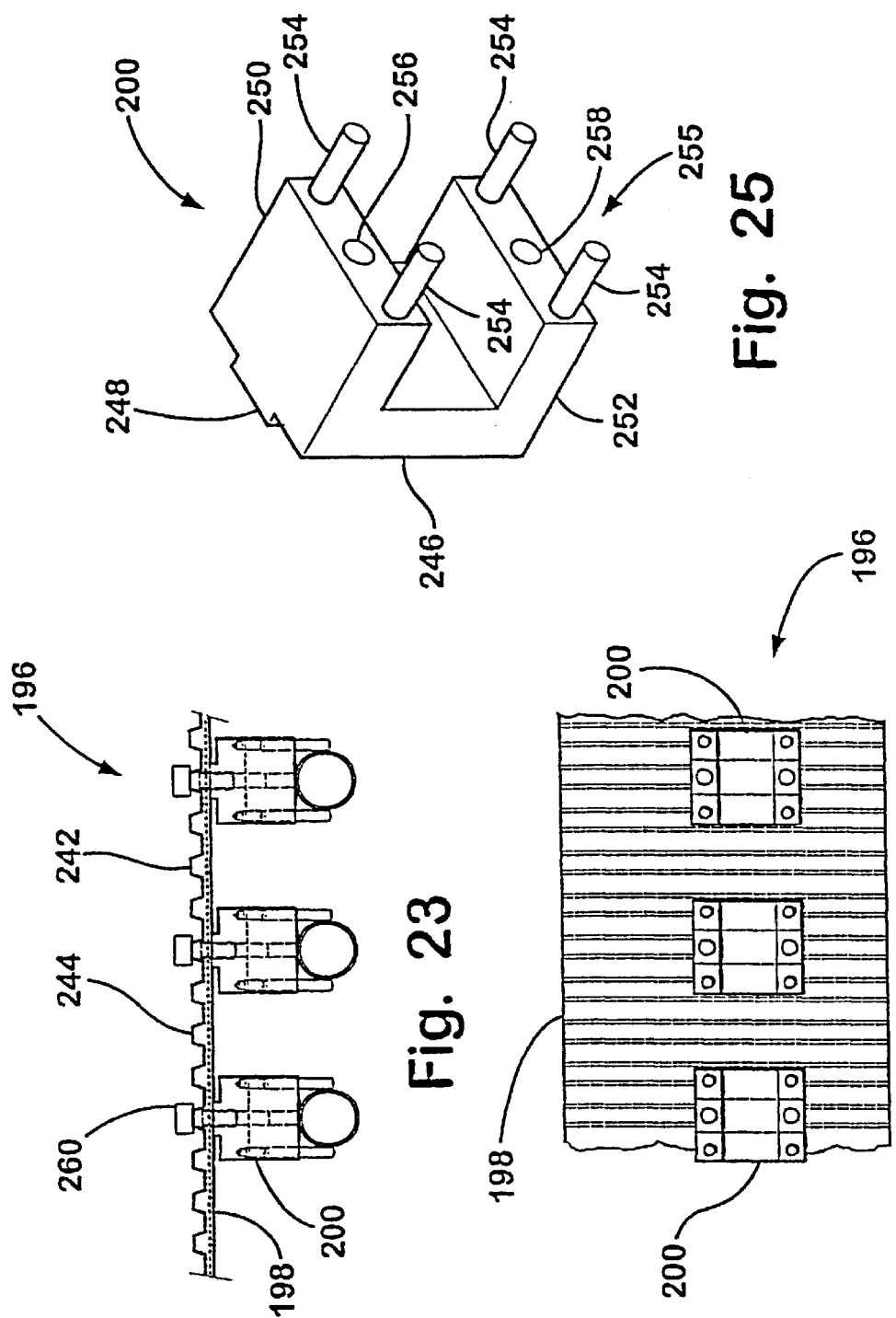

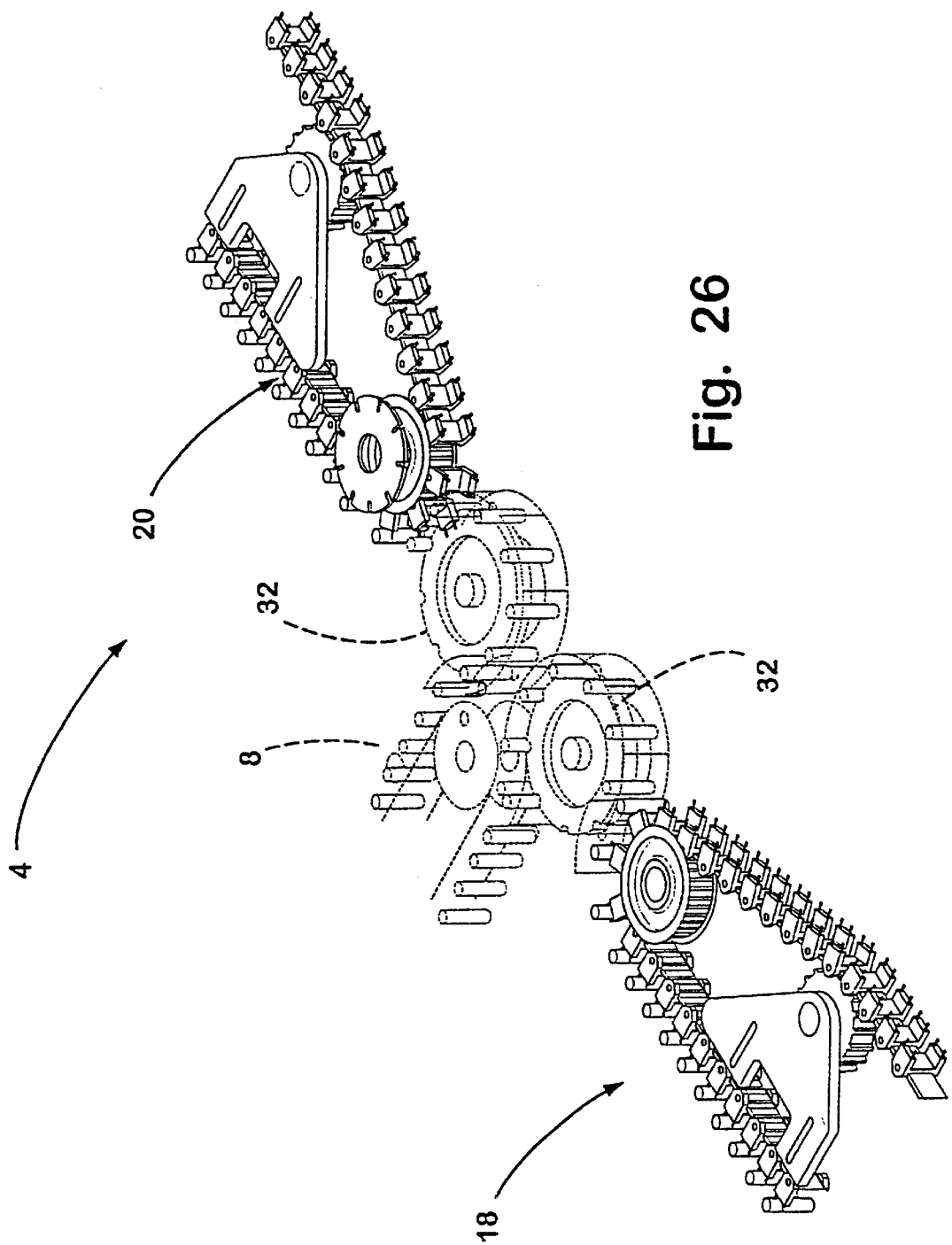

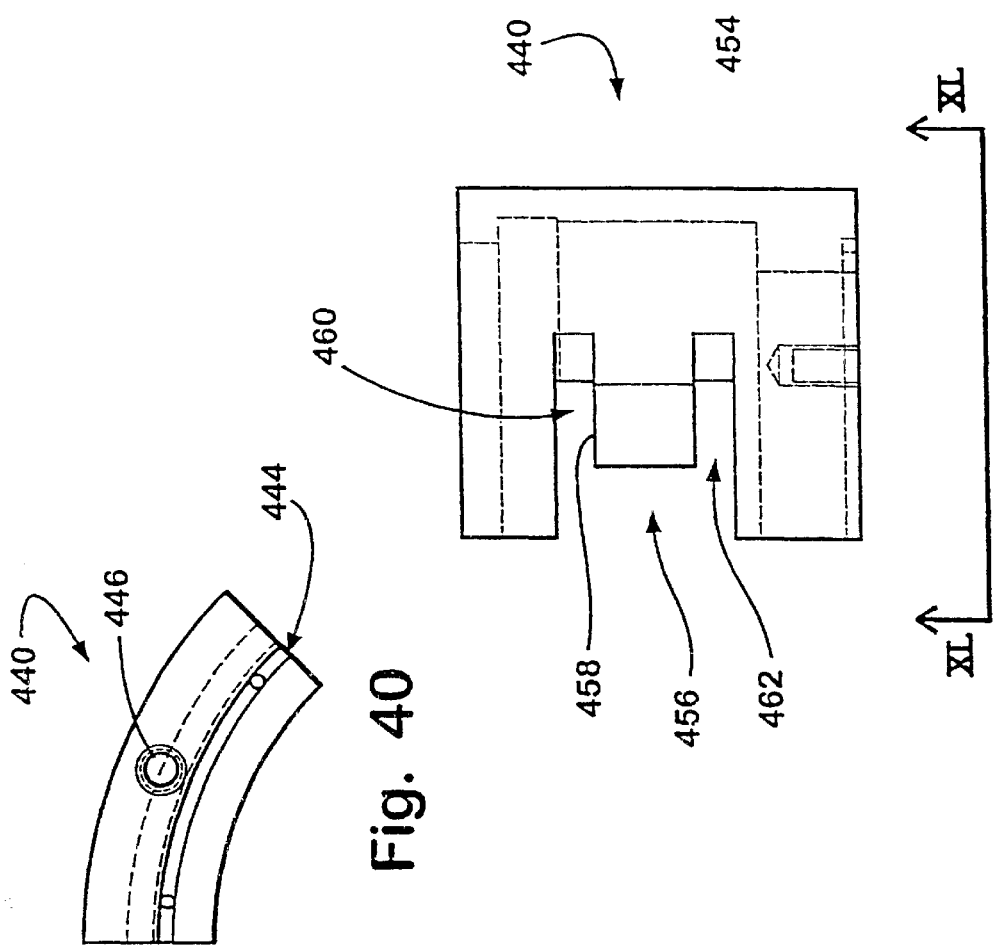
Fig. 39
Fig. 40
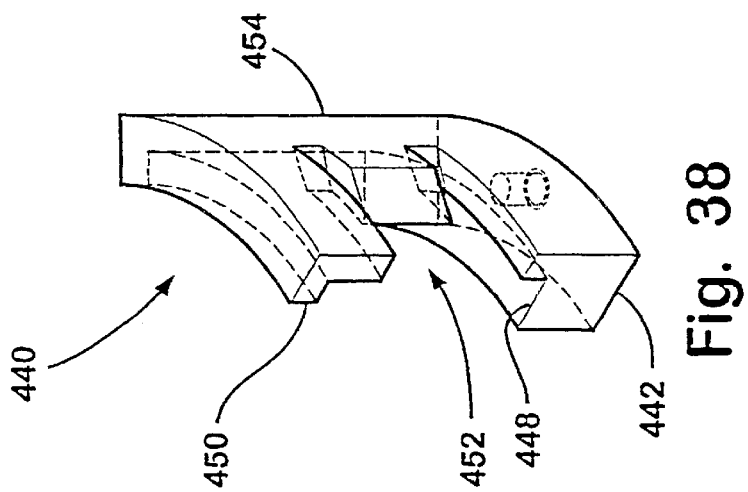
Fig. 38

HIGH SPEED MANUFACTURING SYSTEM

CROSS-REFERENCE TO RELATED APPLICATIONS

This application is a divisional of U.S. application Ser. No. 09/815,319, filed on Mar. 22, 2001, which is a divisional of Ser. No. 09/317,577, filed on May 24, 1999, now U.S. Pat. No. 6,325,198 which claims the benefit of U.S. Provisional Application Ser. No. 60/090,860, filed on Jun. 26, 1998, the entire disclosures of which are incorporated herein by reference.

BACKGROUND OF THE INVENTION

The present invention relates to a processing system for small items of manufacture and, in particular, to a modular processing system for the production of batteries.

Items of manufacture, and, in particular, small items of manufacture requiring multiple processes during their production and which are produced in large quantities, such as dry cell batteries, are completed by passing the articles through a series of individual apparatuses which are specifically designed to perform one or two processes. These processing machines are often stand-alone units which operate on a bulk input/bulk output basis. This type of system is labor intensive, and lacks the capability for adequate quality control, rapid maintenance, or tracking of the manufactured articles.

Current processing equipment which typically operates in an indexed manner has a single main drive motor which drives the indexer as well as driving the application heads performing the specific process. These various operations conducted by the machines are mechanically timed and are controlled by mechanical cams. Such mechanical timing is time-consuming to setup, is not flexible, and may lack precision. Any malfunction of these machines generally requires the entire machine to be pulled off-line for time-consuming repair, thus resulting in undesirable production efficiency.

The bulk-in/bulk-out manner in which these machines operate is such that the battery cans are extracted in random fashion from a bin thereby requiring proper orientation to begin the processing and are then output from the machine into another bin after processing. The processed cans are then transported in bulk to another processing station whereupon the bin extraction and article orientation functions are again repeated thus duplicating unnecessary handling and time consuming operations. Others of these machines operate on a theory of back pressure wherein the battery cans are stacked and urged to a processing station by applying a force to the backed up cans to force the articles through the processing machine. There must always be a supply of battery cans on the input side to maintain sufficient pressure to keep the 'pump primed' thereby facilitating processing throughput. Such methods of input and output preclude the tracking of individual battery cans during processing and between discrete machines. The manufacturer therefore loses information about individual cans between product assembly or processing steps. A consequence of the random input and output is a loss of quality control on individual articles with the result being that there is little to no process data available on the articles, and what data is available is not in alignment with quality control samples taken from the processing line.

At the conclusion of the quality control sampling, the machine is again stopped and again unloaded by hand. This time-consuming but necessary function often results in a significant loss of valuable production time in addition to the excessive labor costs associated therewith. Additionally, repeated starting and stopping of the machine induces variation in the production process which can adversely affect production quality.

The current mechanically controlled machines often include one or more cams to transfer desired time sequenced motion to the processing apparatuses mounted to the machine for a desired synchronized operation. In addition to the single drive motor driving the processing apparatus, the motor also operates and drives a large mass circular dial which transports the battery cans therearound to the individual process stations on the machine. Typically, these large mass dials require a significant percentage of the power consumed by the machine to accelerate and decelerate the dial during the indexing operations. Power thus expended contributes little 'value added' to the finished product. Also, the acceleration and deceleration of large mass dials requires a significant portion of the total time of operation which therefore severely limits the throughput of the processing machines.

The aforementioned current processing equipment employs separately controlled process stations in which battery cans were randomly dumped from one machine to another, thereby eliminating any ability to track a given battery can. Additionally, in order to conduct experimental process operations, conventional manufacturing systems commonly require that the normal system operation first be shutdown, the experimental equipment then be installed, and the experimental process thereafter conducted. Once the experimental operation is finished, the conventional system is reconfigured for normal article manufacturing. Thus, experimental processing required extensive shutdown time and labor to reconfigure the system and conduct the experimental process.

Therefore, there is a desire and need in industry and particularly in dry cell battery processing for a processing system which can operate at increased throughput and which eliminates unnecessary handling and duplicative operations to be performed on the manufactured articles. The needed processing system has the additional characteristics of being flexible, permitting off-line set-up and calibration, the ability to be quickly deployed, and capable of rapidly incorporating product design changes. Such a system is also desired to more efficiently monitor quality control on processes, including the capability of tracking a single item of manufacture through the processing system, and also the ability to test new processes and processing equipment for a comparative analysis of articles of manufacture processed normally with articles of manufacture processed with one or more test processes.

Also, it is desirable to provide for a processing system that allows for battery cans to be tracked and accounted for throughout the entire processing operation. Further, it is desirable to provide for such a processing system that allows for easy experimental processing that does not require excessive system shutdown and labor.

SUMMARY OF THE INVENTION

One aspect of the present invention is a high speed manufacturing system for processing articles of manufacture wherein processes are to be performed on the articles at a pre-selected processing rate. The system includes a trunk for simultaneously conveying a plurality of the articles of manufacture at the pre-selected processing rate in a first mode of motion from the beginning of the manufacturing system to the end of the system. At least one branch processing station is positioned intermediate the beginning and the end of the trunk. The branch processing station, during its operation, performs at least one process on the articles of manufacture conveyed on the branch processing station wherein the articles are conveyed in a second mode of motion. At least one transfer device is positioned intermediate the trunk and the branch processing station to continuously extract articles of manufacture from the trunk and transition the movement of the extracted articles of manufacture from the first mode of motion to the second mode of motion for transfer to the branch processing station. The transfer device also extracts each of the processed articles of manufacture from the branch processing station and transitions the movement of the articles from the second mode of motion to the first mode of motion for transfer to the trunk.

Another aspect of the present invention is a distributed control system for controlling the manufacturing system having a trunk and at least one branch processing station. The distributed control system includes a coordinating controller for monitoring processing of each article of manufacture on the manufacturing system and for coordinating the processing of each article of manufacture. A process station controller is networked with the coordinating controller and is associated with each branch processing station for initiating the processes performed thereon for each article of manufacture. A process module controller is associated with each individual process module on each processing station and is networked with the process station controller. The process module coordinator controls the processing operation of the associated process module wherein the control coordinator coordinates the processing operation of each article of manufacture, the processing controller initiates control operations, and the process module coordinator performs individual control operations associated with each process module.

Yet another aspect of the present invention is a method for processing articles of manufacture comprising the steps of conveying a plurality of articles of manufacture in a substantially continuous motion from a beginning of a manufacturing system to an end of the manufacturing system; transferring the plurality of articles of manufacture sequentially onto a branch processing station; conveying the plurality of articles of manufacture on the branch processing station in an indexed intermittent motion to provide a dwell operation and an indexed operation; and performing at least one process on the articles of manufacture during the dwell operation.

Yet another aspect of the present invention is a transfer device for extracting articles of manufacture from a trunk operating in a first mode of motion and transferring the articles of manufacture for processing to a branch processing station operating at a second mode of motion and for returning processed articles of manufacture to the trunk. The transfer device includes a first portion having a first drive source operating at the first mode of motion, and a second portion having a second drive source operating at the second mode of motion. A conveyor assembly extends around the first portion and the second portion and is supported in an operative configuration for transporting articles of manufacture between the first portion and the second portion. An accumulating member separates the first portion from the second portion and is responsive to the first mode of motion of the conveyor assembly on the first portion and is responsive to the second mode of motion on the second portion.

Yet another aspect of the present invention is a branch processing station for a high speed manufacturing system for performing manufacturing processes on articles of manufacture. The branch processing station includes a continuous feed indexer having a transport mechanism for conveying the articles of manufacture along the branch processing station in an indexed intermittent motion wherein at least a portion of the transport mechanism is arcuate and conveys the articles of manufacture in an arcuate fashion. Each of the articles of manufacture is received by the transport mechanism at a single tangential point along the arcuate portion while the transport mechanism is in motion. At least one process module is mounted to the indexer for performing the at least one process on the articles of manufacture.

Another aspect of the present invention is a process module for mounting to a high speed manufacturing system to perform a manufacturing process on articles of manufacture wherein the articles are under control of the manufacturing system. The process module includes a chassis having a base and a processing mechanism mounted to an exterior of the chassis for performing a process on the articles of manufacture. The chassis further includes an acquiring mechanism to place the article of manufacture under control of the process module and to place the processing mechanism in an operative position with respect to the article of manufacture for performing the process thereon. A control element is also associated with the chassis wherein the control element directs the acquiring mechanism to gain control of the article of manufacture and directs the processing mechanism in a tasking sequence of placing the processing mechanism in the operative position with respect to the article of manufacture. The control element directs performance of the process by the processing mechanism and disengages the processing mechanism from the article of manufacture to return control of the article to the manufacturing system.

Another aspect of the present invention is a processing conveyor system for processing articles of manufacture. The conveyor system includes a transport conveyor for transporting the articles of manufacturing from a beginning of the system to an end of the system. At least one article segregator junction is intermediate the beginning and the end and an article segregator is positioned at the article segregation junction for segregating the articles of manufacture from the transport conveyor. At least one article integrator junction is positioned downstream from the article segregator junction and an article integrator is positioned at the article integrator junction for integrating the articles of manufacture onto the transport conveyor. An article processing conveyor is positioned between the article segregation junction and the article integration junction.

These and other advantages of the invention will be further understood and appreciated by those skilled in the art by reference to the following written specification, claims, and appended drawings.

BRIEF DESCRIPTION OF THE DRAWINGS

In the drawings:

FIG. 6 is a perspective view of a toothed segment of the endless transport belt from the continuous feed indexer;

FIG. 7 is a perspective view of a toothed segment of the endless transport belt with a battery can transport cleat engaged therewith;

FIG. 8 is a side elevational view of the cleat fastened to the belt and showing magnets embedded therein for retaining the battery can to the cleat;

FIG. 9 is a plan view of a cleat fastened to the endless belt and showing a battery can retained by the cleat;

FIG. 15 is an exploded view of the reciprocating element of the transfer device;

FIG. 16 is a plan view of the transfer device;

FIG. 17 is an enlarged elevational view of one end of the reciprocating element mounted on its guide rail taken along the line XVII—XVII of FIG. 16;

FIG. 18 is an elevational end view taken along the line XVIII—XVIII of FIG. 16;

FIG. 19 is a side elevational view of the transfer device taken along the line XIX—XIX of FIG. 16 showing the optical sensors for generating control signals to the control coordinator;

FIG. 20 is a side elevation and end elevation of the rail upon which the reciprocating element translates;

FIG. 23 is a plan view of battery can carrying cleats affixed to the smooth surface of an endless toothed transport belt;

FIG. 24 is an elevational view of the battery can carrying cleats affixed to the transport belt;

FIG. 25 is a perspective view of a battery can carrying cleat for the transfer device;

FIG. 26 is a perspective view of ends of two adjacent continuous motion conveyors forming a portion of the trunk;

FIG. 38 is a perspective view of one 45 degree dead plate segment;

FIG. 39 is an elevational view of the dead plate segment shown in FIG. 38;

FIG. 40 is a bottom plan view of the dead plate segments illustrating the dowel receiving groove;

DETAILED DESCRIPTION OF THE PREFERRED EMBODIMENT

Figure 2:
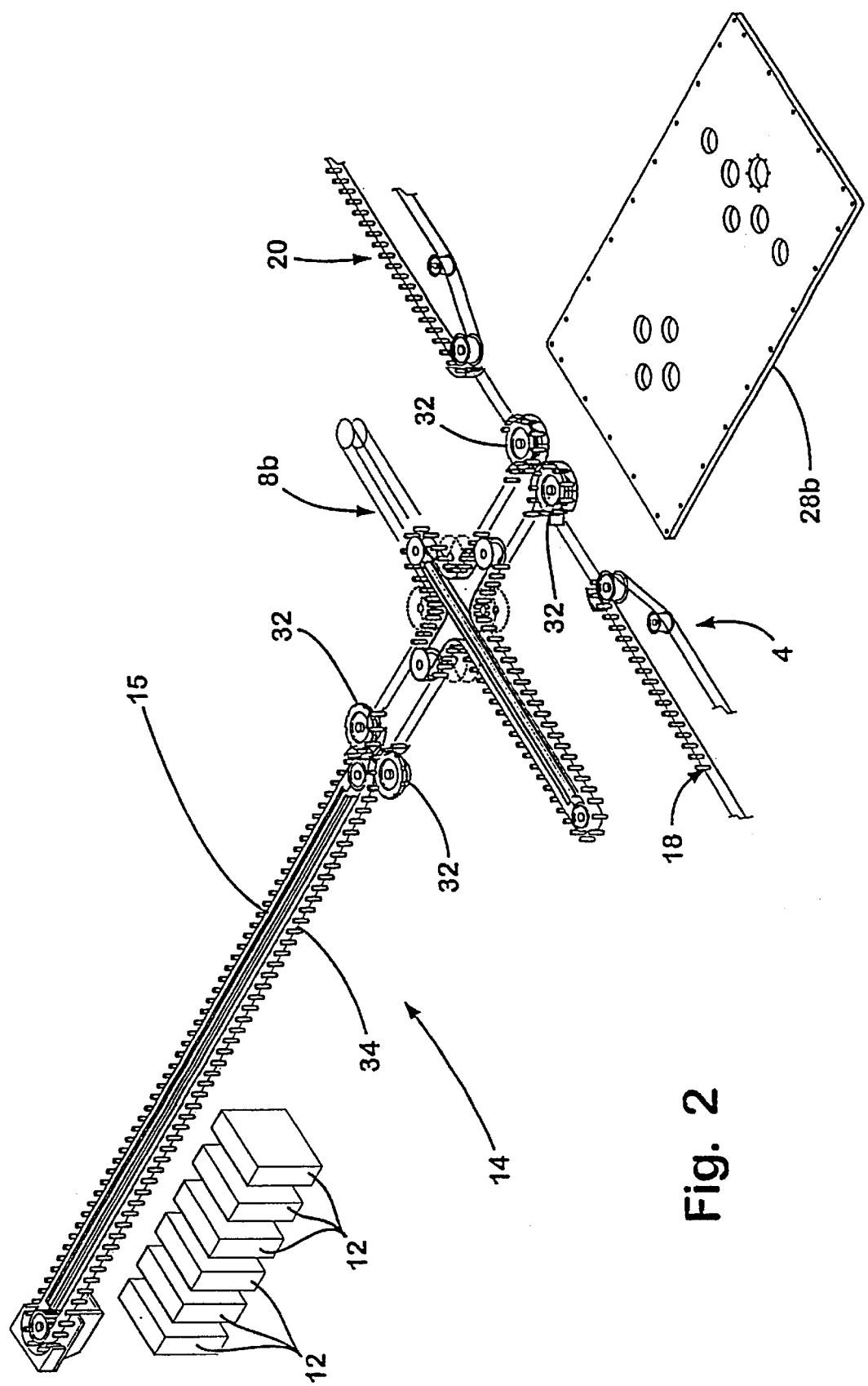
FIG. 2 is an exploded perspective view of a branch processing station and transfer unit interposed between two trunk segments.

For purposes of description herein, the terms "upper," "lower," "right," "left," "rear," "front," "vertical," "horizontal," and derivatives thereof shall relate to the invention as oriented in FIG. 2, with reference to a viewer in front of the trunk, directly facing toward the processing stations. However, it is to be understood that the invention may assume various alternative orientations and step sequences, except where expressly specified to the contrary. It is also to be understood that the specific parts, devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 2 (FIG. 1) generally designates a modular high speed processing system embodying the present invention. Modular high speed processing system 2 is particularly adapted for creating a processing line for the manufacture and processing of articles of manufacture at a pre-selected manufacturing rate and where a manufacturer desires to track and monitor individual articles throughout the processing sequence. As discussed below, modular high speed processing system 2 is comprised of unique discrete functional elements which can be arranged in multiple configurations to create a processing system tailored to a manufacturer's needs. While the embodiment of the modular high speed processing system described herein is directed at the manufacture and processing of battery cells for consumer electronic appliances, it will be understood that the modules and functional elements described are adaptable for the processing of a wide range of other articles of manufacture.

Figure 1:
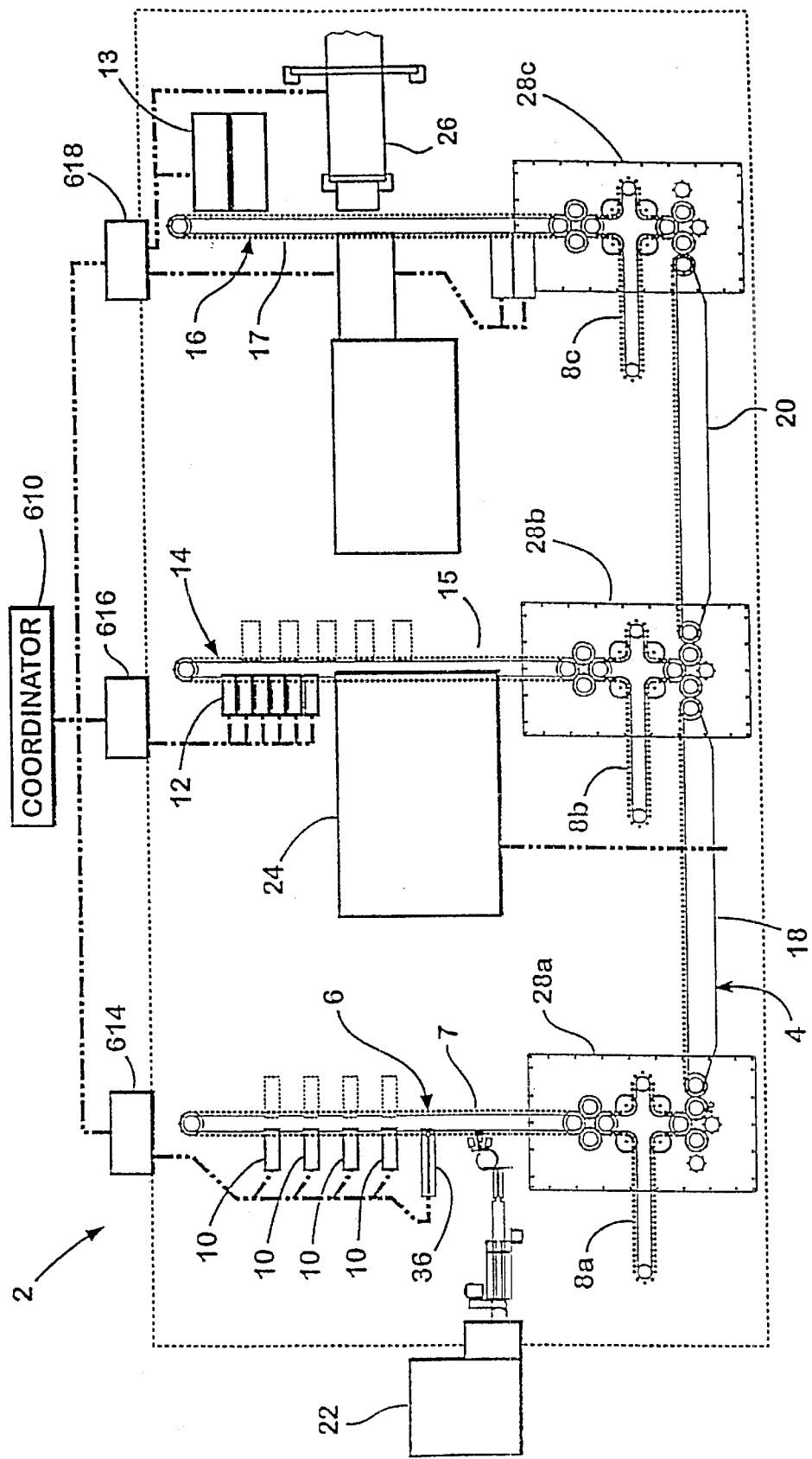
FIG. 1 is a plan view of a modular high speed processing system embodying the present invention shown configured for processing battery cans into completed batteries.

As illustrated in FIGS. 1 and 2, modular high speed processing system 2 includes individual branch processing stations 6, 14, and 16 interconnected by trunk 4 wherein processing stations 6, 14, and 16 perform the desired processing of the articles to be manufactured thereon and trunk 4 transports the articles between processing stations. The sequencing and monitoring of processing system 2 is accomplished with a control system having a control coordinator 610 which communicates with individual process station controllers 614, 616, and 618. Individual process station controllers 614, 616, and 618 provide the control interface for processing stations 6, 14, and 16 respectively, the functioning of which is described more fully below.

The processing system 2 as illustrated in FIGS. 1 and 2 comprises at least one branch processing station such as station 14 having a plurality of processing modules 12 located therealong for processing of individual articles of manufacture such as battery cans 34. As shown in FIG. 2, branch processing station 14 comprises a plurality of individual modular elements to facilitate the transport and processing of the battery cans 34 and is typical of other branch processing stations. A transfer device such as device 8b is located at one end of a continuous motion conveyor 18, or between two ends of continuous motion conveyors 18 and 20. Transfer device 8b extracts battery cans 34 from continuous motion conveyor 18 for delivery to branch processing station 14. After processing, the battery cans are extracted from branch processing station 14 by transfer device 8b and delivered to continuous motion conveyor 20 for transport to the next branch processing station such as station 16.

The continuous motion conveyors 18 and 20 form trunk 4 for conveying the battery cans in a constant speed motion between individual processing stations 6, 14, and 16. A platform 28b or a suitable supporting frame is utilized to support and maintain the ends of continuous motion conveyors 18 and 16, transfer device 8b, and branch processing station 14 in a fixed operating relationship. Couplers 32 are utilized to hand off battery cans 34 between adjacent elements such as between continuous motion conveyor 18 and transfer device 8b and between transfer device 8b and branch processing station 14. Branch processing station 14 comprises a continuous feed indexer 15 which transports battery cans 34 in an indexed manner and process modules 12. The indexed motion of continuous feed indexer 15 transports battery cans 34 in an alternating index-dwell sequence wherein process modules 12 perform their scheduled process on battery cans 34 during the dwell portion of the transport of battery cans 34 about indexer 15. While the preferred embodiment incorporates a trunk 4 operating at a continuous constant speed motion and the branch processing stations 6, 14, and 16 operating at an indexed intermittent motion, the speeds and modes of motion of the trunk and branch processing stations can be continuous, variable or intermittent with transfer device 8 transitioning between the differing motions. While the trunk has a first mode of motion that is continuous and the branch processing stations have a second mode of motion that is intermittent, it should be appreciated that the first mode of motion may be intermittent and the second mode of motion may be continuous.

According to processing system 2 as shown in FIG. 1, battery cans 34 are introduced to branch processing station 6 by input module 22. Input module 22 takes battery cans 34 which are input thereto in a bulk random manner and orients cans 34 to a common upright orientation and delivers the cans in an indexed manner to continuous feed indexer 7 where the cans are transported for processing by process modules 10.

An experimental process module 36 can be located at any desired position throughout system 2 to conduct experimental processing in lieu of production processing to test and evaluate new methods and equipment of processing. Because control coordinator 610 monitors each battery can position during transport, the experimental processing can take place in concert with standard production and the experimentally processed battery cans can be identified and extracted for evaluation at the conclusion of the processing cycle.

After completion of processing by process modules 10, battery cans 34 are extracted from continuous feed indexer 7 and have their motion converted from indexed motion to continuous motion by transfer device 8*a*. Battery cans 34 are then transferred to continuous motion conveyor 18 where they are transported to a subsequent branch processing station 14 for processing by process modules 12 and 24, and then to third branch processing station 16 for further processing by process modules 13. The number of process modules at each branch processing station is determined by the time required for the individual process and providing sufficient quantity of process modules to maintain a desired production throughput. The manner of determining the number of modules is discussed in more detail below. Upon completion of processing, battery cans 34 are removed from system 2 by extraction module 26 for testing, packaging, and delivery of the final product.

A more complete understanding of the components of high speed processing system 2 is gained from a detailed description of each of the modules comprising processing system 2.

Continuous Feed Indexer

Figure 3:
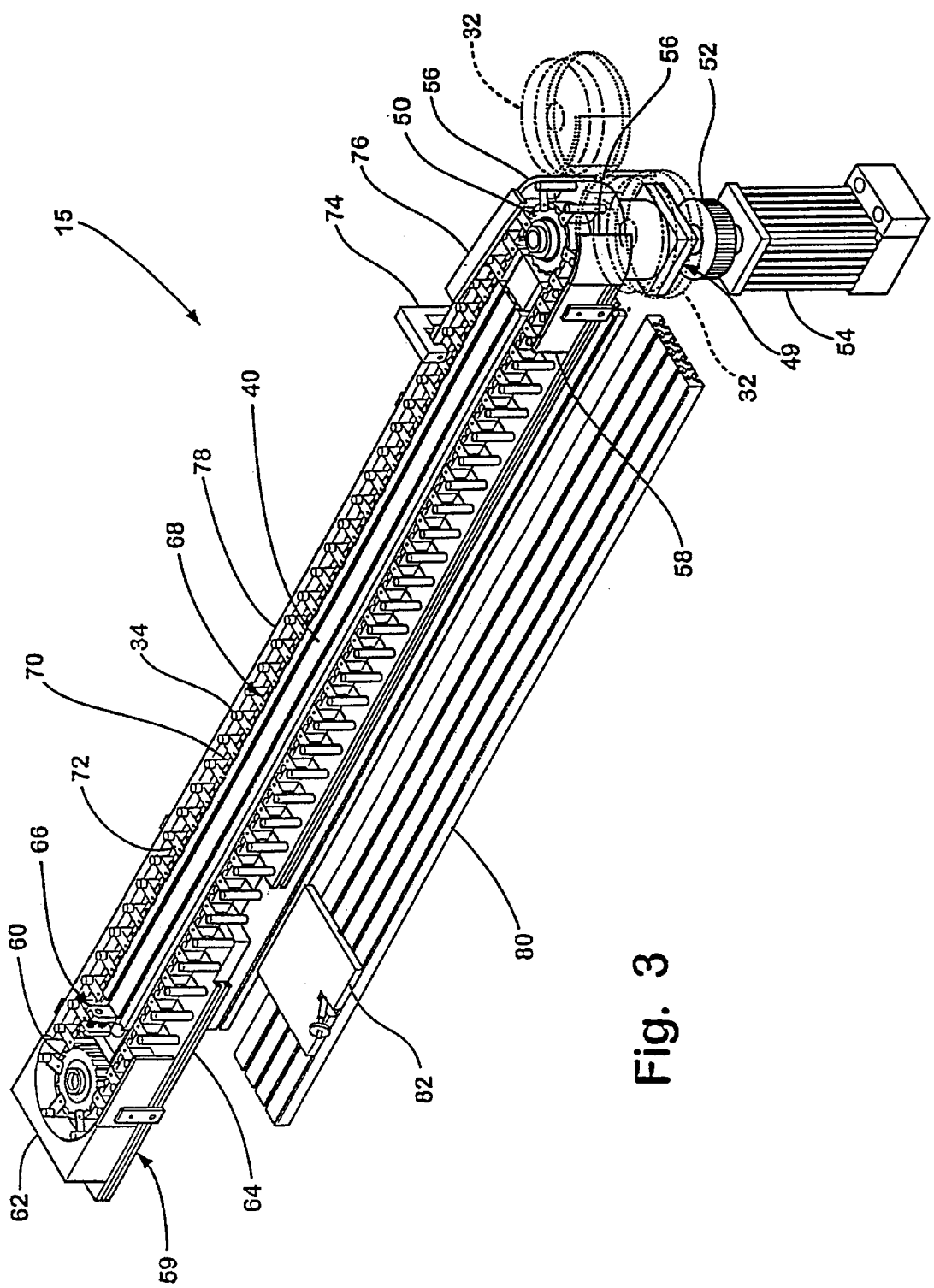
FIG. 3 is a perspective view of a branch processing station.
Figure 4:
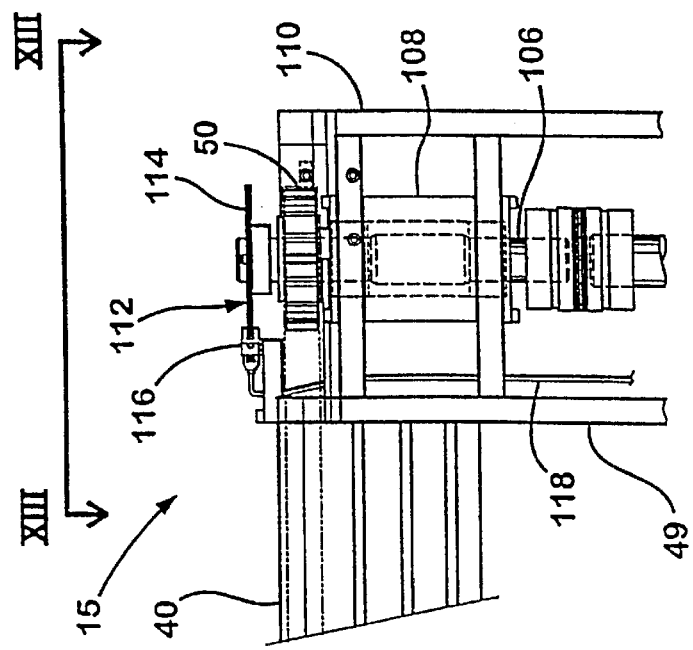
FIG. 4 is an elevational view of the drive end of a continuous feed indexer.
Figure 5:
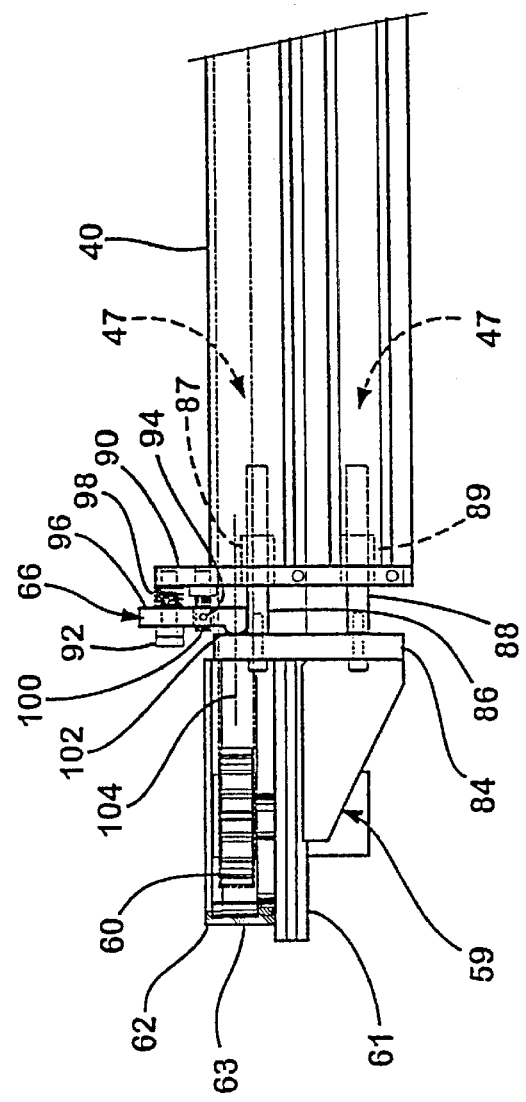
FIG. 5 is an elevational view of the idler end of a continuous feed indexer showing the tensioning mechanism.
Figure 10:
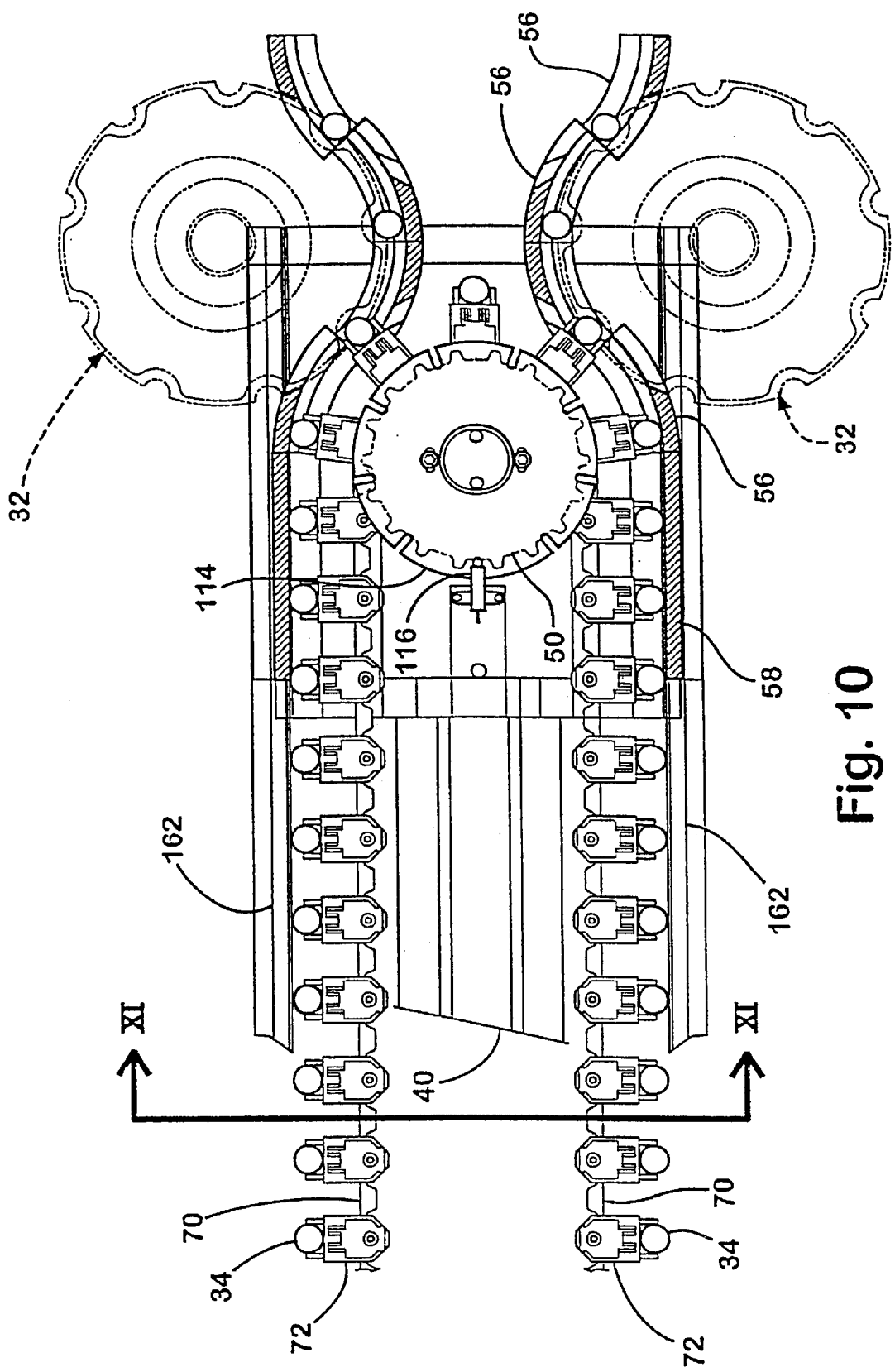
FIG. 10 is a plan view of the drive end of the continuous feed indexer showing dead plates around portions of the drive pulley for the transfer of battery cans to and from the continuous feed indexer.

With reference to FIGS. 3–5 a continuous feed indexer 15 comprises a central frame 40 to which are affixed a drive assembly 49 at one end and an idler assembly 59 at an opposite end with a conveyor assembly extending therearound. In the preferred embodiment the conveyor assembly is an endless transport belt assembly 68 extending between drive assembly 49 and idler assembly 59. A process module support 80 is positioned proximate to at least one side of continuous feed indexer 15 and to which are attached one or more process module mounts 82, the configuration of which is discussed more fully below.

Referring to FIGS. 3 and 4, drive assembly 49 is fastened to one end of frame 40. Drive assembly 49 comprises a drive frame 110 and supports spindle assembly 108 in which is journaled a drive shaft 106. At a top end of drive shaft 106, a cogged drive sprocket 50 is attached to shaft 106 to rotate in a horizontal plane. A home sensor 112 comprising a slotted disk 114 affixed to an upper end of shaft 106 to rotate therewith and an optical sensor 116 fixed to frame 40 is utilized to align the transport belt assembly 68 on the continuous feed indexer 15 in a manner more fully described below. A drive pulley 52 is affixed to a lower portion of shaft 106 below spindle assembly 108, and a servo drive motor 54 is affixed to the bottom of shaft 106 for providing the rotational power to drive pulley 52 and sprocket 50.

Referring to FIGS. 3 and 5, idler assembly 59 and tensioner assembly 66 are located at the opposite end of frame 40. End plate 90 is fastened to the end of frame 40 opposite from drive assembly 49. End plate 90 includes upper and lower bushings 87 and 89 extending into internal channels 47 of frame 40. Idler assembly 59 includes an idler support 61 to which cogged idler sprocket 60 is affixed to rotate in a horizontal plane. An end plate 62 extends around idler sprocket 60 and is spaced a fixed lateral distance from sprocket 60. The fixed distance of end plate 62 from idler sprocket 60 is slightly more than the outermost distance of the outer edge of a battery can as it traverses around sprocket 60 such that battery cans 34, as they traverse around sprocket 60, are at least partially retained by track 63 in end plate 62. A vertical idler end plate 84 is affixed to idler support 61 and has alignment shafts 86 and 88 attached thereto. Shafts 86 and 88 extend horizontally forward from plate 84 and are closely received in bushings 87 and 89 respectively to permit the fore and aft adjustment of idler assembly 59 with respect to frame 40 and drive assembly 49.

The fore and aft adjustment of idler assembly 59 is accomplished by tensioner assembly 66 and provides the proper tensioning to transport belt assembly 68 on continuous feed indexer 15. Tensioner assembly 66 comprises a pivot attach bolt 100 affixed to an upper end of end plate 90 at the idler end of frame 40. A tensioner arm 96 is pivotally affixed to an end of pivot attach bolt 100 and pivots about pivot pin 94 which extends horizontally through tensioner arm 96 and bolt 100. A lower portion of tensioner arm 96 has a nose 102 which bears against idler end plate 84 at a point coincident with the plane of centerline 104 of transport belt assembly 68 and pulley 60. Adjustment bolt 92 extends through an upper end of tensioner arm 96 and engages end plate 90. A coil biasing spring 98 is sleeved over adjustment bolt 92 and bears on the upper end of tensioner arm 96 and on end plate 90 to bias the upper end of tensioner arm 96 against adjustment bolt 92.

Referring now to FIGS. 6–9, transport belt assembly 68 comprises continuous belt 70 and a plurality of cleats 72. A chain could be substituted for belt 70. Belt 70 is a continuous belt of a desired length to extend around drive sprocket 50 and idler sprocket 60 and has a plurality of cogs or teeth 124 on an inner side 122 and a smooth outer side 120. Belt 70 is typically constructed of a metal reinforced polymer; however, alternative combinations of belts and cleats are possible to achieve the purpose of assembly 68. Teeth 124 have holes 126 extending vertically therethrough for the attachment of carriers to carry the articles of manufacture. In the preferred embodiment carriers are cleats 72. The size and desired spacing of cleats 72 will determine which teeth 124 are designated to receive cleats 72.

Each of cleats 72 has an upper flange 128 and a lower flange 130 which are vertically disposed one from the other by a vertical web 132. Vertical web 132 spaces flanges 128 and 130 to closely receive belt 70 therebetween such that smooth surface 120 of belt 70 abuts vertical web 132 of cleat 72. Flanges 128 and 130 each have a hole 145 extending vertically therethrough which is vertically aligned with hole 126 in belt teeth 124 when cleat 72 is abutted to belt 70. Cleat 72 is secured to belt 70 by inserting pin 146 through holes 126 and 145. Holes 126 and 145 closely receive pin 146 thereby preventing the inadvertent dislodgment of pin 146. Belt 70 is compressed slightly to create an interference fit of cleat 72 and pin 146 to belt 70. However, pin 146 can be readily removed to facilitate the replacement of a damaged cleat 72 on belt assembly 68 without requiring the removal of belt assembly 68 from continuous feed indexer 15. Alternatively, teeth 124 can have a pin fixed therein to mate with holes 145 facilitating the installation and removal of cleats 72 in a snap-in fashion. Flanges 128 and 130 also have at a distal end thereof a groove 129 and 131 respectively. Grooves 129 and 131 can receive therein a guide rail fixed along frame 40 to laterally stabilize cleats 72 for counteracting the magnetic force when cans 34 are extracted, thereby maintaining cleats 72 in a desired track around continuous feed indexer 15.

Cleat 72 also has upper flange 134 extending forward from web 132 and is coplanar with flange 128. Likewise, a lower flange 136 extends forward from lower flange 130. Steel dowel pins 138 extend forward from outer edges of flanges 134 and 136 forming recess 135 therebetween. Recess 135 receives therein one of the battery cans 34 for transport along continuous feed indexer 15. Flanges 134 and 135 also have embedded in a central portion thereof magnets 140 and 142 respectively for retaining a battery can 34 in recess 135. Alternatively, cleat 72 can be constructed to retain an engaging portion of a standard sized adapter which, in turn, has a capture portion to hold a desired size battery can. In this manner, the conveyor assembly can accommodate different size articles of manufacture by simply changing adapters.

Figure 11:
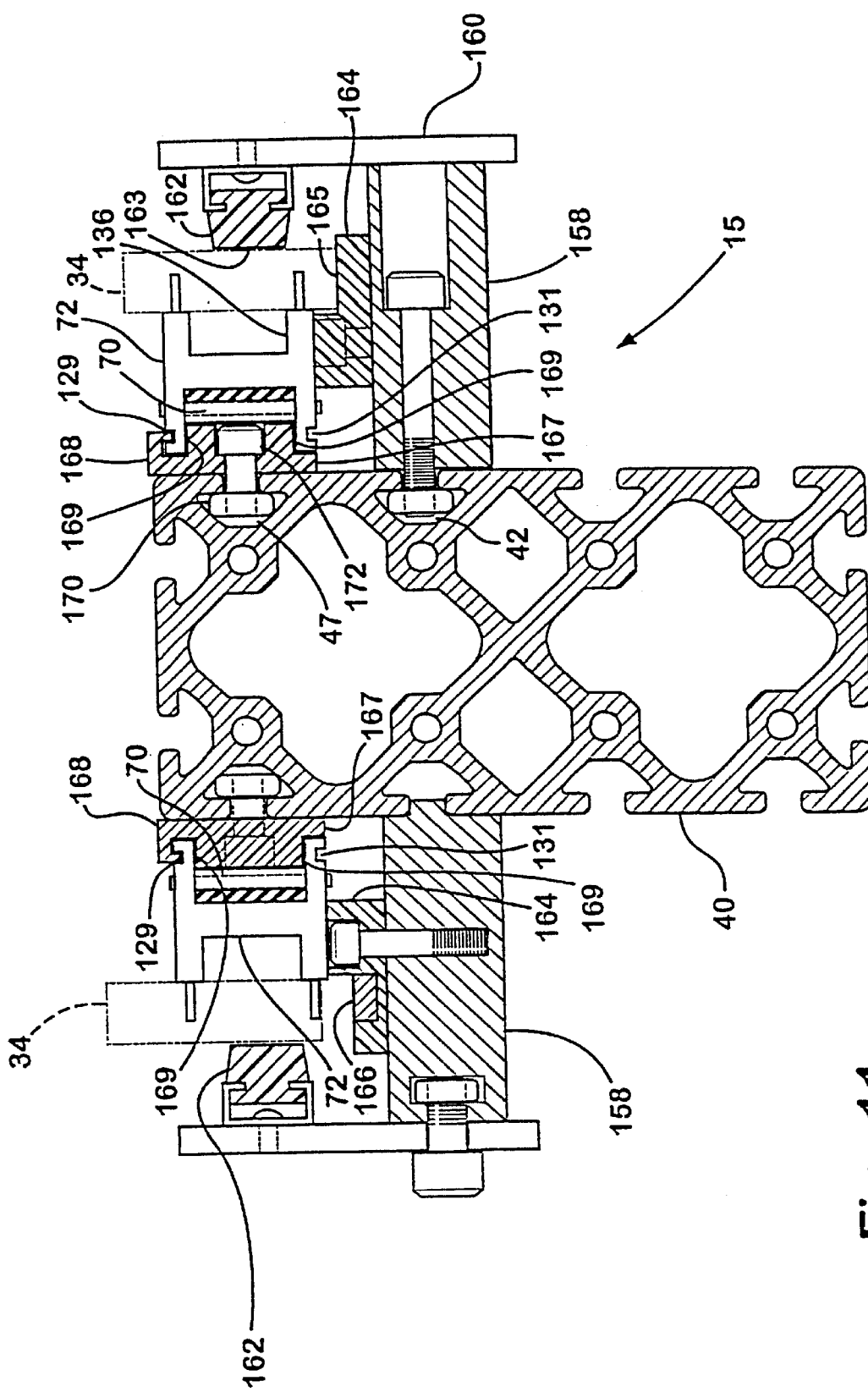
FIG. 11 is an elevational cross-sectional view of the continuous feed indexer taken along the line XI—XI in FIG. 10.

Referring now to FIG. 11, a cleat backup rail 167 is attached to an upper slot 42 of frame 40 with bolt 172 engaging nut 170 which is captive in slot 42. Cleat backup rail 167 runs the length of frame 40 and has upper and lower shoulders 169 for receiving flanges 128 and 130 of cleat 72. Shoulders 169 maintain cleats 72 in a predefined vertical position along indexer 15. Cleat backup rail 167 can also have a guide rail 168 which engages either or both grooves 129 and 131 of cleat 72 to also provide lateral stability for cleat 72 to maintain cleat 72 in a close lateral relationship with backup rail 167. Below backup rail 167, a support 158 is affixed to frame 40. Support 158 is attached to frame 40 in the same manner as cleat backup rail 167, using nuts captive in slots 42 of frame 40 and bolting support 158 thereto. A bottom cell support rail 164 is affixed to an upper surface of support 158. Bottom cell support rail 164 has a shoulder 165 at an outer edge for receiving therealong and supporting thereon the bottom of battery cans 34 as cans 34 are conveyed along indexer 15. Bottom cell support 164 also has an upper surface substantially corresponding to support bottom flange 136 of cleat 72. Side rail supports 160 are affixed to and located at regular intervals along support 158. Side rail supports 160 have attached to an inner side thereof side rails 162 which have an inner surface 163 to guide the outer surface of battery cans 34. In the preferred embodiment, each of side rail 162, bottom cell support rail 164 and cleat backup rail 167 is formed from a self lubricating material such as an oil impregnated nylon or similar material to minimize wear and facilitate the movement of belt assembly 68 around indexer 15. Alternatively, rails 164 and 167 and be formed from any low friction or wear resistant material.

Figure 12:
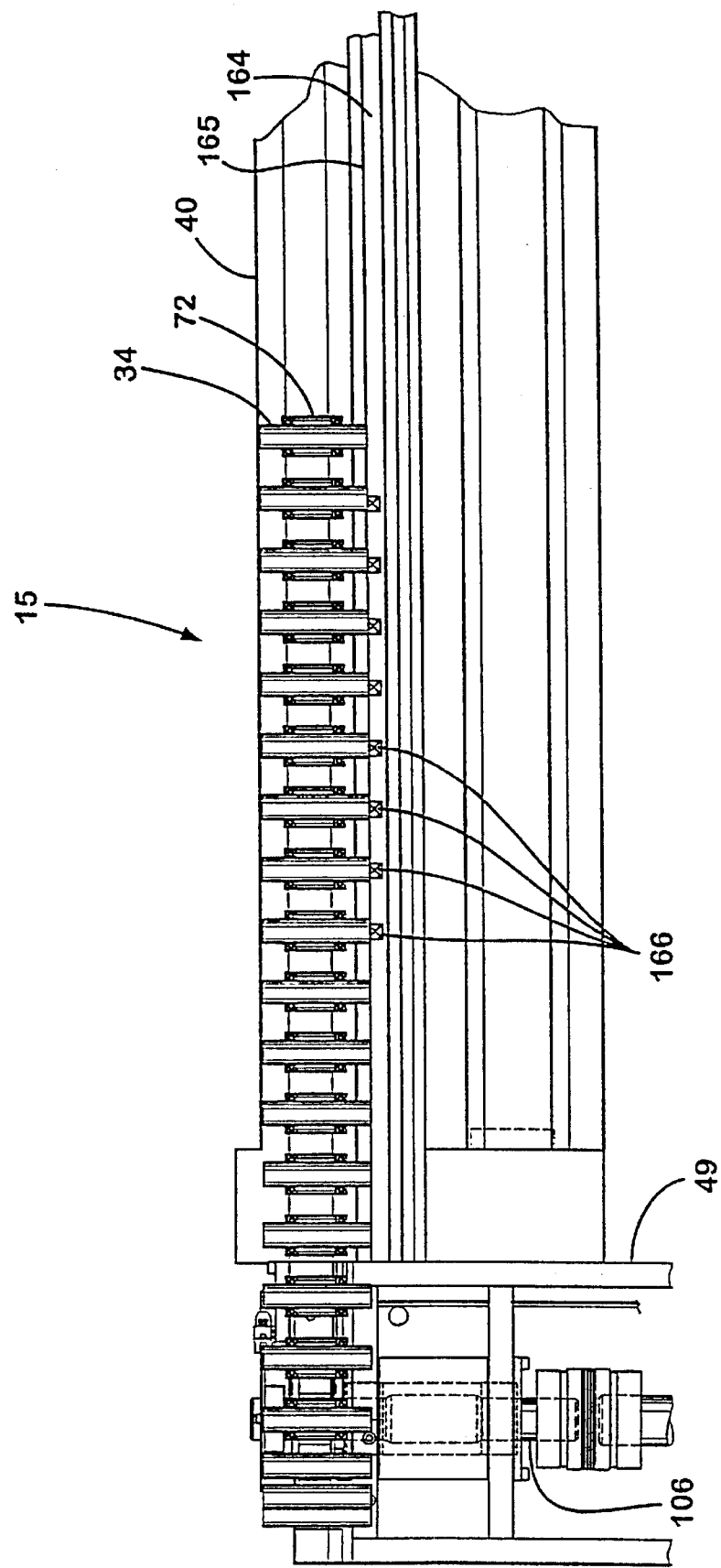
FIG. 12 is a side elevational view of the continuous feed indexer showing the battery cans after processing and illustrating the vertical realignment of the battery cans prior to being extracted from the continuous feed indexer.

Referring to FIG. 12, as the cans are processed on indexer 15, and returned to trunk 4, individual cans 34 may have been vertically shifted with respect to the carrying cleat 72. Therefore, any cans 34 that have become vertically shifted during processing are realigned with cleats 72 prior to extraction of cans 34 from indexer 15. For this purpose, individual hold-down magnets 166 are embedded in the bottom cell support rail 164 at a plurality of locations along rail 164. Because belt assembly 68 indexes about indexer 15 in a motion-dwell manner, cleats 72 pause at consistent predefined positions. Hold-down magnets 166 are positioned at these locations. When cleats 72 stop during the dwell portion of the belt assembly 68 motion about indexer 15, battery cans 34 are directly above magnets 166. The magnetic field of magnets 166 is designed to be sufficient to pull an individual can 34 down to contact the shoulder surface 165 of bottom cell support rail 164.

Figure 13:
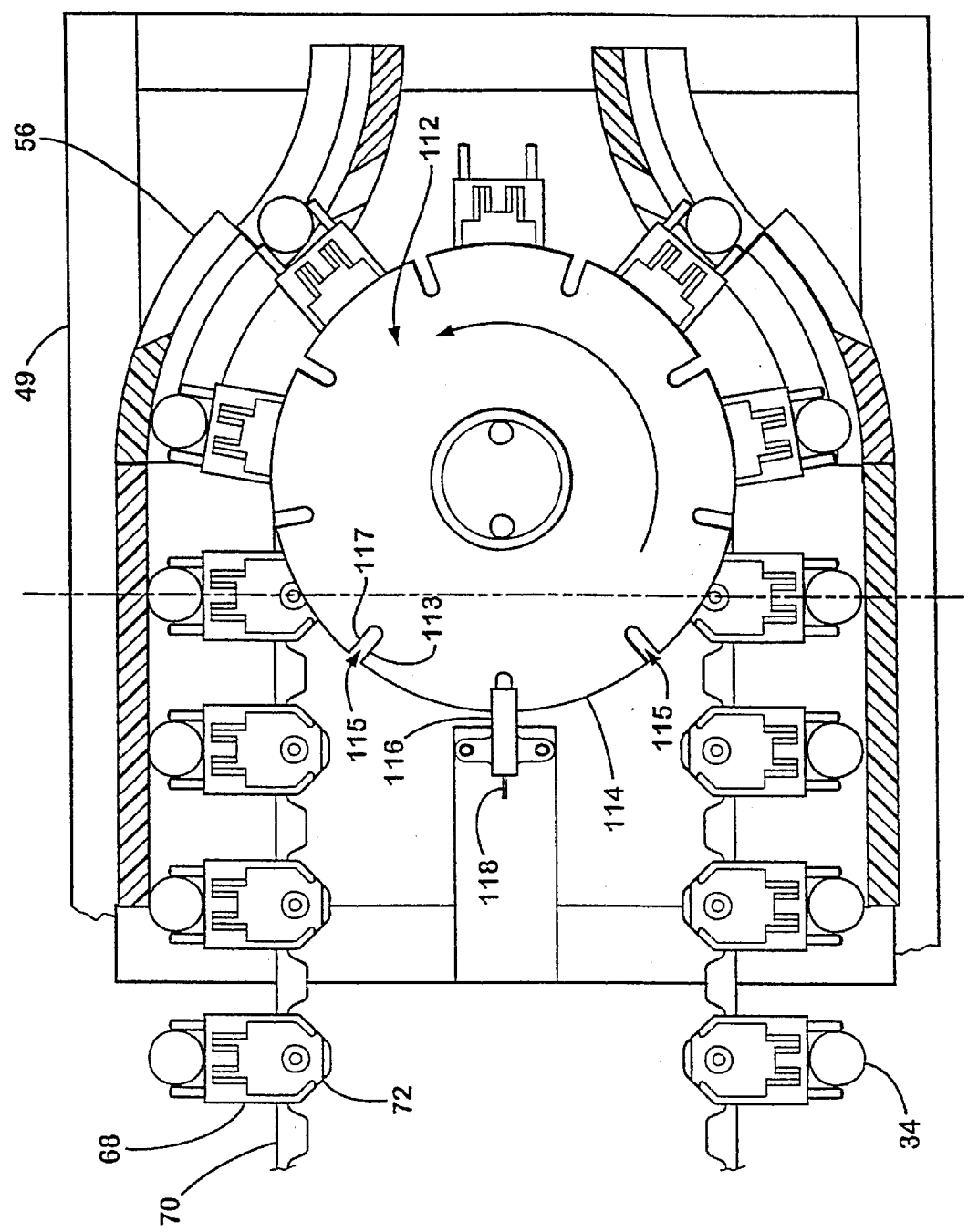
FIG. 13 is a plan view of the home sensor and slotted disk for the continuous feed indexer.

Referring now to FIGS. 4 and 13, a home sensor 112 is mounted above drive sprocket 50 of indexer 15 drive assembly 49. Home sensor 112 comprises a slotted disk 114 which rotates in conjunction with drive sprocket 50. Slotted disk 114 has a plurality of radially oriented slots 115 therearound spaced to correspond to the radial spacing of cleats around sprocket 50. Each of slots 115 has a leading edge 113 and a trailing edge 117. Whenever processing system 2 is restarted from an unknown condition, each element of system 2 is reset to a known 'home' position. The home sensor 112 is utilized for this function by optical sensor 116 sensing the passage of trailing edge 117 of one of slots 115 in disk 114 thereby disrupting the signal condition of the optical signal generated by sensor 116. By sensing and adjusting the position of slotted wheel 114, system 2 can reset indexer 15 to a known condition where cleats 72 are moved to a predefined position about indexer 15. Alternatively, a commercially available rotary transducer could be utilized as a home sensor for the nominal alignment of transport belt 68.

Transfer Device

Figure 14:
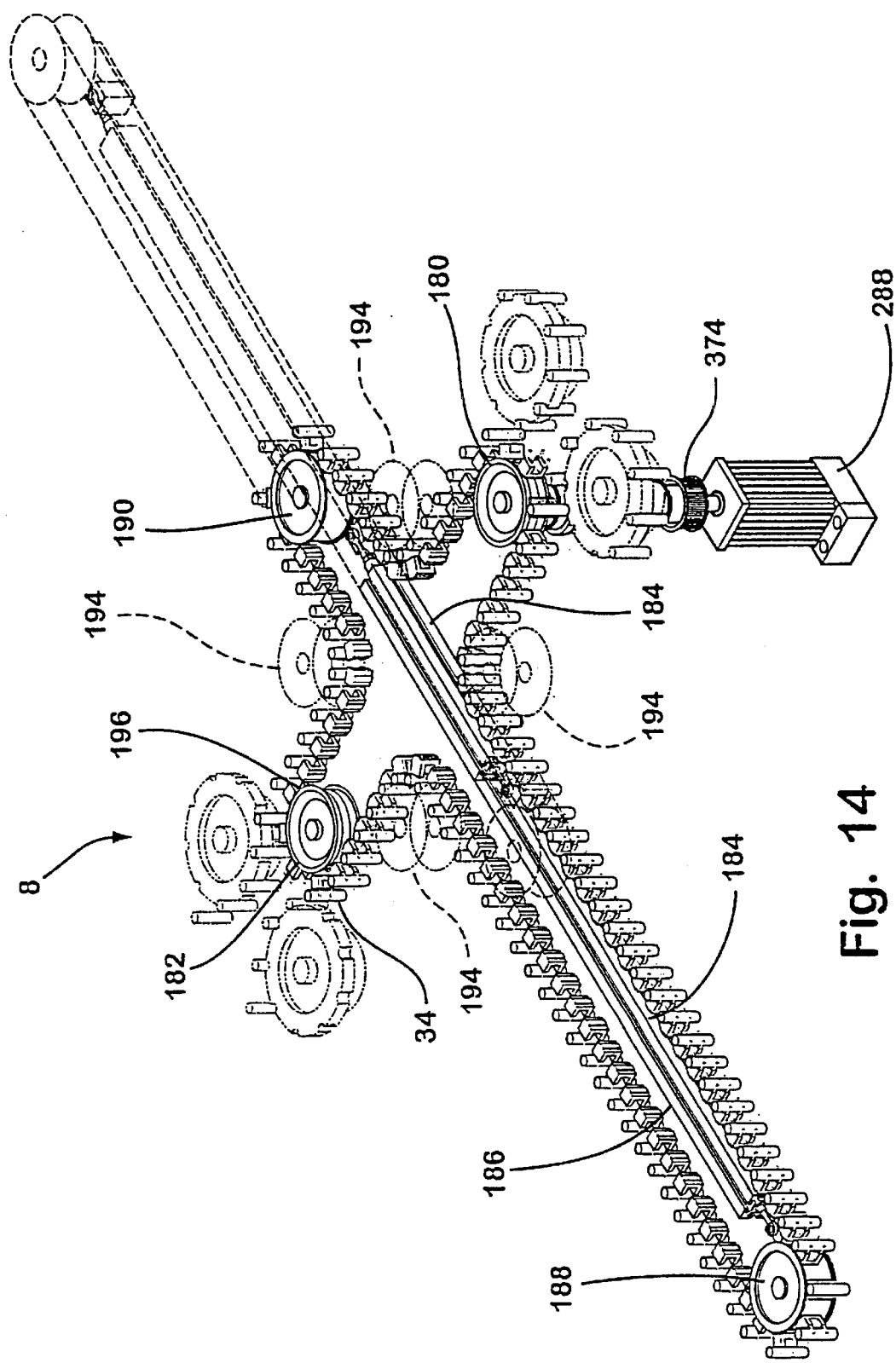
FIG. 14 is a perspective view of a transfer device for transferring battery cans from the continuous motion trunk to the indexed motion continuous feed indexer.

Referring now to FIGS. 14 and 16 a transfer device 8 is shown for transferring battery cans 34 from the continuous motion trunk conveyor 4 to a processing station 14 for processing thereon and from processing station 14 returning processed battery cans 34 to continuous motion trunk conveyor 4. Additionally, transfer device 8 transitions the motion of the battery cans from the continuous motion of trunk 4 to the indexed motion of continuous feed indexer 15. Transfer device 8 includes a continuous motion drive sprocket 180 which is rotatingly driven by servo motor 288 and an indexed motion drive sprocket 182 in line with continuous motion drive sprocket 180. Drive sprockets 180 and 182 are toothed or cogged sprockets which engage toothed transport belt assembly 196. A carriage 184 comprising an input flying idler 188 and an output flying idler 190 are laterally disposed one from the other by belt tensioning bar 186 or alternatively pulled apart by a wire rope and pulley arrangement and is positioned midway between sprockets 180 and 182. Belt tensioning bar 186 is oriented perpendicular to a line connecting the centers of sprockets 180 and 182 thereby configuring transfer device 8 in a cruciform configuration. An endless transport belt assembly 196 comprising an endless belt 198 and a plurality of cleats 200 affixed to belt 198 for carrying battery cans 34 extends around the drive sprockets 180 and 182 and around flying idlers 188 and 190. Belt tensioning bar 186 acts on the centerline of belt 198 to reduce loading forces applied to linear rail 174 and carriage block 175 (FIG. 17). Fixed idlers 194 are positioned proximate to the intersection of the two axes of the cruciform wherein belt assembly 196 is routed around the inside of fixed idlers 194 thereby directing belt assembly 196 to follow a perimeter of the cruciform.

Referring to FIGS. 23–25, transport belt assembly 196 comprises a toothed belt 198 to which are attached at regularly spaced intervals a plurality of cleats 200 for carrying battery cans 34 about the periphery of transfer device 8. In the preferred embodiment, belt 198 is significantly wider than belt 70 used on continuous feed indexer 15 and cleats 200 are fastened to belt 198 in a different manner than the cleats 72 of belt assembly 68. Cleat 200 has a vertical web 246 which maintains upper flange 250 and lower flange 252 in a vertically disposed relationship. Flanges 250 and 252 extend horizontally from upper and lower ends of web 246 respectively. Each of flanges 250 and 252 have hardened steel dowel pins extending from the outer edges of the flange to define a recess 255 therebetween for receiving a battery can 34 for transport about transfer device 8. As in cleats 72, cleats 200 also have upper and lower magnets 256 and 258 embedded in a central portion of upper and lower flanges 250 and 252 respectively for attracting and retaining a battery can 34 within recess 255. A vertical rib 248 protrudes from the back of web 246 and extends from the top of web 246 to the bottom of web 246. Rib 248 is the only portion of cleat 200 which abuts belt 198 thereby leaving a small clearance between the remainder of web 246 and belt 198. The clearance at the ends of cleat 200 allows belt assembly 196 to make an inside turn around fixed idlers 194. Cleats 200 are centered on a tooth 244 of belt 198 and are adjacently spaced corresponding to the spacing of cleats 72 on indexer belt assembly 68. In the preferred embodiment, cleats 200 are fastened to belt 198 with threaded fasteners 260, with the threads of fasteners 260 engaging rib 248 and web 246. The use of threaded fasteners permits the rapid replacement of cleats 200 without necessitating the removal of belt assembly 196 from transfer device 8. However, alternative means for clamping cleats 200 to belt 198 are possible and within the scope of belt assembly 196.

Referring now to FIGS. 15, 17, 18 and 20 the dancer carriage 184 comprises a linear rail 174 having base plates 173 attached to a bottom of rail 174 for mounting to a support base 172. Linear rail 174 is an elongate rail having an hourglass profile as shown in FIG. 20. A belt tensioning bar 186 has an idler support 176 attached at each end thereof and forms an accumulating member. Idler support 176 at an input end of carriage 184 supports a rotatable input flying idler 188 and an end plate 189 at an outer end thereof. Similarly, an idler support 176 at an output end of carriage 184 supports a rotatable output flying idler 190 and an end plate 191 at an outer end thereof. Idler supports are mounted to carriage blocks 175. Carriage blocks 175 have an internal linear, recirculating ball bearing for translating along rail 174 with minimal friction. To obtain the proper tension of belt assembly 196, belt tensioning bar 186 is provided with adjustable links 187 at each end thereof for increasing or decreasing the distance between flying idlers 188 and 190. Each of flying idlers 188 and 190 has a recess 192 about its periphery to permit the clearance of heads of fasteners 260 retaining cleats 200 to belt 198. End plates 189 and 191 are positioned at the end of flying idlers 188 and 190 and spaced from the idler's perimeter to permit the passage of belt assembly 196 therearound when belt assembly is transporting battery cans 34. End plates 189 and 191 are sufficiently close to idlers 188 and 190 to prevent centrifugal force from disengaging battery cans 34 from cleats 200 as belt assembly 196 traverses the perimeter of transfer device 8.

Figure 21:
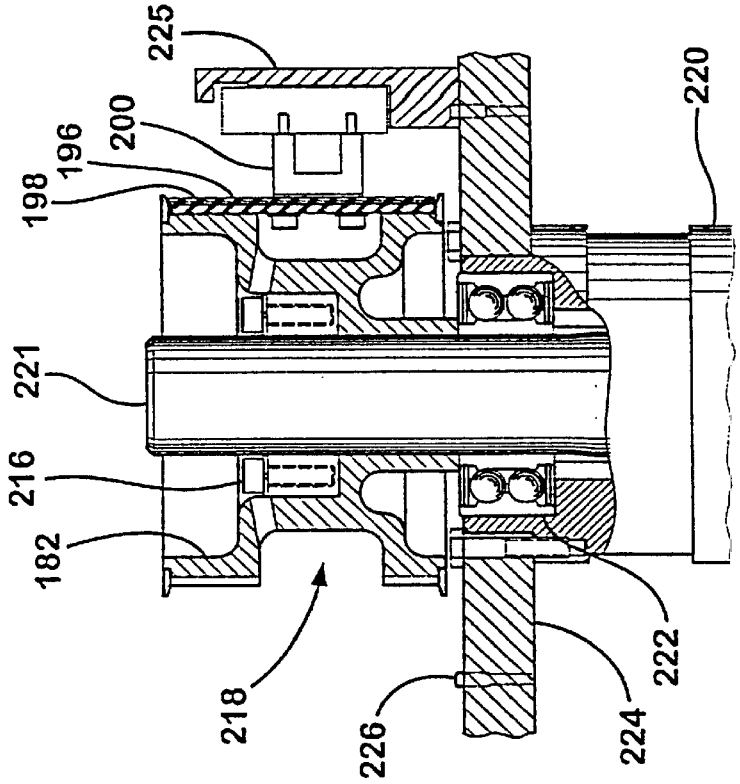
FIG. 21 is a cross-sectional view of one of the transfer device drive pulleys taken along the line XXI—XXI of FIG. 16.
Figure 27:
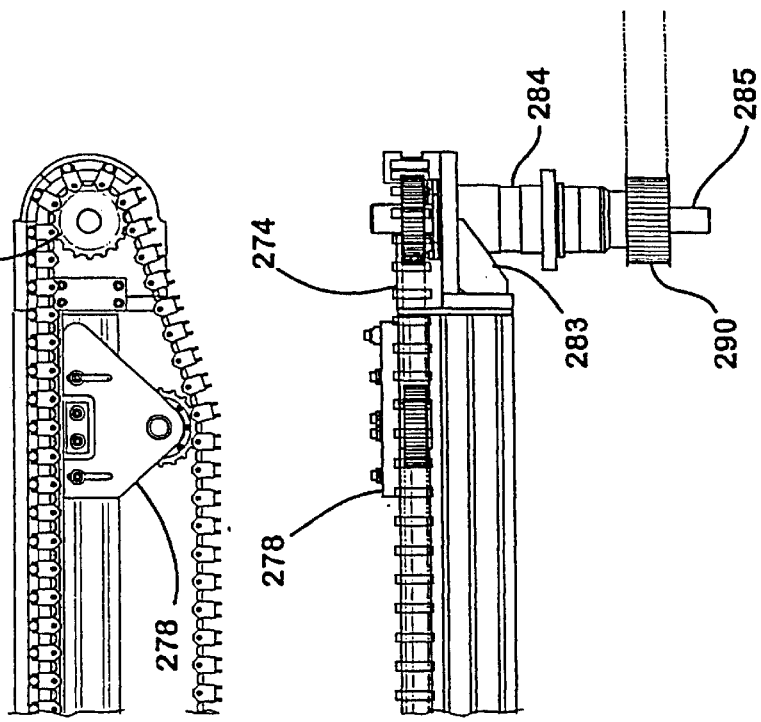
FIG. 27 is a plan view of a continuous motion conveyor.
Figure 28:
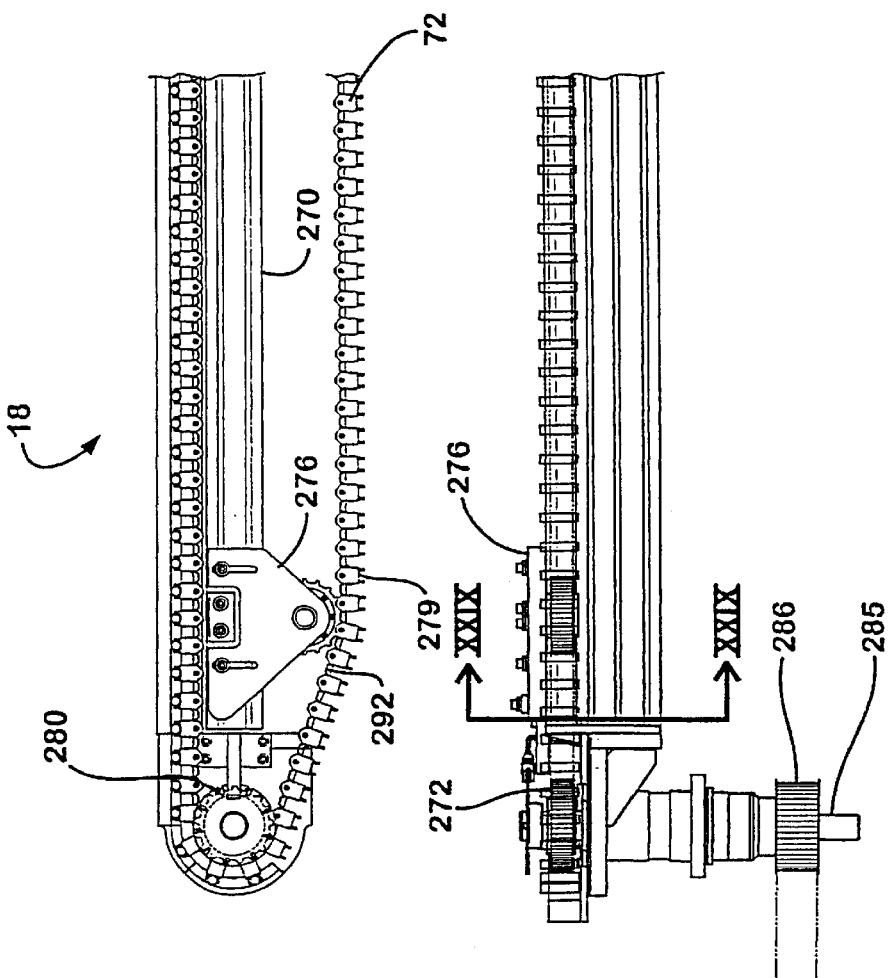
FIG. 28 is an elevational view of a continuous motion conveyor.

FIG. 21 illustrates indexed motion drive sprocket 182 in partial section (continuous motion drive sprocket 180 being similarly constructed and configured). Drive sprocket 182 is toothed to engage the teeth 144 of belt assembly 196. Sprocket 182 has a recess 218 about the central part of its periphery to clear the heads of fasteners 260 mounting cleats 200 to belt 198. Sprocket 182 is mounted to shaft 221 with a compression type sleeve 216 to ensure that sprocket 182 is centered and firmly secured to shaft 221. Any slippage of sprocket 182 on shaft 221 will result in misalignment of processing system 2 requiring shutting the system down to readjust the coordination between battery can 34 carrying elements. Shaft 221 is support by and journaled in spindle assembly 220. Spindle assembly 220 is significantly wider than shaft 221 to provide rigid support of shaft 221 in a vertical orientation. Shaft 221 extends from the bottom of spindle assembly 220 and has a cogged pulley (not shown) attached thereon for driving sprocket 182. A dead plate support 224 is attached to the top of spindle assembly 220 and has dowel pins 226 inserted in hole about its periphery. One or more dead plates 225 are attached to dead plate support 224 and function to guide and retain battery cans 34 in cleats 255 as they traverse about the periphery of drive sprocket 182.

Figure 22:
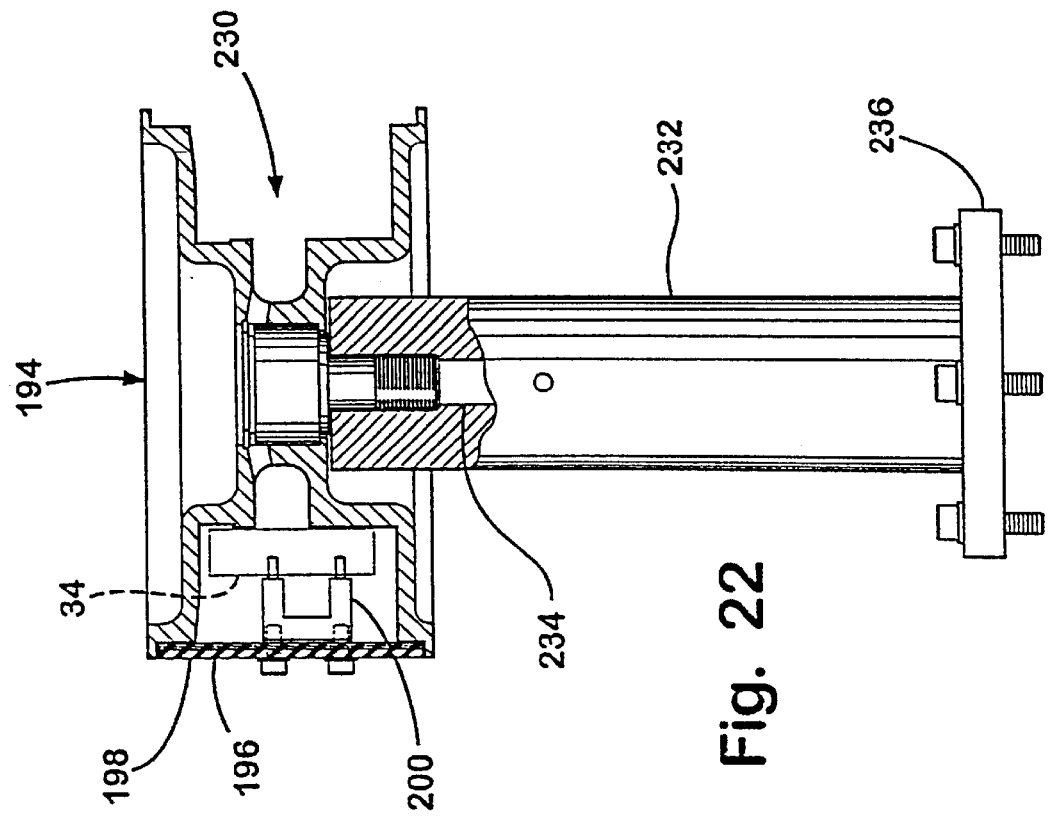
FIG. 22 is a partial cross-sectional view of a fixed idler for the transfer device taken along the line XXII—XXII of FIG. 16.

FIG. 22 shows fixed idler 194 connected to shaft 234 which is journaled in idler support 232. Idler support 232 has a mount base 236 at a bottom portion thereof to facilitate mounting the fixed idler to support frame or platform 28. Since the fixed idlers 194 are utilized by belt assembly 196 to make an inside turn about the periphery of transfer device 8, cleat 255 and battery can 34 face the fixed idler. Each fixed idler 194 then has a recess about the central portion of its periphery so that idler 194 does not interfere with cleats 255 or battery cans 34 in a manner that would induce belt assembly 196 not to engage idler 194. The contact of belt assembly 196 on idler 194 guarantees that belt assembly 196 does not change length when one or more cleats 255 do not carry a battery can 34.

Referring now to FIG. 19 transfer device 8 has associated therewith a plurality of sensor and switches to control the operation of processing system 2. An input limit switch 201 and an output limit switch 202 are mounted at the respective input and output ends of rail 174. An end block 177 is affixed to the end of each idler support 176 such that if transfer device 8 was driven to an overly input rich condition (dancer carriage 184 translated to the left with battery cans 34 to be processed) or to an overly output rich condition (dancer carriage 184 translated to the right with processed battery cans 34), end block 177 would actuate the associated limit switch 201 or 202 which would cause system 2 to be shut down and require the realignment of processing system 2 elements. The limit switches 201 and 202 are the last resort shutdown for system 2 to prevent damage to processing system 2. Input and output end of travel sensors are positioned to optically sense the programmed limits of travel of dancer carriage 184, and to disable processing system 2 if the limits were to be breached. The transfer device 8 also has a home sensor to sense the proper resetting of carriage 184 to its home position when initializing processing system 2. Finally, indexing enable sensor 206 and indexing disable sensor 212 are positioned along rail 174 to sense the maximum desired operational travel of carriage 184 and to therefore, in turn, disable the indexing drive when transfer device 8 becomes output rich and to enable the indexing drive when transfer device 8 becomes input rich.

Continuous Motion Conveyor

Referring to FIGS. 26–29, trunk 4 typically comprises one or more continuous motion conveyors 18 and 20 to transport the articles of manufacture such as battery cans 34 from one branch processing station 16 to a subsequent branch processing station 16 and continuing until all desired processing steps have been accomplished.

Each continuous motion conveyor such as conveyor 18 is similar in construction to that of continuous feed indexer 15. Continuous motion conveyor 18 comprises a central frame 270 from the same extruded slotted beam as frame 40 of continuous feed indexer 15. Frame 270 has first idler assembly 272 attached to one end of frame 270 and second idler assembly 274 attached to an opposite end of frame 270. A first tensioner pulley assembly 276 is mounted to the top of frame 270 proximate to first idler assembly 272 and a mirror image second tensioner pulley assembly 278 is mounted to the top of frame 270 proximate to second idler assembly 274. A transport belt assembly 279 comprising endless toothed belt 292 and cleats 72 extends around continuous motion conveyor 18 for transporting of battery cans 34 in one direction only. Transport belt assembly 279 utilizes the same toothed belt construction as belt 70 used in belt assembly 68, and also uses the same cleats 72 attached to belt 292 in the same manner with a pin extending through rear flanges 128 and 130 of cleat 72 and through individual teeth of the belt.

Each of idler assembly 272 and idler assembly 274 comprises a support 283 to which spindle 284 is attached. Spindles 284 are mounted to a frame or platform 28 (FIG. 1) and support continuous motion conveyor 18 therebetween. Spindle 284 has a shaft 285 journaled at a top and bottom of spindle assembly 284 and further extends above and below spindle assembly 284. A first cogged pulley 280 is affixed to the upper end of shaft 285 on first idler assembly 272 and a second cogged pulley 282 is affixed to the upper end of shaft 285 on second idler assembly 274.

Figure 29:
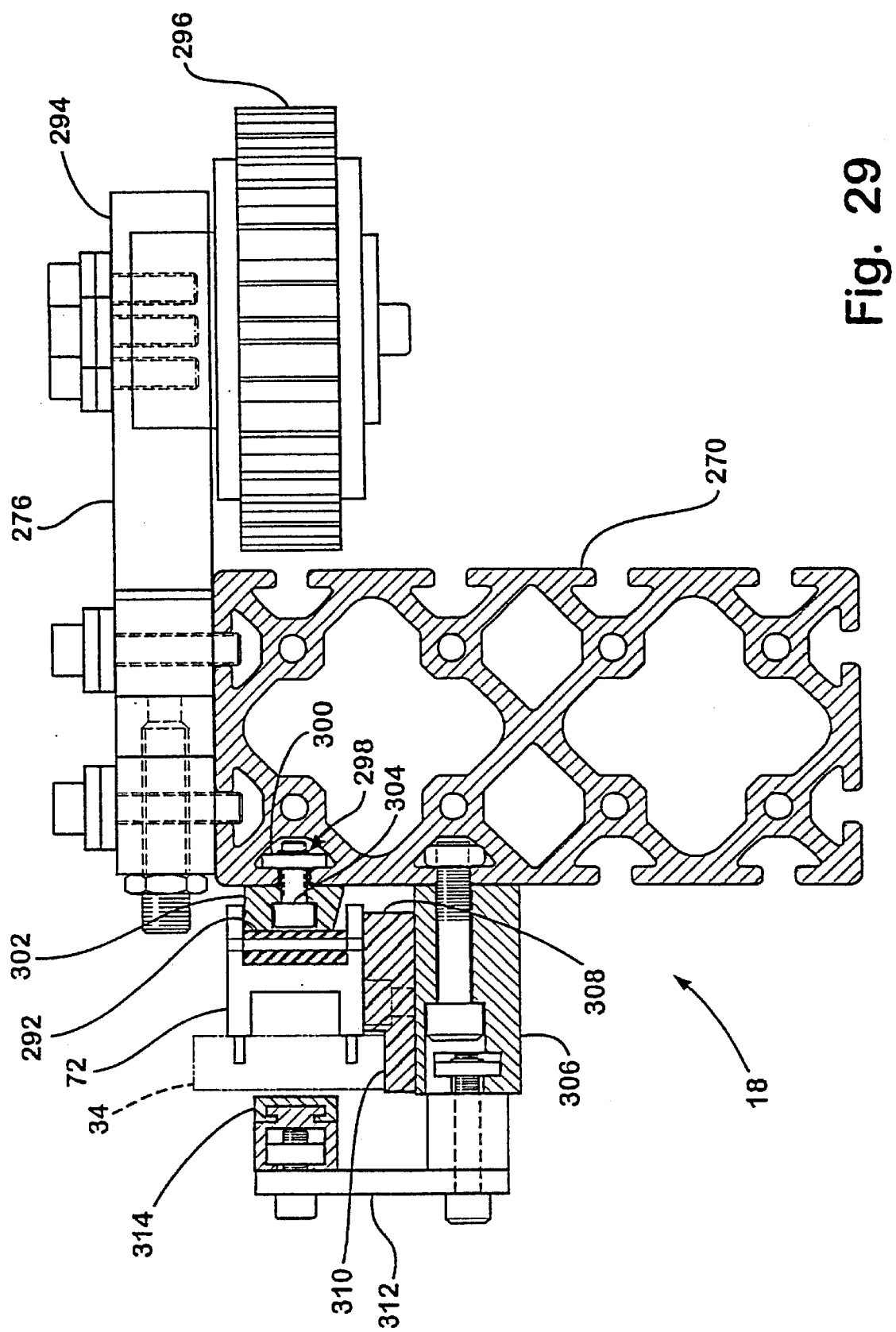
FIG. 29 is a cross-sectional elevation view of the continuous motion conveyor taken along the line XXIX—XXIX of FIG. 28.

Referring to FIG. 29, the continuous motion conveyor 18 is shown in cross section. First tensioner pulley assembly 276 is bolted to the top of frame 270. Tensioner support 294 extends to the right of frame 270 and horizontal tensioner pulley 296 depends therefrom. As shown in FIG. 29, transport belt assembly 279 returns to the idler assembly 274 from the opposite end of conveyor 18 without carrying any battery cans 34. Since the return portion of belt assembly 279 does not carry cans 34 and as a result of its continuous motion does not experience vibrations induced by starting and stopping, belt assembly 279 does not require support beyond tensioner idler pulley assemblies 276 and 278. The left side of conveyor 18 is used to transport battery cans 34 from one processing station to another and thus requires support similar to the support provided on both sides of continuous feed indexers such as indexer 15. A backup rail 302 is affixed to an upper portion of frame 270 at upper slot 298 in frame 270. A captive nut 300 is retained in slot 298 for engagement by bolt 304 to secure cleat backup rail to frame 270. Support block 306 is affixed to frame 270 at a lower slot in a manner similar to backup rail 302. A bottom cell support rail 308 is attached to the upper surface of support block 306. Cleat 72 of belt assembly 279 rides along an upper surface of support rail 308 while battery cans 34 ride along a shoulder 310 at an outer end of support rail 310. A plurality of side rail supports 312 are attached along support block 306 to support side rail 314. Side rail 314 is positioned to maintain battery cans 34 captive in cleats 72 as the battery cans are conveyed from one end of continuous motion conveyor to the other end. As in continuous feed indexer 15, backup rail 302, bottom cell support rail 308, and side rail 314 are fabricated from a self-lubricating material such as oil impregnated nylon or other low friction or wear resistant material.

Coupler

As illustrated in FIG. 2, a coupler is positioned intermediate adjacent ones of continuous motion conveyors 18 and 20, transfer devices 8, and continuous feed indexers 7, 15, and 17. Each coupler 32 performs a transfer function between these adjacent elements. For example, one coupler 32 will extract battery cans from the input side of transfer device 8 and deliver them to the input side of continuous feed indexer 7 for processing. After processing of cans 34 on continuous feed indexer 7, a second coupler 32 extracts the processed cans 34 from the output side of continuous feed indexer 7 and delivers them to the output side of transfer device 8. Couplers 32 are similarly used to transfer cans 34 between continuous motion conveyors 18 and transfer device 8. Couplers 32 are the connecting links between the various transport and processing elements of system 2 permitting these elements to be combined in an infinite number of arrangements while maintaining the capability of a continuous and uninterrupted flow of articles of manufacture throughout system 2.

Figure 30:
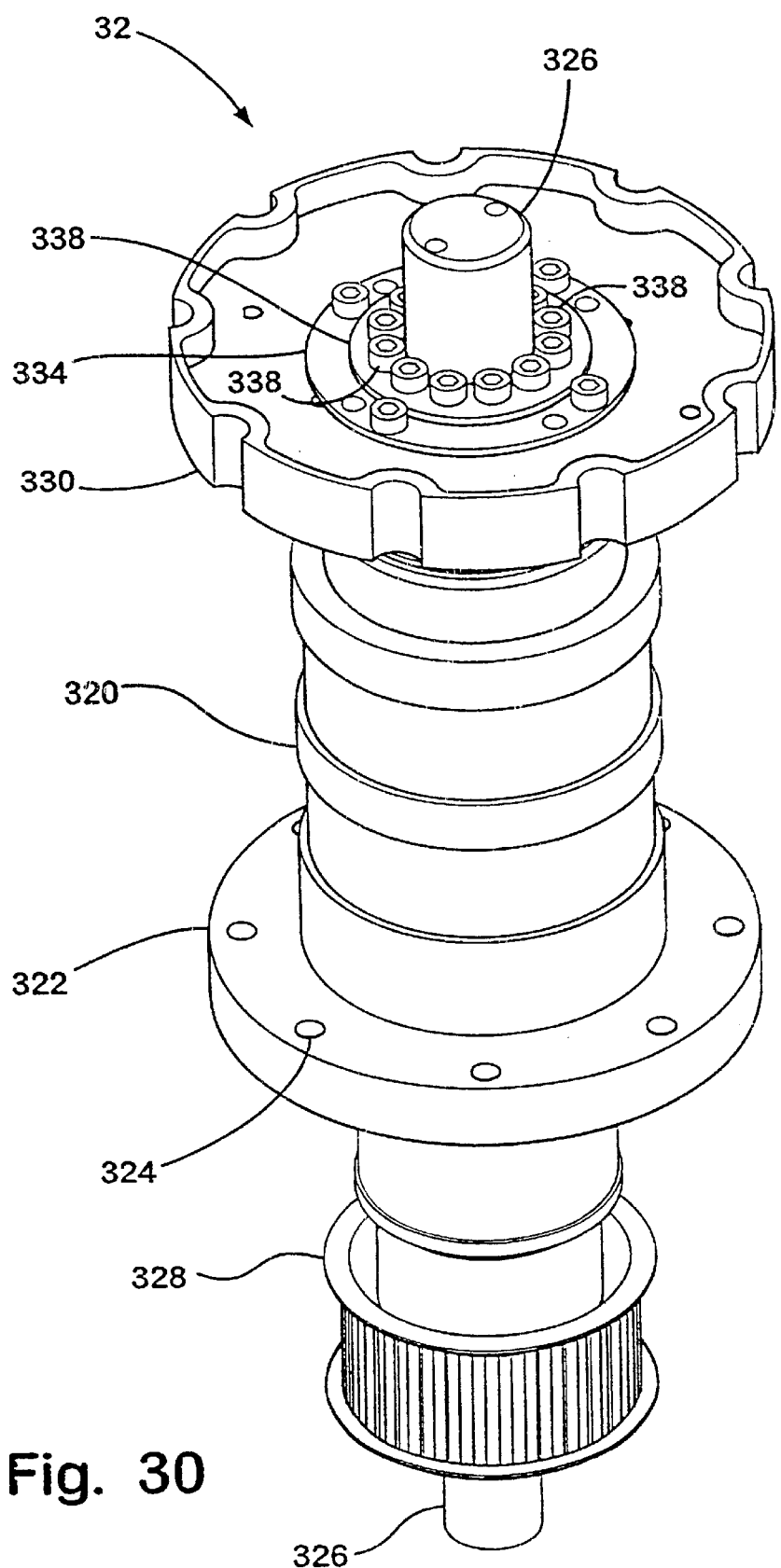
FIG. 30 is a perspective view of a coupler mounted on a spindle.
Figure 31:
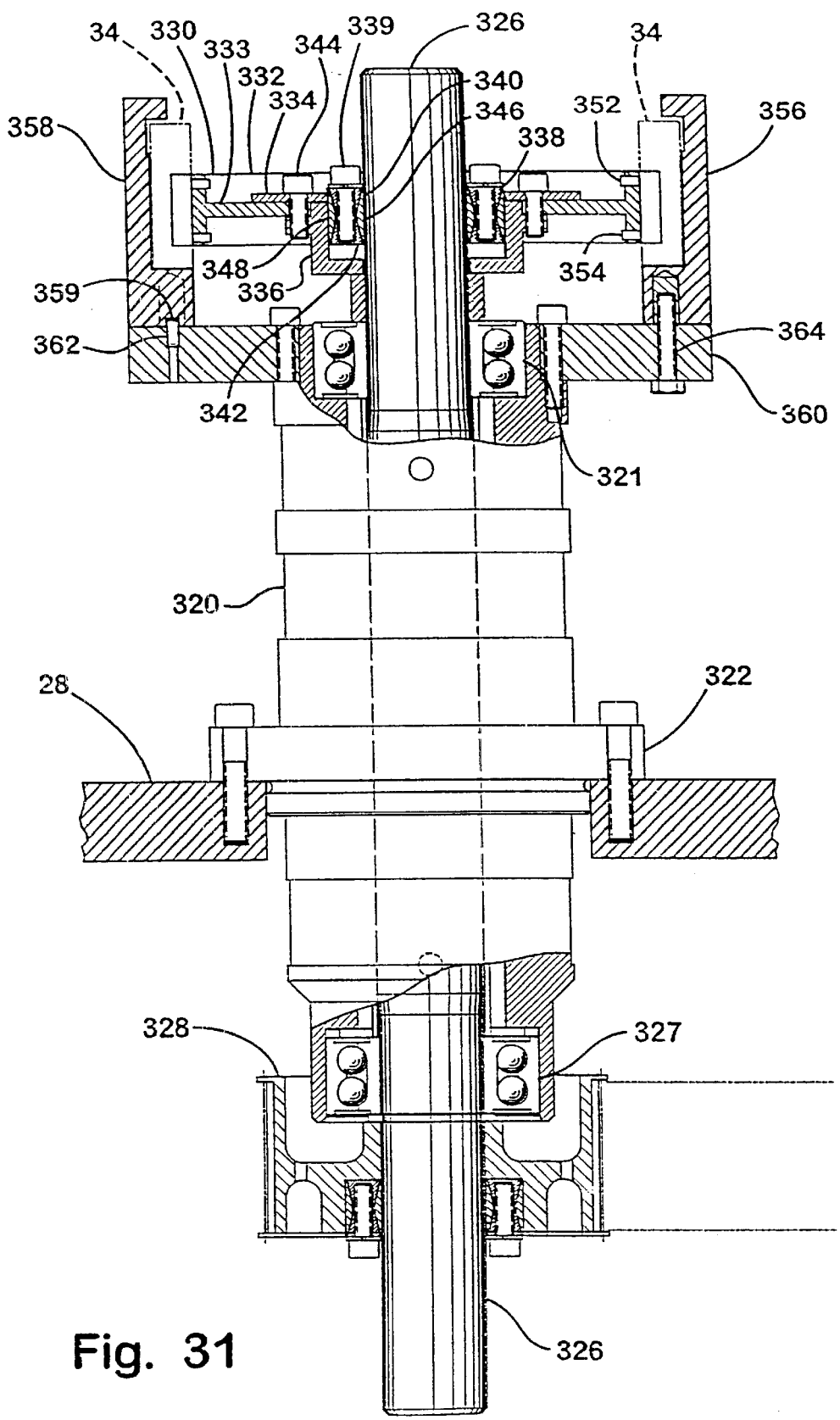
FIG. 31 is a partial cross-sectional view of a coupler illustrating the dial attachment, and further illustrating dead plate supports, and dead plates.
Figure 32:
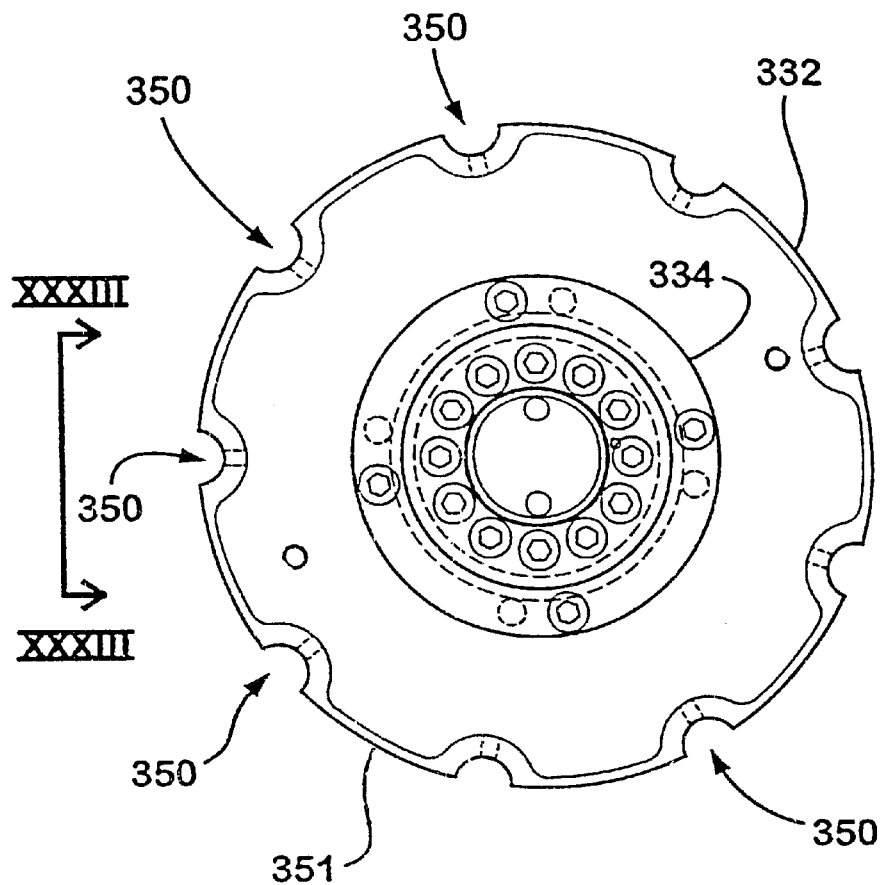
FIG. 32 is a plan view of the coupler dial showing pockets defined around a periphery of the dial.

Referring to FIGS. 30–32, a coupler 32 comprises a spindle assembly 320 having a mounting flange 322 extending outwardly therefrom for mounting to a frame or platform such as platform 28 (FIG. 1). Mounting flange 322 has a plurality of holes 324 therearound to facilitate securing spindle assembly 320 to platform 28. A rotatable shaft 326 extends vertically through spindle assembly 320 and is journaled in upper bearing 321 at an upper end of spindle assembly 320 and in bearing 327 at a lower end of spindle assembly 320. Shaft 326 extends below spindle assembly 320 and has one or two cogged pulleys 328 mounted thereto. Shaft 326 also extends upwardly through spindle assembly 320 and has mounted thereto at its upper end a dial assembly 330. Dial assembly 330 has a dial 332 which can be molded of an injectable resin or machined from plastic metal or ceramic, and is shaped to minimize weight and rotational inertia.

Figure 33:
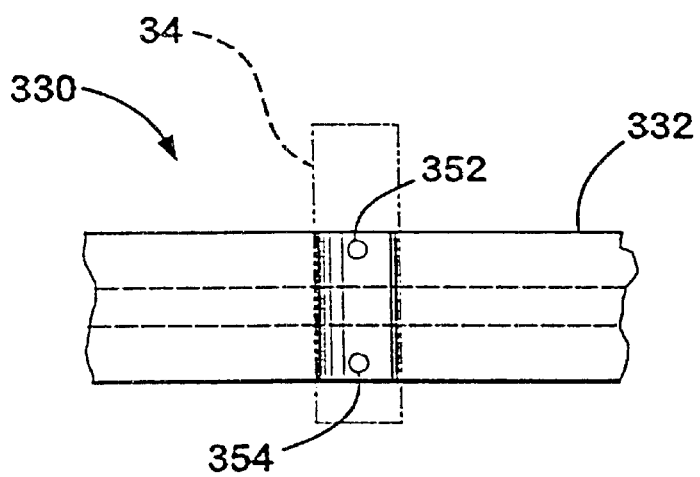
FIG. 33 is an elevational view of one pocket of the coupler dial taken along the line XXXIII—XXXIII of FIG. 32.

As shown in FIGS. 32 and 33, dial assembly 330 is generally circular and has a plurality of pockets 350 defined by a perimeter 351 of dial 332. Each pocket 350 is shaped to receive a portion of a battery can 34 and has an upper magnet 352 and a lower magnet 354 embedded within the portion of dial perimeter 351 defining pocket 350 for capturing and retaining battery can 34 therein.

Referring now to FIG. 31, a central web 333 of dial 332 is captured between washer plate 334 and hub 336 and is fastened to washer plate 334 and hub 336 by bolts 334. Dial assembly 330 is sleeved over shaft 326 as is a taper lock compression fitting 338 which is received by an inner diameter of washer plate 334 and hub 336. Taper lock compression fitting 338 has an upper tapered insert 340 and a lower tapered insert 342 which are received between inner chamfered ring 346 sleeved over shaft 326 and outer chamfered ring 348 bearing against the inner diameter of hub 336. A plurality of closely spaced bolts 339 extend through compression fitting 338 in a manner to draw upper tapered insert 340 and lower tapered insert 342 toward one another. As inserts 340 and 342 are drawn together by bolts 339, the tapered surfaces of inserts 340 and 342 compress inner ring 346 against shaft 326 and expand outer ring 348 against the inner diameter of hub 336 thereby securing dial assembly 330 to shaft 326.

A dead plate support 360 is affixed to a top of spindle assembly 320. Dead plate support 360 has mounted thereon one or more dead plates 356 and 358. As shown in the sectional view of FIG. 31, dead plate 356 is secured to dead plate support 360 by a threaded fastener such as bolt 364. Dead plates 356 and 358 are carefully positioned relative to dial assembly 330 so that battery cans 34 can rotate freely within dead plates 356 and 358 yet be sufficiently close to prevent battery cans 34 from becoming dislodged or disengaged from pockets 350 in dial 332. To this end, dead plates such as dead plate 358 as shown in section has a groove 359 in a bottom surface in which is closely received dowel pins 362 for precise radial positioning of dead plates 358 on dead plate support 360. Dead plate 356 and 358 include upper and lower flanges to maintain each can 34 in a desired vertical position with respect to dial 332.

Drive Arrangement

Figure 34:
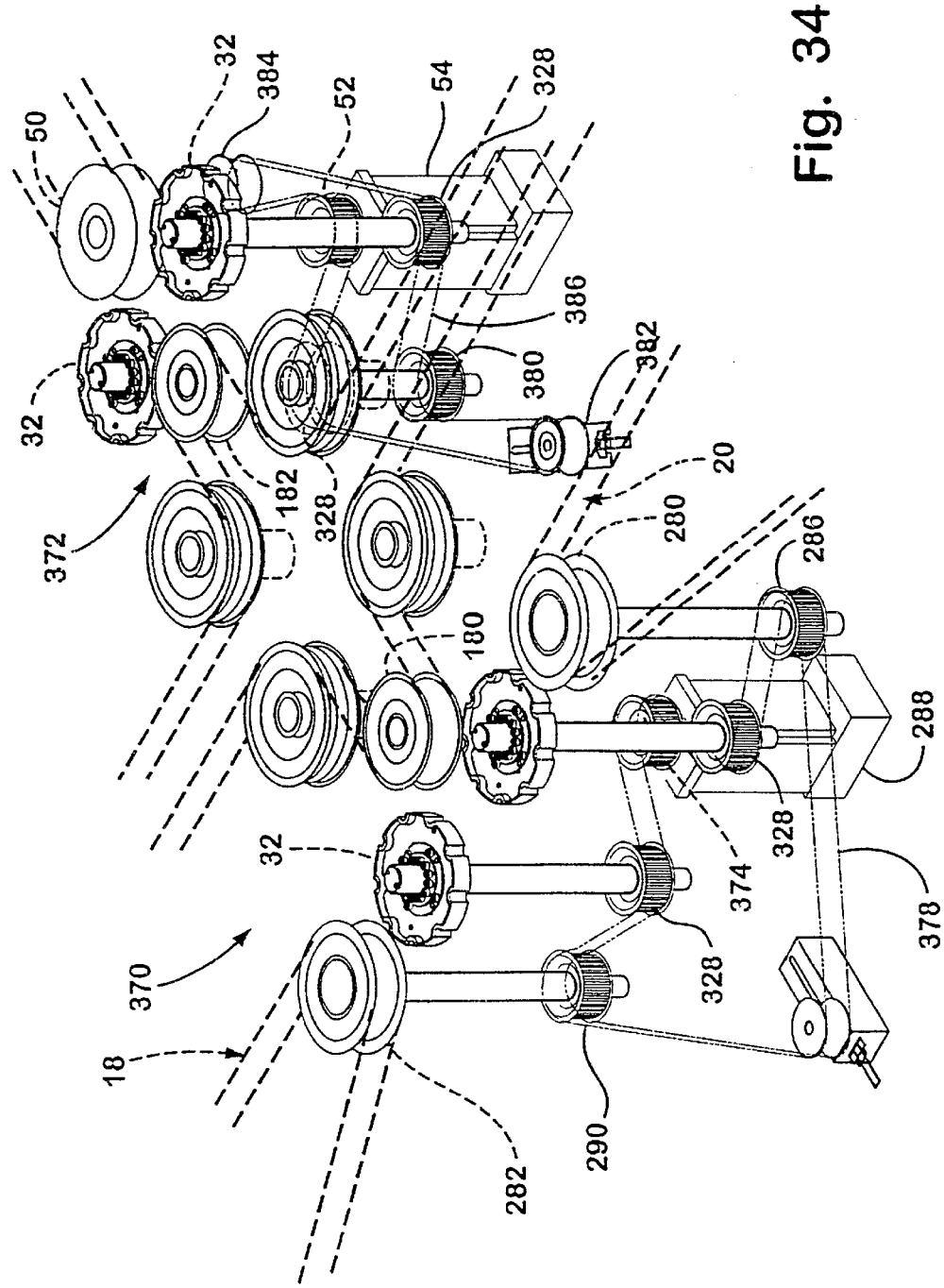
FIG. 34 illustrates the pulleys, idlers, and couplers associated with the conjunction of a branch processing station with the trunk.
Figure 35:
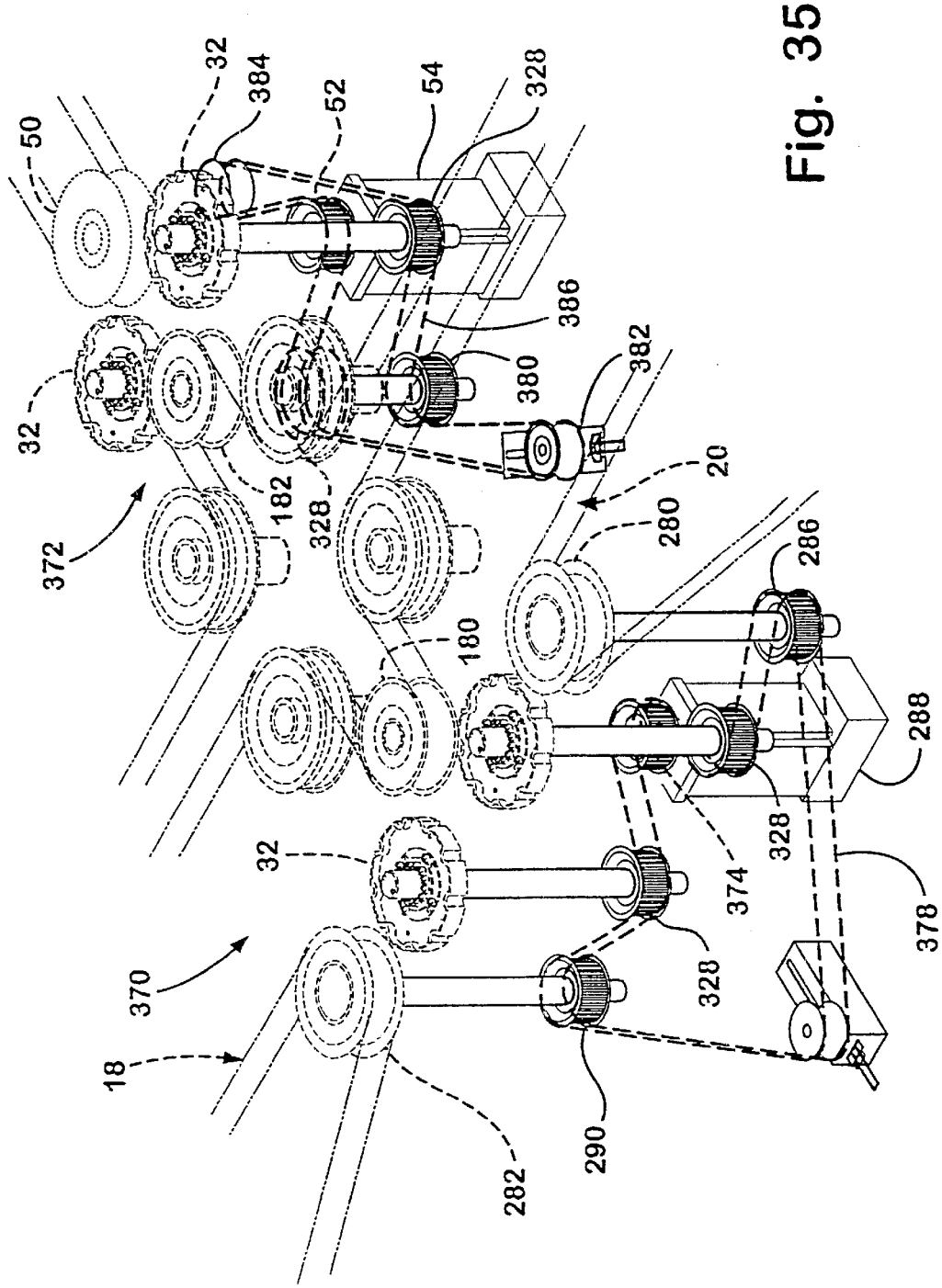
FIG. 35 shows the continuous motion drive belt for powering the adjacent continuous motion conveyors, couplers, and one side of the transfer device, and the indexing motion drive belt for powering the continuous feed indexer, couplers, and the indexing side of the transfer device.

Referring now to FIGS. 34 and 35, the upper pulley and drive sprocket arrangements are illustrated in FIG. 35. A continuous motion group 370 whose motion requires coordinated speed for proper interface and transfer of battery cans 34 in association with trunk 4 includes the first idler sprocket 280 of a receiving continuous motion conveyor 20, the continuous motion drive sprocket 180 of transfer device 8, and a coupler 32 to transfer cans 34 from sprocket 180 to sprocket 280. Likewise, a second coupler 32 is interposed between transfer device continuous motion drive sprocket 180 and second idler sprocket 282 of continuous motion conveyor 18. A second group of couplers and sprockets, indexed motion group 372, also requires a coordinated drive includes a coupler 32 for extracting battery cans 34 from indexed motion drive sprocket 182 of transfer device 8 and transferring cans 34 to the input side of drive sprocket 50 of continuous feed indexer 15. A second coupler 32 extracts battery cans 34 from the output side of drive sprocket 50 and delivers cans 34 to the indexed motion drive sprocket 182 of transfer device 8.

Referring now to FIG. 35, drive group 370 is powered by servo motor 288 from transfer device 8. In the preferred embodiment, a double-sided cogged drive belt 378 engages drive pulley 374 of transfer device 8 to provide the desired rotational motion to couplers 32 via their drive pulleys 328 and the rotational motion for continuous motion cogged pulleys 280 and 282 of continuous motion conveyors 20 and 18, respectively, via their respective idler pulleys 286 and 290. Proper tension to belt 378 is provided by belt tensioner 376. By interconnecting idler pulley 290 of continuous motion conveyor 18 with the idler pulley 286 of continuous motion conveyor 20, the speed of trunk 4 is coordinated and remains substantially constant from one end of processing system 2 to the other end.

The desired rotational motion for the indexed motion group 372 is provided by servo motor 54 which powers drive sprocket 50 and drive pulley 52 of continuous feed indexer 15. Drive pulley 52 is interconnected to pulley 328 of couplers 32 and to indexed motion drive pulley 380 which in turn drives index motion drive sprocket 182 of transfer device 8. In the preferred embodiment a doubled-sided cogged belt 386 is also used in this group in conjunction with idler 384 and tensioner 382 for providing the proper tension to belt 386. However, a drive system of intermeshed gears could also be utilized to impart the desired rotational motion to drive group 370 and indexed motion group 372.

Operation

Figure 36:
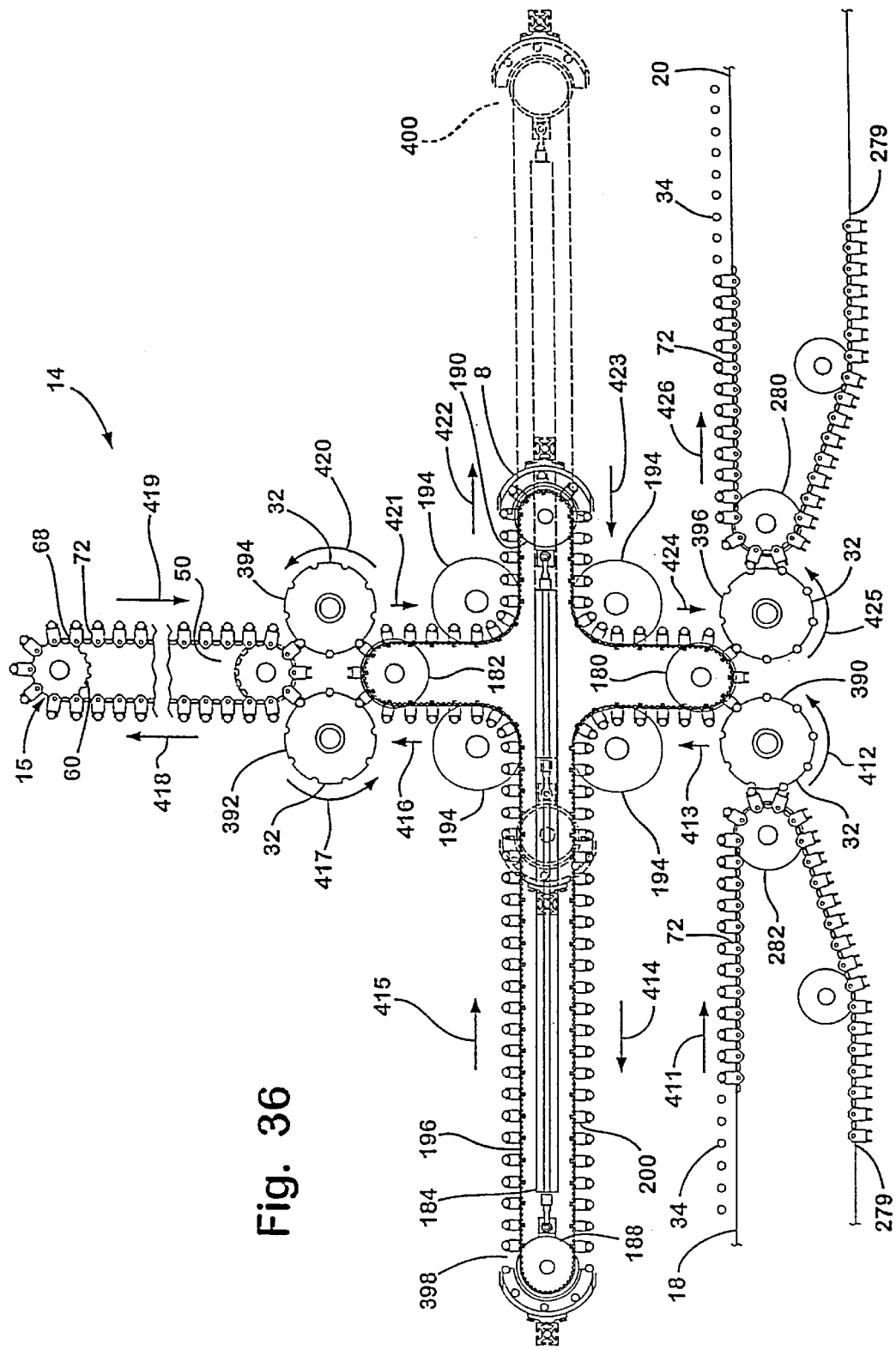
FIG. 36 is a plan view of a processing station, transfer device and adjacent continuous motion conveyors illustrating the path of travel of the battery cans therealong.
Figure 37:
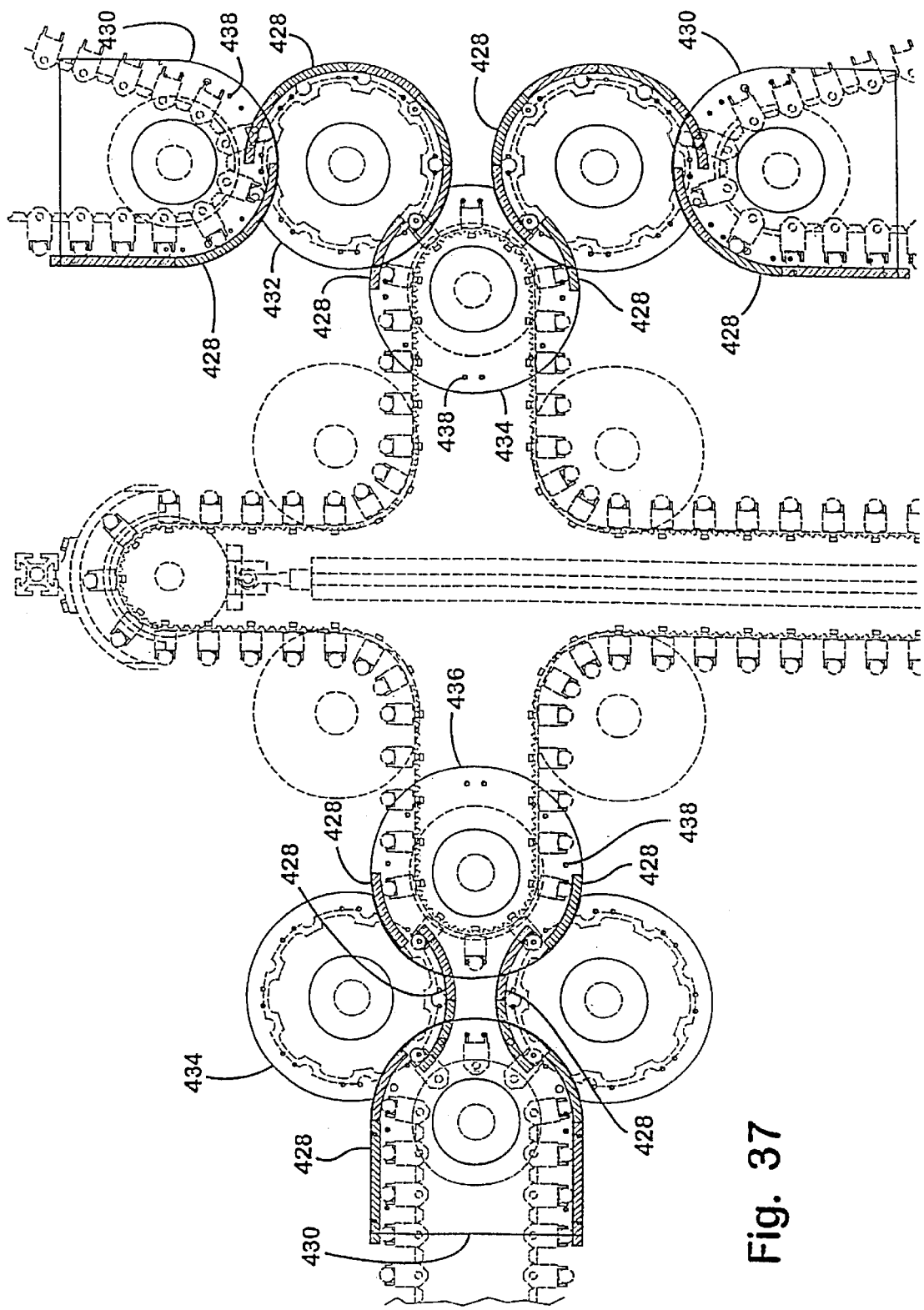
FIG. 37 shows the dead plate supports for the couplers, transfer ends of the continuous motion conveyor, transfer device, and continuous feed indexer.

FIG. 36 illustrates the operation of process station 14 with respect to the transportation of battery cans 34 removed from trunk 4 for processing on process station 14 and returned to trunk 4. As shown in FIG. 1, trunk 4 generally comprises a plurality of continuous motion conveyors arranged in an end-to-end configuration such as conveyors 18 and 20 with process stations positioned at ends of the individual continuous motion conveyors. Process station 14 as shown in FIG. 36 in relative operating position with respect to trunk 4 is typical of the process station to trunk interface and illustrates the preferred embodiment with respect to the processing of battery cans 34. However, an infinite number of arrangements of components are possible.

Belt assemblies such as belt assembly 279 of continuous motion conveyors 18 and 20, belt assembly 196 of transfer device 8, and belt assembly 68 of continuous feed indexer 15 all progress around their respective frames in a clockwise direction. All couplers 32 rotate in a counterclockwise direction. However, the respective directions of travel can be reversed with couplers 32 rotating in a direction opposite the belts.

Transport belt assembly 279 of continuous motion conveyor 18 transports battery cans 34 along directional arrow 411. Each battery can 34 is retained by a cleat 72 of belt assembly 279. As cans 34 progress around idler sprocket 282 they are transferred to first input coupler 390 and proceed therearound in captive fashion in a counterclockwise direction as indicated by directional arrow 412. First input coupler 390 is also adjacent continuous motion drive sprocket 180 of transfer device 8 and cans 34 are transferred from coupler 390 to individual cleats 200 of belt assembly 196 on transfer device 8. The transfer point of cans 34 occurs at the tangent point coupler 390 and sprockets 282 and 180. All can 34 transfers occur in like manner throughout system 2.

As previously discussed, carriage 184 with input flying idler 188 and output flying idler 190 at its respective ends divides transfer device 8 into a continuous motion side adjacent to trunk 4 and an indexed motion side adjacent to continuous feed indexer 15. Cans 34 progress along transfer device 8 in a continuous motion manner according to directional arrows 413 and 414. As cans 34 progress around input flying idler 188, their motion along directional arrows 415 and 416 is transformed into an indexed motion. The indexed motion comprises alternating periods of belt assembly 196 translation having a speed greater than the continuous motion speed of trunk 4 and a periods of dwell in which the motion of cans 34 is stopped.

In the preferred embodiment, the average speed of the indexed motion is slightly greater than the continuous motion speed of trunk 4. The translation component along the indexed side of transfer device 8 is determined by the number of cans simultaneously processed on continuous feed indexer 15. Thus, if six battery cans 34 are simultaneously processed as shown by processing station 14 in FIG. 1, the translation component of indexed motion comprises positionally incrementing belt assembly 196 a distance equivalent to six times the distance between adjacent cleats 200. The dwell component of the indexed motion corresponds to the time required to accomplish the required processing of cans 34 by process modules 12 on continuous feed indexer 15. Thus, the continuous motion of belt assembly 196 along directional arrows 413 and 414 will cause the leftward translation of dancer carriage 184 to an input rich position 398 of transfer device 8.

Concurrently, the indexed motion along directional arrows 415 and 416 causes incremental rightward translations of dancer carriage 184 toward an output rich position 400. The continuous motion along directional arrows 413 and 414 during the dwell component of the indexed motion returns carriage 184 toward input rich position 398. Since the average speed of the indexed motion along directional arrows 415 and 416 is slightly faster than the continuous motion speed of trunk 4, each cycle of indexed motion-dwell causes dancer carriage 184 to slowly migrate to output rich position 400 over a period of indexed motion cycles. Upon dancer carriage 184 reaching output rich position 400 continuous feed indexer 15 is temporarily disabled by process station controller 616 thereby allowing the continuous motion of drive sprocket 180 to reset transfer device 8 to input rich position 398. Upon transfer device 8 being reset to input rich position 398, continuous feed indexer 15 is again enabled to resume indexed processing of cans 34. The oscillating motion of dancer carriage 184 and its resetting from output rich position 400 to input rich position 398 is graphically illustrated in FIG. 67 as a time function and is additionally discussed below with respect to the control system.

As cans 34 progress along directional arrow 416 and around indexed motion drive sprocket 182, each can 34 is captured by second input coupler 392 and progresses in a counterclockwise direction 417 and is then in turn captured by cleats 72 of belt assembly 68 on continuous feed indexer 15. Cans 34 progress along continuous feed indexer 15 as shown by directional arrow 418 and are processed by one or more process modules (not shown) during the dwell period of the index dwell motion of belt assembly 68. After processing, cans 34 proceed around idler sprocket 60 and along directional arrow 419 in the same manner of indexed motion for return to trunk 4. Upon reaching drive sprocket 50, processed cans 34 are handed off to first output coupler 394 and proceed therearound in a counterclockwise direction as indicated by directional arrow 420.

First output coupler 394 transfers cans 34 to individual cleats 200 of belt assembly 196 on transfer device 8 on the right or output side of transfer device 8. Cans 34 continue to proceed in an indexed motion-dwell manner along directional arrows 421 and 422 to output flying idler 190. After rounding output flying idler 190, cans 34 transition to continuous motion and proceed according to directional arrows 423 and 424. Upon reaching continuous motion drive sprocket 180, second output coupler 396 captures individual cans 34 and transports them in a counterclockwise manner according to directional arrow 425 whereupon cans 34 are handed off to individual cleats 72 at drive sprocket 280 of continuous motion conveyor 20. Cans 34 then proceed in a continuous motion manner along directional arrow 426 to be transported to one or more additional process stations. All battery can 34 transfers are accomplished at the tangential points of dials 332 and interfacing belt assemblies.

Referring now to FIGS. 37–41, a plurality of dead plates 428 are arranged about the periphery of those areas where cans 34 are transported in an arcuate manner. Dead plates 428 function to retain cans 34 within the carrying cleats 72 or 200 and within pockets 350 of couplers 32. In this manner, dead plates 428 serve to prevent cans 34 from disengaging from the magnets as a result of the centrifugal force imparted to cans 34 around couplers 32 or end sprockets of continuous motion conveyors 18 and 20, transfer device 8, or continuous feed indexer 15.

Secondarily, dead plates 428 also function to ensure that cans 34 are properly handed off from a cleat 72 or 200 to a coupler 32 or the reverse thereof. To properly position dead plates 428 along the path of cans 34, dead plate supports such as dead plate support 360 are mounted to an upper end of spindle assemblies such as spindle assembly 32 in FIG. 30. Each fixed drive and idler sprocket and coupler involved with the transfer of battery cans 34 have at least one dead plate and a dead plate support associated therewith.

The dead plate supports in the preferred embodiment, have four basic configurations. D-shaped dead plate support 430 is mounted to the top of the spindle assembly associated with the drive and idler sprockets of continuous motion conveyors 18 and 20 and of continuous feed indexer 15. Dead plate support 430 has an arcuate end and a linear end, wherein the linear end is oriented toward the central frame such as frame 40 of continuous feed indexer 15 and the arcuate end is coaxial with the sprocket shaft and is oriented away from the outer end of the sprocket. The remaining dead plate supports can be circular such as dead plate support 436, can have one arcuate cut-out in its periphery such as dead plate support 432 or two arcuate cut-outs in its periphery such as dead plate support 434 wherein the cut-outs are separated by 90 degrees. The arcuate cut-outs permit the nesting of dead plate supports for the proper mounting of dead plates 428.

The differently configured dead plate supports 432–436 also facilitate the ability to position individual elements such as continuous motion conveyors 18 and 20, transfer device 8, and continuous feed indexer 15 at any desired angular relationship one to the other. Dead plate supports 430–436 are coplanar to provide a continuous surface upon which to mount dead plates 428. Each of dead plate supports 430–436 have a plurality of dowel pin holes 438 at regularly spaced predefined intervals near the perimeter of the dead plate supports. Dowel pins are partially received within holes 438 such that a portion of the dowel pin extends about a top surface of the dead plate support for engagement with a groove, such as groove 444 in FIG. 40, in a bottom surface of dead plate 438. A dead plate 428 can bridge adjacent nested dead plates 430–436.

Figure 41:
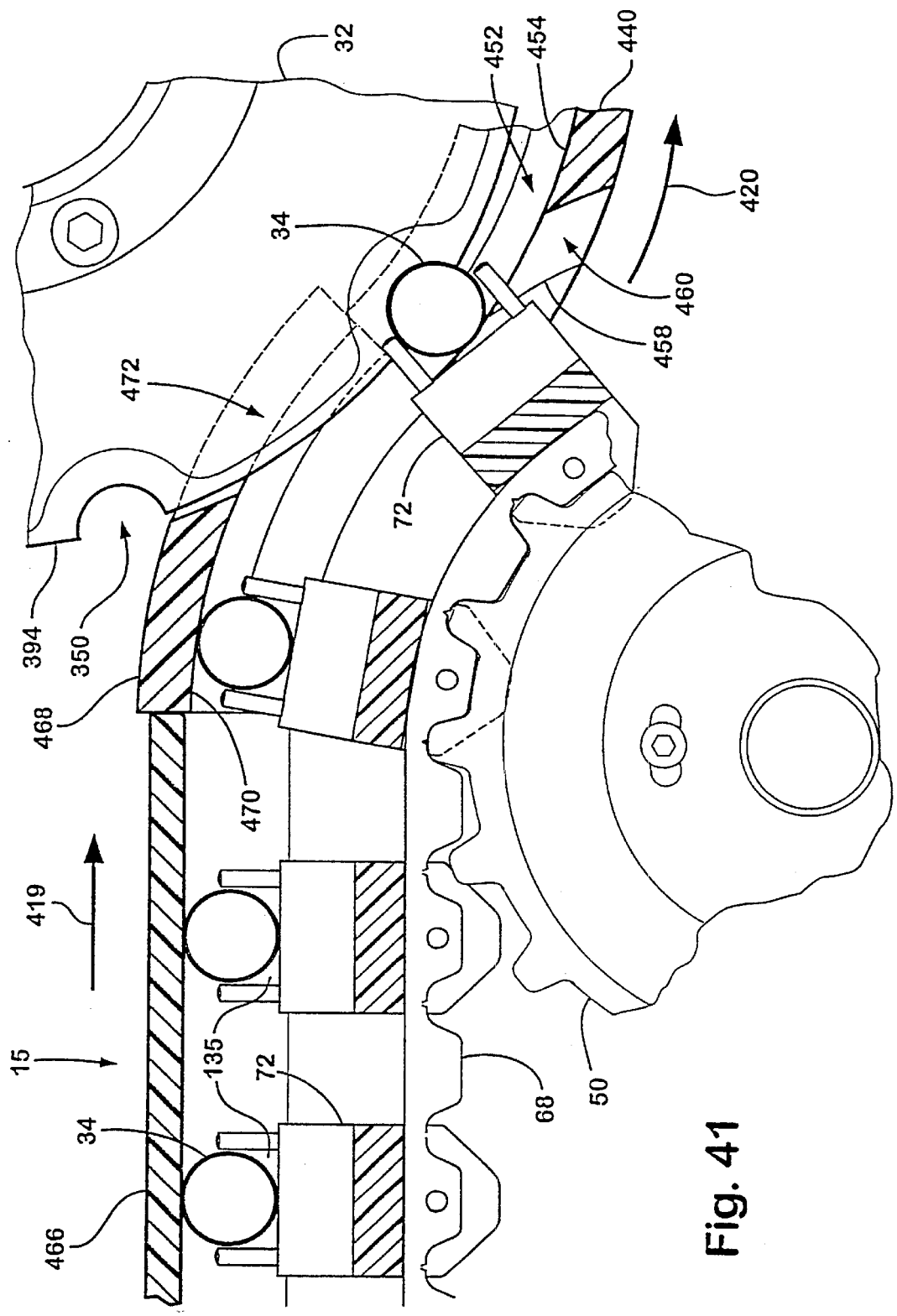
FIG. 41 is a partial cross-sectional view of the battery can transfer from the continuous feed indexer to the adjacent coupler.

A typical dead plate is illustrated in FIGS. 38–40 as dead plate 440. Dead plate 440 corresponds to one of the dead plates positioned between drive sprocket 50 of continuous feed indexer 15 and first output coupler 394 as shown in FIG. 41. Dead plate 440 has a bottom surface 442 which defines a groove 444 having a width to closely receive the locating dowel pins protruding from dead plate supports 430–436. Dead plate 440 also has at least one threaded hole 446 in a bottom portion or other clamping mechanism to facilitate the securing of dead plate 440 to its corresponding dead plate support. The bottom portion of dead plate 440 has a shelf 448 which corresponds to the bottom of a battery can 34 as can 34 is transported around processing system 2. Similarly, a top portion of dead plate 440 has an upper lip 450 which is vertically disposed above shelf 448. Shelf 448 and lip 450 are vertically separated by web 454 and in combination define a channel 452 for the passage of at least a portion of a vertically oriented battery can 34 therealong.

Web 454 is either solid or can have a window 456 defined at one end thereof. Window 456 may be rectilinear or, as shown in FIGS. 38 and 39 have a tongue 458 which further defines at one end of window 456 and in combination with an upper portion of web 454, a slot 460 and in combination with a bottom portion of web 454, a slot 462. The purpose of windows 456 are to permit the passage therethrough of dial 330 of couplers 32 or of cleats 72 or 200 at the point of battery can 34 hand off from a coupler dial 330 to a cleat 72 or 200 or from a cleat 72 or 200 to a coupler dial 330. Slots 460 and 462 permit the unrestricted passage of the upper and lower flanges of cleats 72 and 200 therethrough. The size and configuration of window 456 and slots 460 and 462 correspond to the width of dials 330 and to the vertical dimensions of cleats 72 or 200 such that during the operation of processing system 2, there is no portion of dead plate 440 which interferes with the passage of a dial 330 or cleats 72 or 200 as they pass through window 456 and slots 460 and 462.

Referring to FIG. 41, transport belt assembly 68 is illustrated at drive sprocket 50 of continuous feed indexer 15 wherein battery cans 34 are handed off to first output coupler 394 after processing on continuous feed indexer 15. As cleats 72 carry battery cans 34 toward drive sprocket 50, straight dead plate 466 ensures that battery cans 34 are retained in recesses 135 of cleats 72. As belt assembly 68 engages drive sprocket 50 and begins to turn around an outer periphery of drive sprocket 50, cans 34 encounter a curved dead plate 468 having a web 470 whose inside surface is maintained at a constant radius from the center of drive sprocket 50. Dead plate 468 has a rectilinear window 472 through a central portion thereof to permit first output coupler 394 to rotate therein.

Coupler 394 is synchronized with belt assembly 68 such that as belt assembly 68 progresses around drive sprocket 50, pockets 350 defined by the outer perimeter of coupler 394 engage and receive a portion of a battery can 34. A second dead plate, dead plate 440 is abutted to the opposite end of dead plate 468 and is oriented to radially conform to the outer periphery of coupler 394 such that web 454 and tongue 458 engage the portion of battery can 34 within recess 135 of cleat 72 and opposite from pocket 350 of coupler 394. At the point of transition from dead plate 468 to dead plate 440, battery can 34 is captured by both coupler 394 and cleat 72. As coupler 394 rotates in a counterclockwise direction according to directional arrow 420, web 454 and tongue 458 engage the portion of battery can 34 received by cleat 72. Web 454 and tongue 458 operate to disengage battery can 34 from cleat 72 and to maintain battery can 34 in an engaged relationship in pocket 350 of coupler 394.

All transferring of battery cans 34 from a carrying cleat 72 or 200 to a coupler 32 and the transferring of a battery can 34 from a coupler 32 to a cleat 72 or 200 are accomplished in a similar manner throughout processing system 2. The transfer of battery cans 34 uses alternately oriented dead plates to guide a battery can 34 about a periphery of a carrying element from which the can 34 is to be discharged, engaging a synchronized carrying recess in a receiving element, and transferring carriage of the battery can 34 to the receiving element with the oppositely oriented dead plate.

Process Modules

Figure 42:
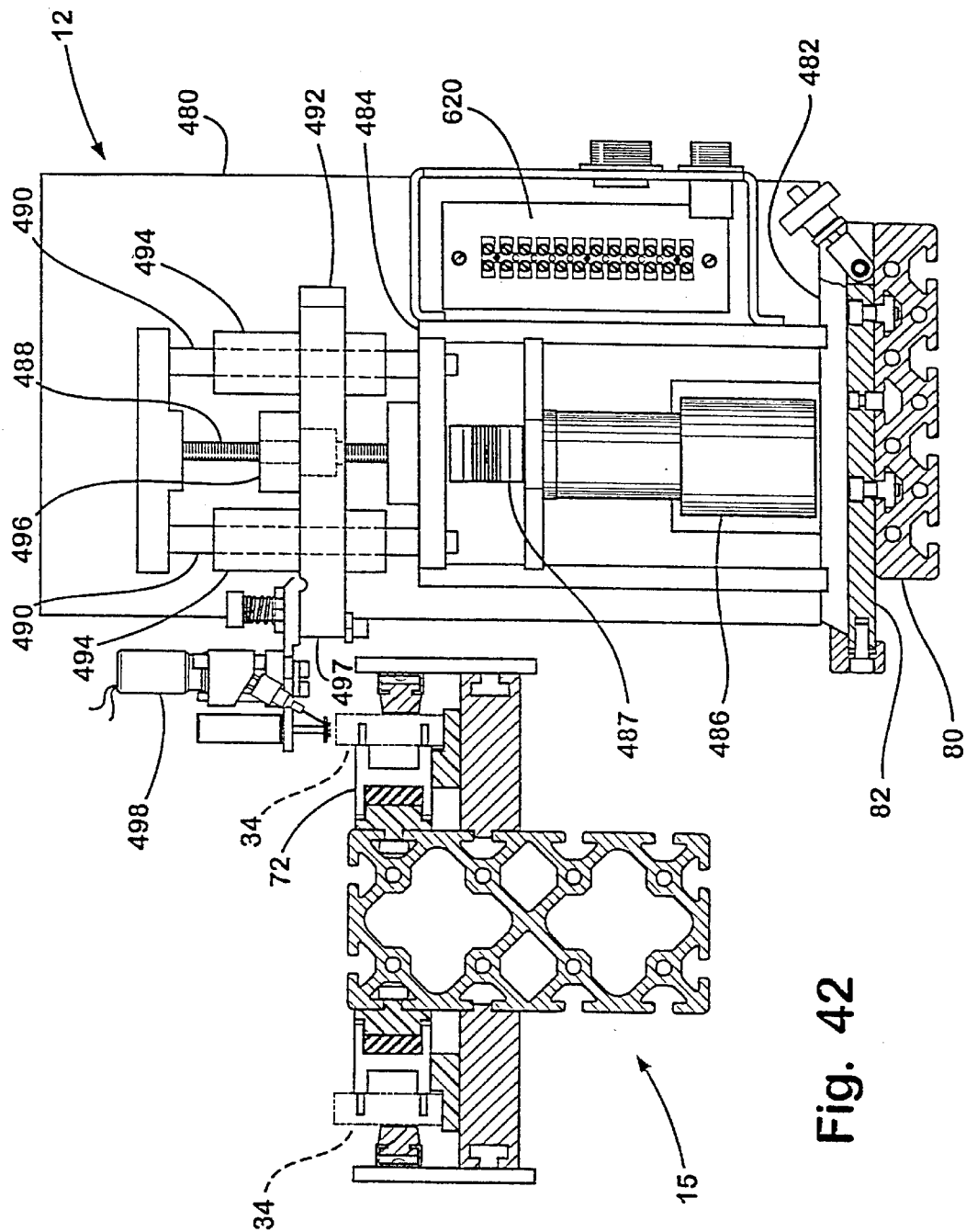
FIG. 42 is an elevation view of a first embodiment of a process module for mounting on a continuous feed indexer.

As shown in FIG. 1, a branch processing station such as station 6 has one or more process modules 10 mounted to a continuous feed indexer 7 to acquire control of a battery can 34 during the dwell period of the indexed motion, perform at least one process on battery can 34, and then return control of battery can 34 to indexer 7. A second branch processing station 14 has an alternately configured process module 12 mounted to continuous feed indexer 15 for performing a second manufacturing process on battery cans 34. One configuration of process module 12 as mounted to continuous feed indexer 15 is shown in FIG. 42. Process module 12 includes a base 482 which is received in process module mount 82 attached to process module support 80. A process module controller 620 is associated with each chassis 480 and can be mounted interiorly or exteriorly of chassis 480. Controller 620 is in communication with process station controller 614 and control coordinator 610 and includes signal inputs for receiving signals from controller 614 and coordinator 610. The synchronized control of the operation of process module 12 by process module controller 620, process station controller 614 and control coordinator 610 is discussed in greater detail below. Process module controller 620 controls the operation of application head 498 in a synchronized manner with the dwell portion of the index motion-dwell of continuous feed indexer 15.

Process module 12 has an internal frame 484 to which is mounted servo motor 486. Servo motor 486 in turn is coupled to vertically oriented rotatable threaded shaft 488 with coupler 487. A pair of guide shafts 490 are supported by and extend upwardly from frame 484 and flank the upper portion threaded shaft 488 in a parallel manner. A carriage 492 has a pair of sleeves 494 in which guide shafts 490 are received such that carriage 492 is vertically slidable along guide shafts 490. Carriage 492 further has a threaded element 496 attached thereto and engages rotatable threaded shaft 488. As servo motor 486 is operated, carriage 492 is vertically translated along guide shafts 490 through the rotation of threaded shaft 488 in threaded element 496. Carriage 492 can be translated upwardly by rotating servo motor 486 in one direction and lowered by rotating servo motor 486 in an opposite direction. A front end 497 of carriage 492 extends through chassis 480 proximate to continuous feed indexer 15. Application head 498 is mounted to carriage end 497.

Process module mount 82 positionally locates process module 12 along the longitudinal axis of continuous feed indexer 15 such that when a battery can 34 and cleat 72 are at the dwell portion of the indexed motion-dwell sequence, application head 498 is directly aligned with battery can 34 in a cleat 72. As battery can 34 dwells on continuous feed indexer 15, process module controller 620 activates servo motor 486 to rotate in a direction to lower carriage 492 and bring application head 498 into an operational processing position. Application head 498 is then activated to perform its desired process which when completed, is vertically raised from its engagement with can 34 by reversing the direction of servo motor 486 and raising carriage 492 on guide shafts 490. Upon disengagement of application head 498, cleats 72 and battery cans 34 retained therein are indexed along continuous feed indexer 15.

Figure 43:
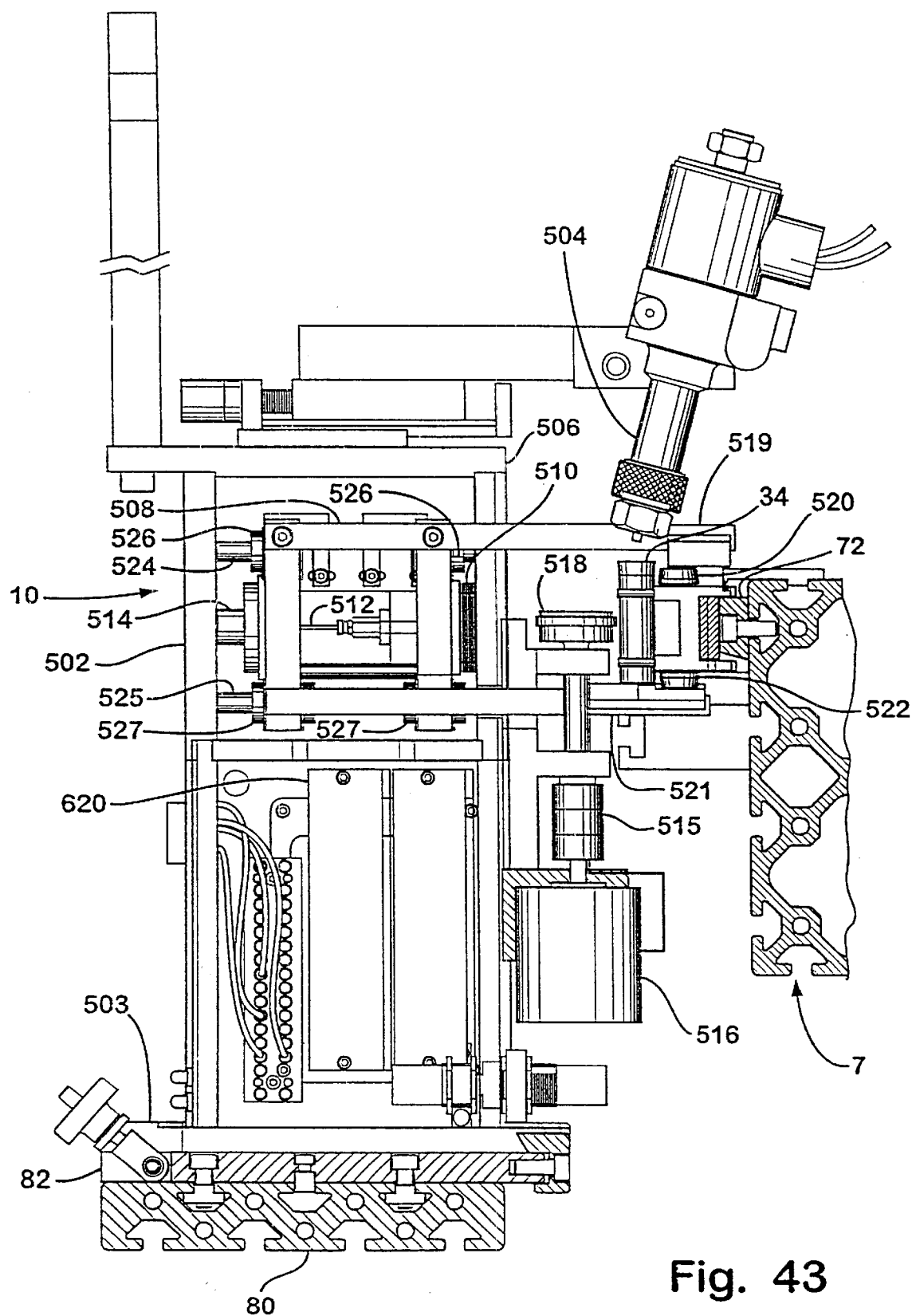
FIG. 43 is a side elevational view of a second embodiment of a process module mounted to a continuous feed indexer for extracting a battery can from the indexer for processing and return to the indexer.
Figure 44:
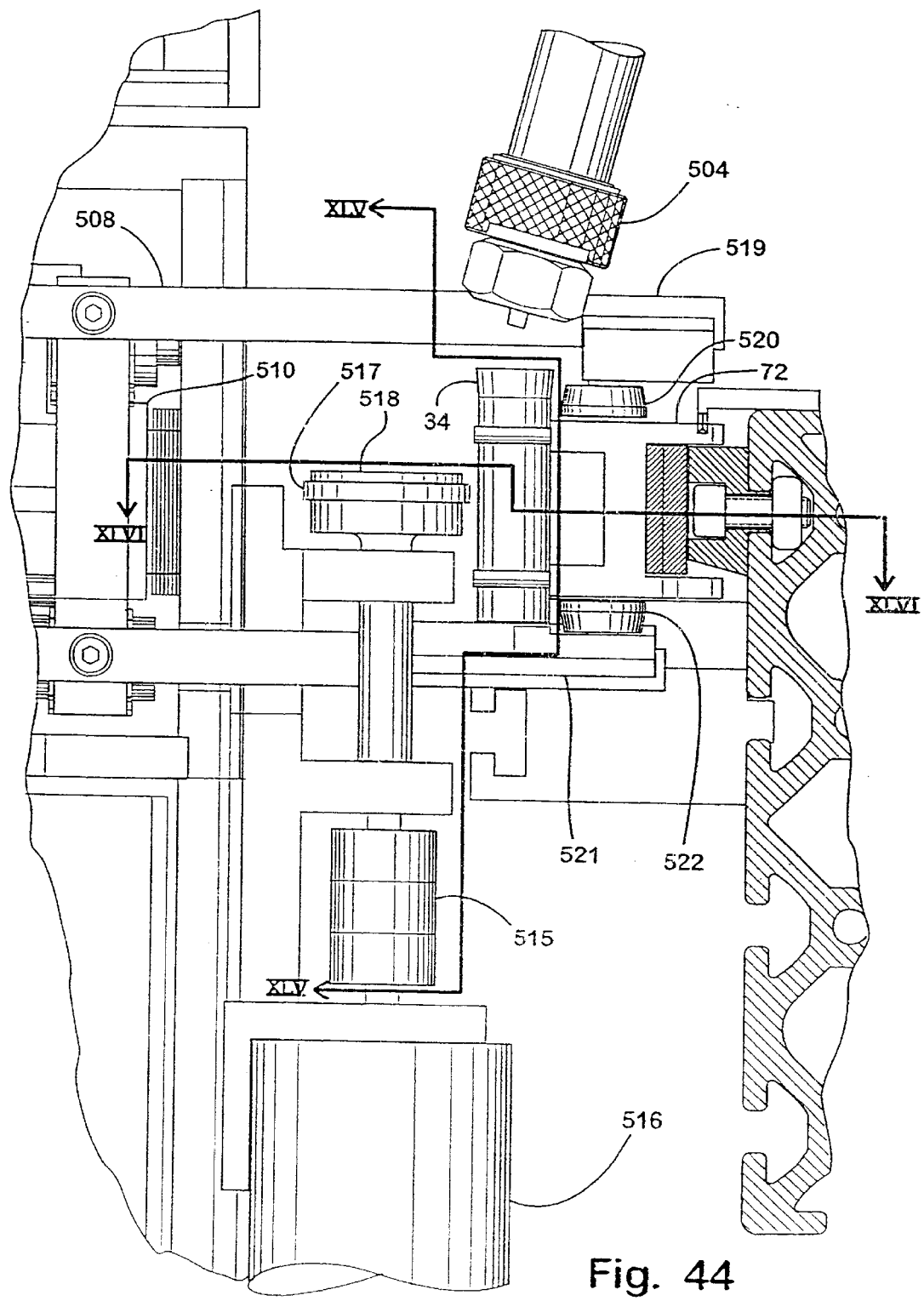
FIG. 44 is an enlarged partial cross section of the battery can processing mechanism of FIG. 43.
Figure 45:
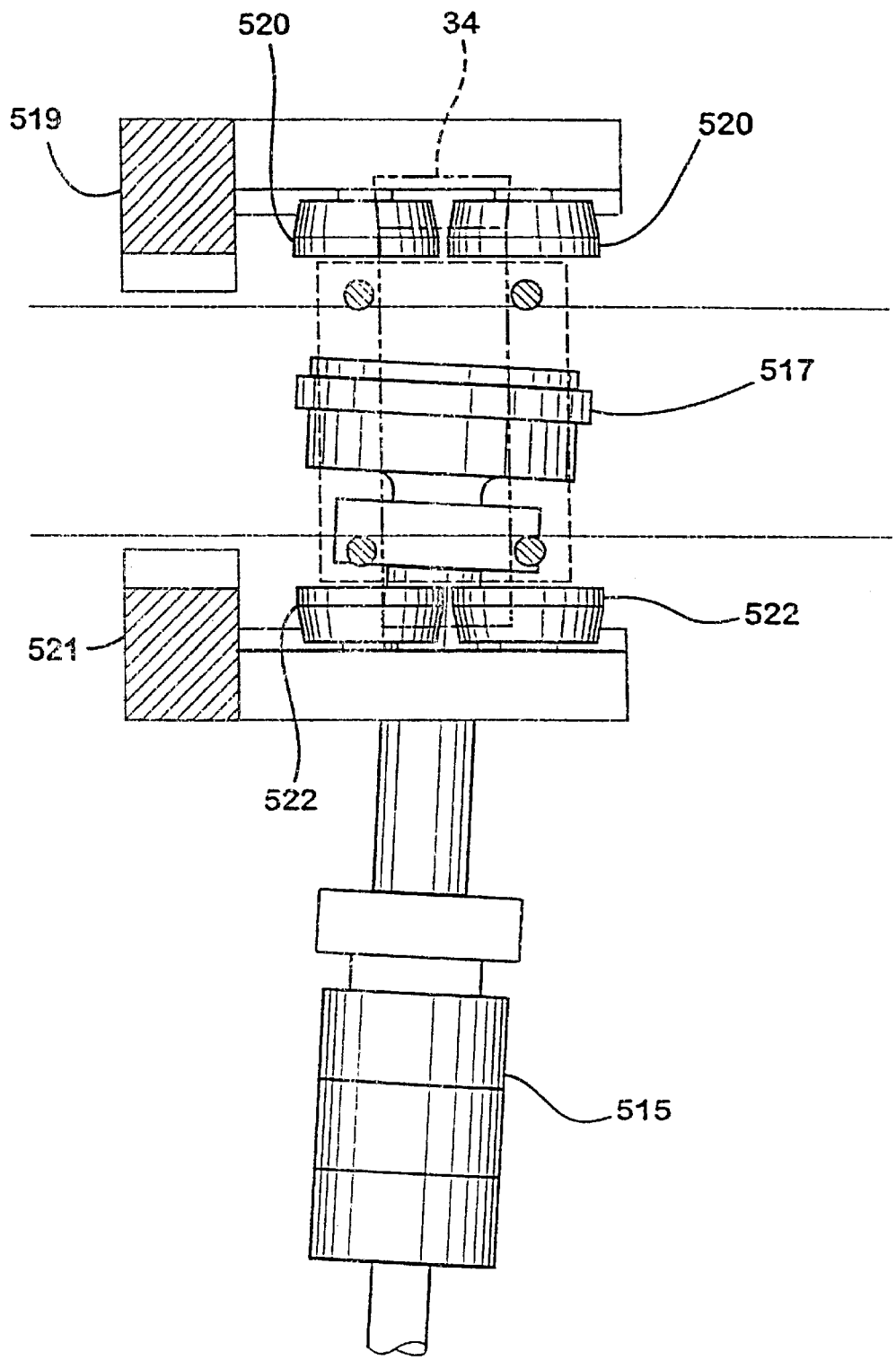
FIG. 45 is a front elevational view taken through line XLV—XLV of FIG. 44 showing the canted drive for spinning the battery can during processing.

Referring now to FIG. 43 a second type of process module, process module 10 has a chassis 502 to which is mounted a process module controller 620 which in turn communicates with process station controller 614 of branch process station 14 and control coordinator 610 in a similar manner as process module 12. A process module controller 620 is associated with each chassis 502 and can be mounted interiorly or exteriorly of chassis 502. Chassis 502 includes a base 503 which is received in process module mount 82 on support 80 of continuous feed indexer 7. Process module 10 has a fixed application head 504 mounted to a top 506 of chassis 502. Process module 10 differs from process module 12 in that process module 10 captures can 34 and disengages can 34 from cleat 72 to position can 34 in a processing relationship with fixed head 504.

A horizontally translatable carriage 508 has an upper arm 519 and a lower arm 521 extending out of the front of process module 10 as process module 10 faces continuous feed indexer 7. Carriage 508 has upper guide sleeves 26 sleeved over upper guide rails 24 and also has lower guide sleeves 527 sleeved over lower guide rails 525 in such a manner as to permit a horizontal translation of carriage 508 along rails 526 and 525 in a precise, controlled manner. An actuator 510 is interiorly attached to the front of chassis 502 and has a connecting rod 512 extending rearwardly therefrom which is further connected to carriage 508. Process module controller 620 generates signals to activate actuator 510 to initiate operation of process module 10 during the dwell periods of the indexed motion-dwell of cans 34 and cleat 72 about continuous feed indexer 7. When an actuation signal is received by actuator 510, horizontal motion is imparted to connecting rod 512 thereby translating carriage 508 to the left as shown in FIG. 43. Upon completion of the processing by fixed application head 504, a second signal is sent to actuator 510 to impart an opposite horizontal movement of carriage 508 to disengage battery can 34 from process module 10.

As shown in FIGS. 44–47, the horizontal movement of carriage 508 in process module 10 results in a corresponding horizontal movement of upper and lower arms 519 and 521, respectively. Upper arm 519 has a pair of upper idlers 520 depending therefrom and rotatable thereon. Likewise, lower arm 521 has a pair of lower idlers 522 rotatably mounted thereon such that idlers 520 and 522 are in a vertically opposed relationship and are disposed vertically one set from the other by a distance which is slightly greater than the vertical height of cleat 72. Arms 519 and 521 are vertically positioned such that cleat 72 passes between idlers 520 and 522 in an unobstructed manner when cleats 72 and battery cans 34 are translated along continuous feed indexer 7. Process module 10 also includes a vertically oriented servo motor 516 which, through coupler 515, is drivingly connected to spin drive 518. Spin drive 518 is slightly canted with respect to the vertical.

Figure 47:
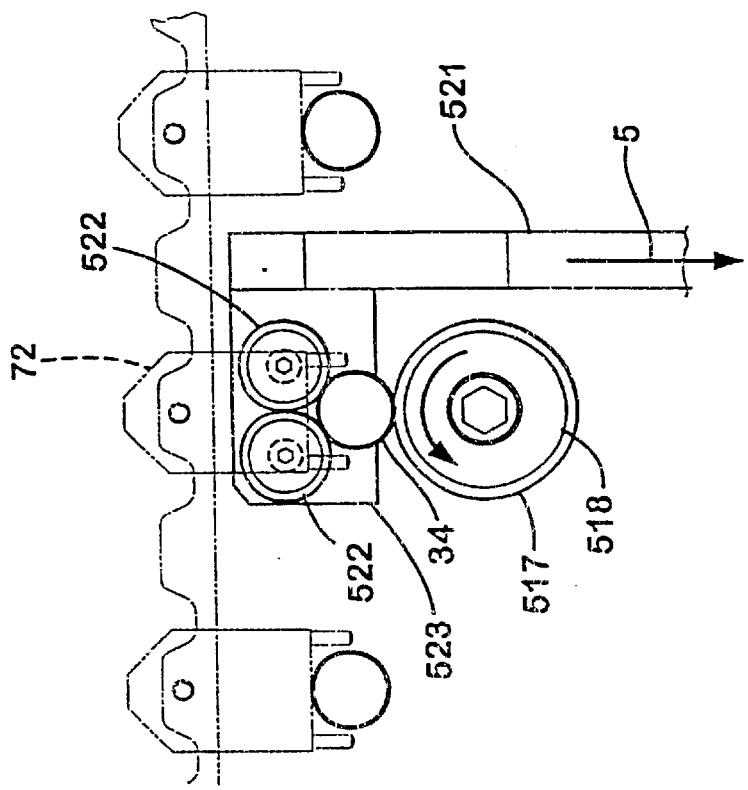
FIG. 47 is a top plan view of the battery engaging mechanism of FIG. 46 showing the mechanism having extracted the battery from a cleat and spinning the battery can for processing.
Figure 46:
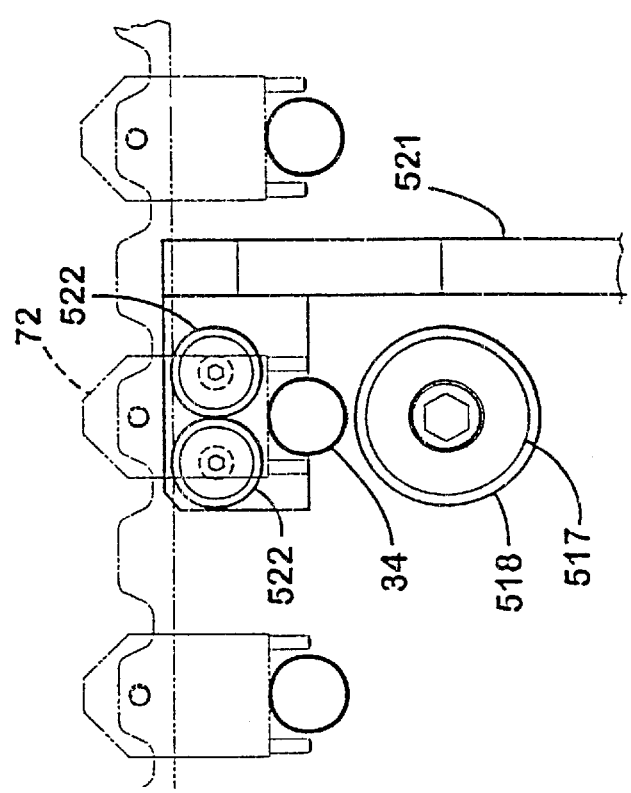
FIG. 46 is a top plan view taken along the line XLVI—XLVI of FIG. 44 showing the battery can extraction mechanism disengaged from the battery can.

As cleat 72 and battery can 34 dwell along continuous feed indexer 7, process module controller initiates the actuation of carriage 508 which translates to the left. As carriage 508 and arms 519 and 521 translate, idlers 520 and 522 contact battery can 34 and disengage can 34 from cleat 72. Can 34 nestles between laterally adjacent idlers 520 and laterally adjacent idlers 522. Idlers 520 and 522 translate sufficiently to bring can 34 into contact with driving rib 517 of spin drive 518 as shown in FIG. 47. When can 34 is fully engaged with idlers 520 and 522 and with drive rib 517 of spin drive 518, can 34 is disengaged from cleat 72; however, can 34 has not been sufficiently displaced to be removed from the magnetic field which normally retains can 34 in cleat 72. As battery can 34 contacts drive rib 517, spin drive 518 imparts a spinning motion to can 34, and as a result of spin drive 518 being canted off vertical, a slight downward force is imparted to can 34 to maintain the bottom of can 34 in contact with bottom support 523. Bottom support 523 has a single ball bearing (not shown) upon which the bottom of can 34 rests to facilitate the desired spinning of can 34 while an internal coating is applied by fixed application head 504. Upon the internal coating being applied to can 34, process module controller 620 initiates voice coil actuator 510 to translate carriage 508 to the right and thereby disengage idlers 520 and 522 from can 34. Upon disengagement from can 34, the magnetic field of cleat 72 again attracts and captures can 34 within recess 135. Upon recapturing of can 34 in recess 135, cleats 72 and cans 34 are indexed along continuous feed indexer 7 and the process is repeated with a subsequent can 34.

Process modules 10 and 12 as described above are illustrative of representative process modules and their corresponding operation with respect to and in conjunction with continuous feed indexers 7 and 15. Those skilled in the art will understand that variations and other configurations of process modules are possible for processing of other varied articles of manufacture and for performing alternative processes on battery cans during the manufacture of dry cell batteries.

Process Module Mounts

Figure 48:
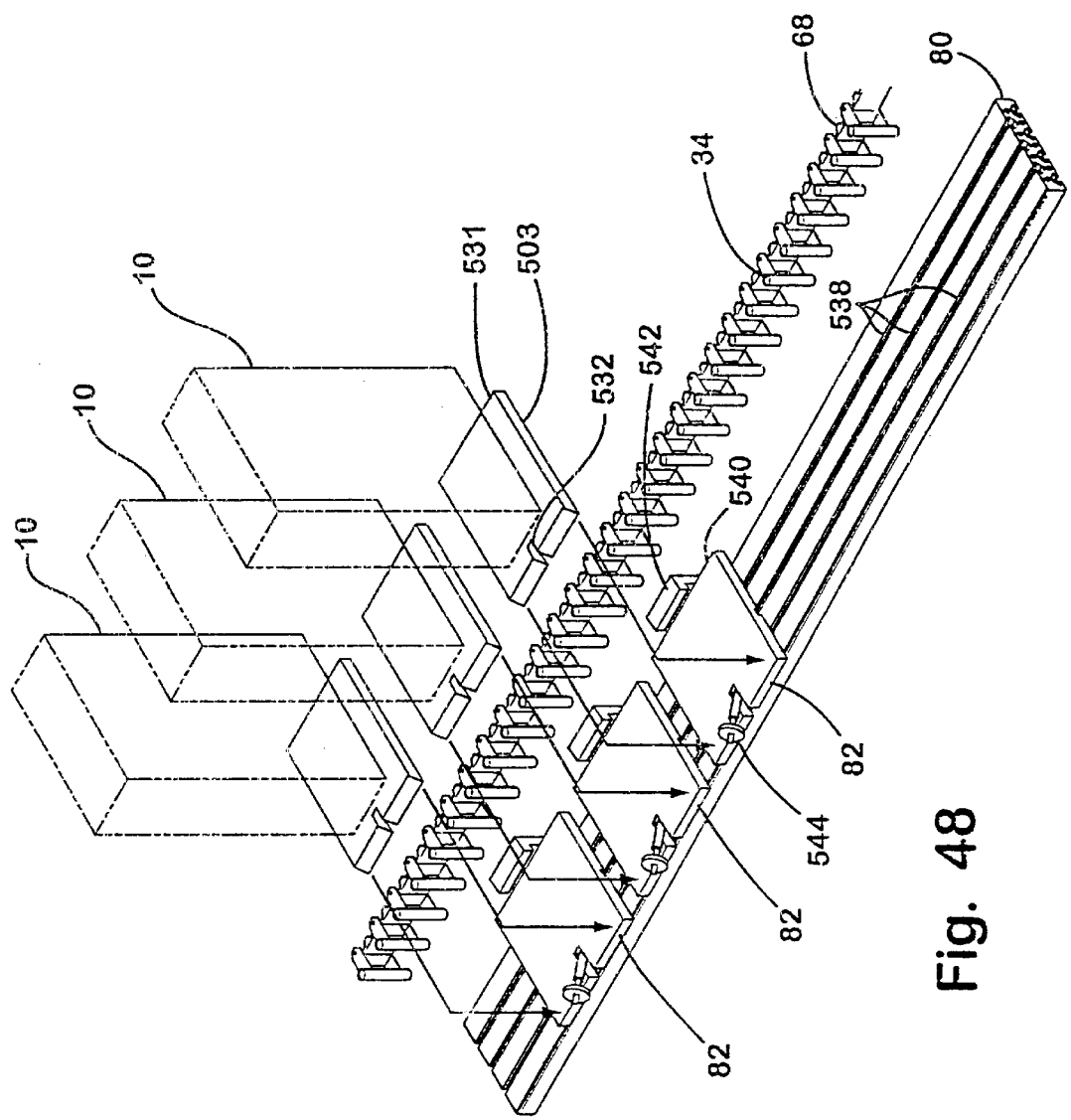
FIG. 48 is an exploded perspective view of a precision mount for mounting the process modules to a continuous feed indexer.

Referring now to FIG. 48, a process module support 80 is shown with a plurality of regularly spaced process module mounts 82 mounted thereto in relationship to indexer belt assembly 68. The lateral spacing of mounts 82 along continuous feed indexers corresponds to the number of cans to be simultaneously processed and the programmed sequence of dwell periods of belt assembly 68 to ensure that all battery cans 34 are processed. Process module mount 82 includes a mount platform 40 which is secured in slots 538 of support 80. Platform 540 has a planar upper surface for receiving base 503 of a process module such as process module 10. Platform 540 has attached to one end thereof a retainer 542 for receiving a front edge 531 of process module base 503 and platform 40 has at an opposite end thereof quick release fastener 544 which is engagable in slot 532 at a rear of process module base 503. Process module mount 82 functions to precisely locate process modules such as process module 10 with respect to its corresponding continuous feed indexer. Process module 10 and its attached application head can be positionally precalibrated off-line from the continuous feed indexer such that when process module 10 is mounted on mount 82 the application head associated therewith is repeatedly positioned with respect to battery cans 34 carried by belt assembly 68. Retainer 542 of process module mount 82 includes both lateral and longitudinal locating features thereby rendering like calibrated process modules interchangeable. Quick release fastener 544 facilitates the rapid removal and installation of process modules requiring replacement to minimize the downtime associated with a malfunctioning processing system 2.

Control System Hardware

The high speed manufacturing system 2 of the present invention employs a flexible and versatile distributed control system for monitoring and controlling the operation of the high speed manufacturing system. The distributed control system provides the functions necessary to control the high speed manufacturing system including control of the operation of the continuous motion conveyor, continuous feed indexers, transfer devices, as well as controlling the individual process modules associated with each branch processing station. In addition to controlling the various components of the high speed manufacturing system, the control system controls the routing of articles of manufacture throughout the high speed manufacturing system, monitors the manufacturing processes, tracks each article, and logs the history of each article on the manufacturing line, and is further capable of routing experimental articles to experimental process modules and tracking and logging the history of the experimental articles as well. The control system allows for experimental processing, qualification runs and other process testing to occur without taking the manufacturing line out of a normal manufacturing production operation.

Figure 49:
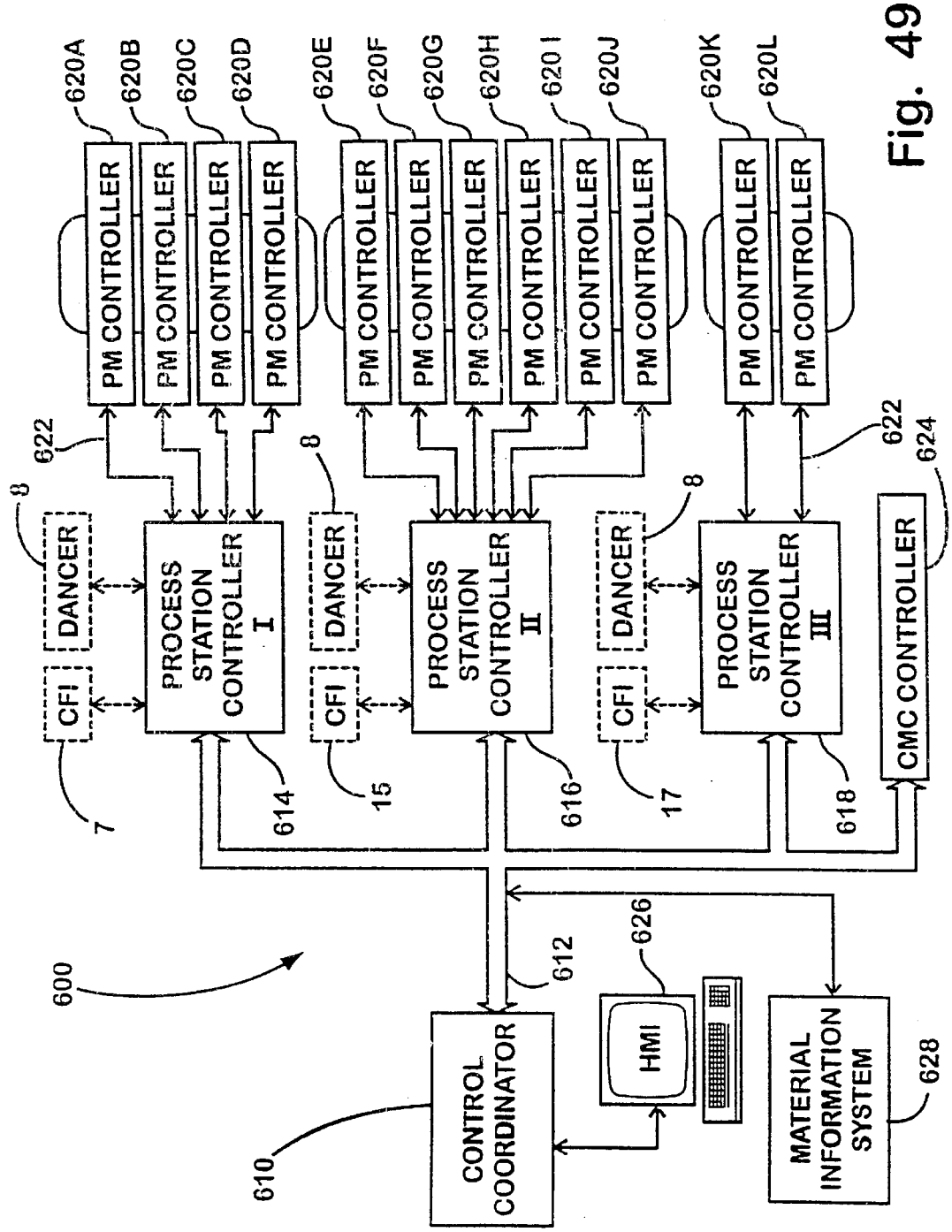
FIG. 49 is a block diagram illustrating the control system hardware architecture employed in the high speed manufacturing system of the present invention.

Referring to FIG. 49, the control system 600 for the high speed manufacturing system is generally shown made up of a distributed network of controllers for controlling the operation of the high speed manufacturing system. According to the embodiment shown and described herein, the distributed control system 600 includes a main control coordinator 610, three local process station controllers 614, 616, and 618, and a designated number of process module controllers 620A–620L, each associated with a process module. The control system 600 provides a real-time operating system and has a communication bus platform provided via ethernet communication bus 612 and bus 622 to connect the controllers in a distributed control network. Communication bus 612 may include an ethernet 10Base-T bus connected to the main control coordinator 610 and each of local process station controllers 614, 616, and 618 and the continuous motion conveyor (CMC) controller 624. Each of the process module controllers 620A–620L are connected via communication bus 622, to their designated local process station controllers 614, 616, and 618. Communication bus 622 may comprise individual communication lines which include an ethernet communication link such as an ethernet 10Base-T bus.

Each local process station controller is generally responsible for control and monitoring of the events taking place on one branch processing station of the manufacturing system. More particularly, each local process station controller communicates with, including provides control signals to and receives data information from, one or more designated process control modules, the continuous feed indexer, and the associated transfer device, all of which are preferably located on one branch processing station. Accordingly, the first process station controller 614 communicates with four designated process module controllers 620A–620D, continuous feed indexer 7, and its associated transfer device 8, all of which are present on the first branch processing station. The second process station controller 616 communicates with six designated process module controllers 620E–620J, continuous feed indexer 15, and its associated transfer device 8, all located on the second branch processing station. Finally, the third process station controller 618 communicates with two designated process module controllers 620K and 620L, as well as continuous feed indexer 17, and its associated transfer device 8, all located on the third branch processing station. While one process station controller is preferably dedicated to each branch processing station, it should be appreciated that more than one process station controller could be assigned to a given branch processing station, and one process station controller could be dedicated to serve more than one branch processing station.

The local process station controllers 614–618 are responsible for communicating with the process module controllers that are designated thereto. The process station controllers 614–618 are also responsible for controlling the associated continuous feed indexers, including control of their timing and speed for the index and dwell intermittent motion. In addition, the continuous feed indexer transmits information to the corresponding process station controller to indicate when the continuous feed indexer has completed an index or dwell operation. The transfer device 8 transmits return data information back to the corresponding process station controller regarding its operation.

In addition, the control system 600 further includes a continuous motion conveyor (CMC) controller 624 which is also connected in communication with the ethernet communication bus 612. The CMC controller 624 is a separate distributed controller that is dedicated to controlling the operation of the continuous motion conveyor(s) of the trunk. The CMC controller 624 receives control signals, such as speed control signals, from the control coordinator 610 and provides return data information regarding the operation of the continuous motion conveyor. Accordingly, the communication bus 612 allows the control coordinator 610, process station controllers 614–618, and CMC controller 624 to communicate with one another on one common distributed network.

The distributed control system 600 has communication links for allowing remote access to the ethernet communication bus 612 and control coordinator 610. It should be appreciated that communication bus 612 can be wire or wireless. Remote access is achieved by way of a human machine interface (HMI) 626 which may include a stand-alone computer connected to the control coordinator 610. The human machine interface 626 allows an operator to input command signals to the control system 600, as well as retrieve data information from the control system 600. In addition, a remote material information system (MIS) 628 is provided in communication with the ethernet communication bus 612. The material information system may include a remotely located computer connected through a communication line to the communication bus 612 to access the control system 600. For example, the material information system may include a long-distance communication link linking the communication bus 612 of control system 600 to a remotely located computer to allow remote access for inputting control signals and/or retrieving data information from control system 600. Either the human machine interface 626 or material information system 628 may be used to program the control system 600, including such operations as downloading designated software, modifying control parameters, performing experimentation, as well as handling other operations. In addition, the human machine interface 626 and material information system 628 also allow for the retrieval of the process manufacturing information that is monitored and logged by the control system 600. This may include retrieval of normal processing information, experimental processing information, article tracking information, and any other data acquired from the various controllers and sensors of the control system 600.

The main control coordinator 610 is a programmable processor based controller that coordinates and monitors the overall operation of the high speed manufacturing system. The main control coordinator 610 distributes control signals to the process station controllers 614–618 and CMC controller 624 via communication bus 612. Control signals broadcast from control coordinator 610 may include article notice messages to notify the various process station controllers 614–618 of oncoming articles of manufacture, as well as other information. The main control coordinator 610 also receives and records information received from the process station controllers 614–618 and CMC controller 624. Messages received by the control coordinator 610 may include work report messages received from each process station controller which detail the work completed on each article of manufacture, preferably following each process operation performed by the process modules.

Figure 50:
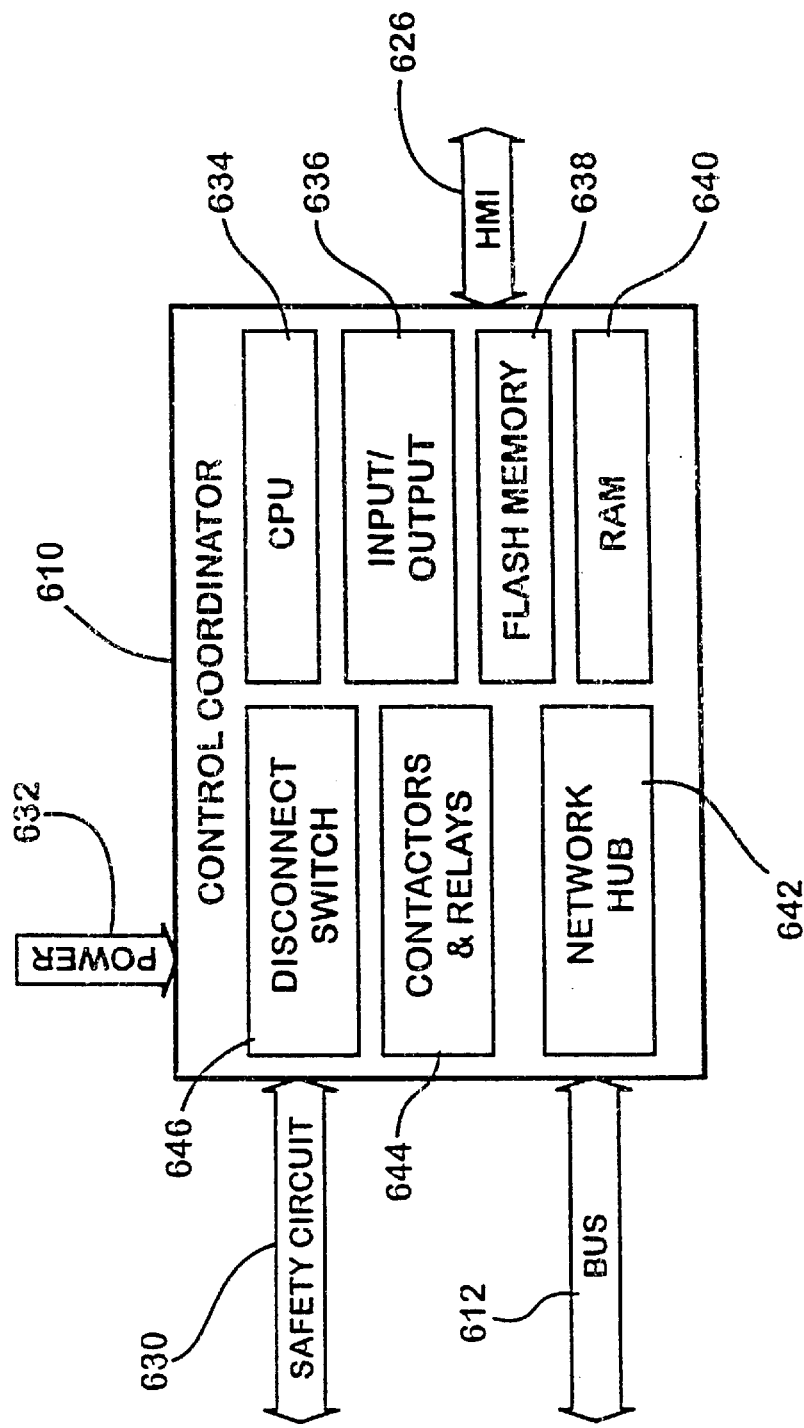
FIG. 50 is a block diagram illustrating the control coordinator of the distributed control system.

Referring to FIG. 50, the hardware configuration for one example of the main control coordinator 610 is shown therein. The control coordinator 610 includes a central processing unit (CPU) 634, an input/output port 636, flash memory 638, random access memory (RAM) 640, a network hub 642, contactors and relays 644, and a disconnect switch 646. It should be appreciated and understand that various other standard controller components may be present in the control coordinator 610 or the other controllers that are shown and described herein in connection with the control system 600. The central processing unit 634 may include a commercially available microprocessor, one example of which may include Model No. MVME 2304, made available from Motorola. The random access memory 640 and flash memory 638 are available to store program software to perform designated process control functions as well as other operating system programs, and also to store data information collected with the control system 600. The network hub 642 includes at least two 10 Base-T ethernet ports and allows communication via the ethernet communication bus 612. The contactors and relays 644 may be utilized to perform an emergency stop of the manufacturing system, while disconnect switch 646 provides a means to turn off the power supply to the control coordinator 610, which will also shutdown the control system 600. It should be appreciated that the various components of the control coordinator 610 may be assembled together on one or more boards and arranged on a VME rack.

Additionally, the control coordinator 610 is further shown in communication with a safety circuit 630 that links the control coordinator 610 to each of the process station controllers 614–618 and the CMC controller 624. The safety circuit 630 provides a separate hard-wired connection that may be utilized to disconnect the control system 600 power outputs when necessary, such as during an emergency condition. A standard power supply 632 is also provided to the control coordinator 610, and may include 480 volts AC, which is preferably transformed to a usable DC voltage of 24 volts DC or other suitable voltage level.

The local process station controllers 614, 616, and 618 are provided as local controllers to the branch processing stations and each process station controller is designated to control the operations associated with one branch processing station of the manufacturing system, including control of the continuous feed indexer, its transfer device, and the designated process modules, all of which are associated with one branch processing station. Accordingly, process station controller 614 serves as a local controller to control the processing associated with the first continuous feed indexer 7, transfer device 8, and process module controllers 620A–620D. The second process station controller 616 controls the processing performed on the second continuous feed indexer 15, its transfer device 8, and process module controllers 620E–620J. The third process station controller 618 controls the processing associated with the third continuous feed indexer 17, its transfer device 8, and process module controllers 620I and 620L. In addition, each process station controller receives data information, such as work progress reports, from its designated process module controllers, transfer device and continuous feed indexer.

Figure 51:
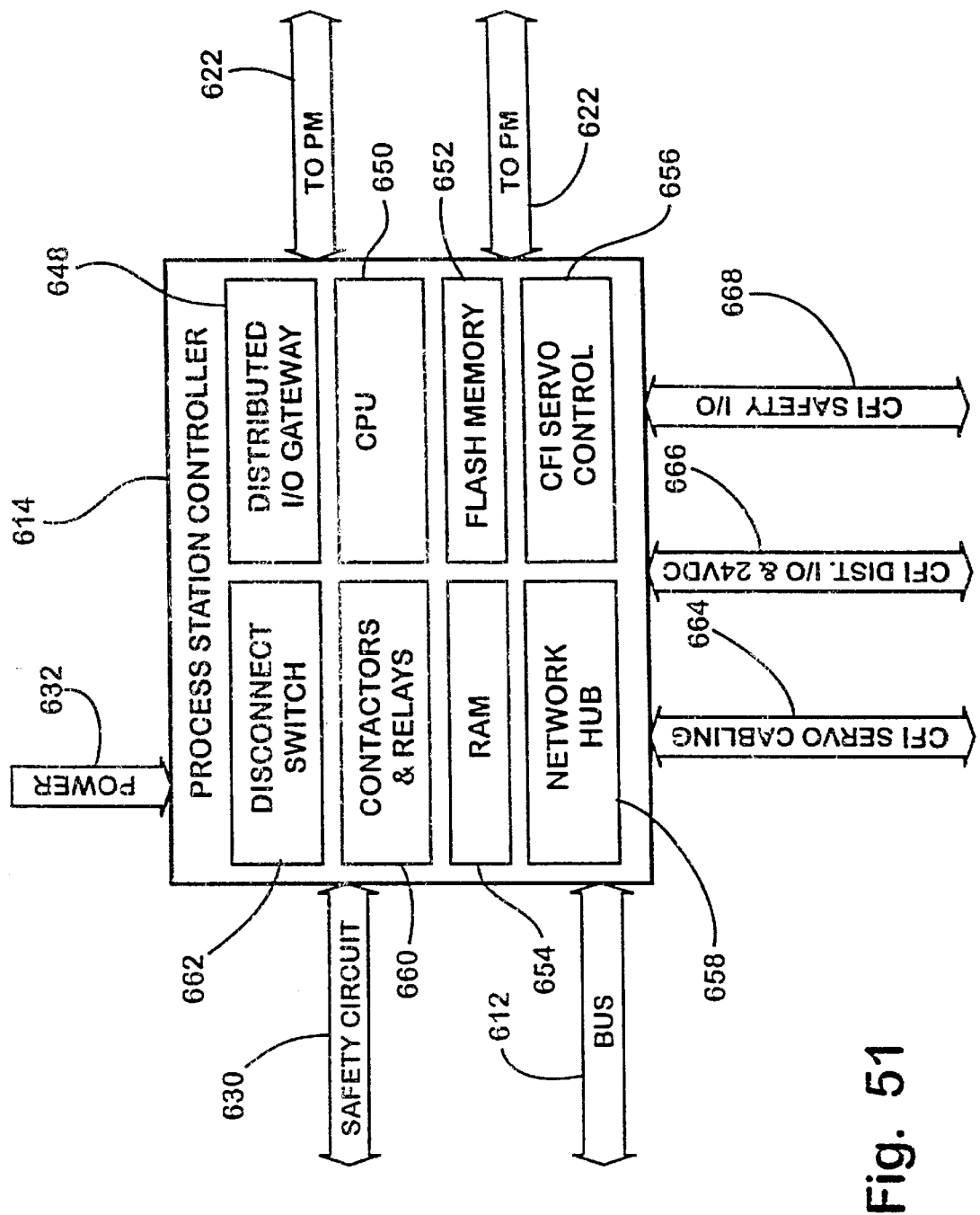
FIG. 51 is a block diagram illustrating the local process station controller of the distributed control system.

One example of a hardware configuration for the local process station controller 614 is shown in FIG. 51. The process station controller 614 hardware includes a distributed input/output gateway 648, a central processing unit (CPU) 650, flash memory 652, random access memory (RAM) 654, and a continuous feed indexer (CFI) servo control 656. In addition, the process station controller 614 has a network hub 858, contactors and relays 660 and a disconnect switch 662. The central processing unit 650 may include a commercially available microprocessor, one example of which may include Model No. MVME 2023, made available from Motorola. The flash memory 652 and RAM 654 allow for storing of programmed software and data storage. The CFI servo control 656 provides an amplified servo control signal to the CFI's servo motor to control operation of the continuous feed indexer. Network hub 658 includes at least one ethernet port and allows for networked communication connections to bus 612, as well as communication connections to bus 622. The contactors and relays 660 allow for shutdown of the system during an emergency condition, while disconnect switch 662 allows for power disconnect from the process station controller 614 to thereby shutdown the control system 600. The safety circuit 630 is shown connected to the process station controller 614 to provide a hard-wired connection that may be used to shutdown the control system 600 in case of an emergency shutdown condition. A standard power supply 632 is also provided to the process station controller 614, and may include 480 volts AC, which is preferably transformed to a usable DC voltage of 24 volts DC or other suitable voltage level.

The process station controller 614 is further shown having connections to the continuous feed indexer via lines 664, 666, and 668. The CFI servo cabling line 664 allows for servo cabling to the continuous feed indexer to transmit drive signals to drive the servo motor associated with the continuous feed indexer. CFI Distributed I/O+24 V DC line 666 provides two-way communication, such as sensor and actuation signals, and power to the continuous feed indexer. CFI Safety I/O line 668 provides a hard-wired safety circuit connection to the continuous feed indexer to shutdown the system in case of an emergency shutdown condition. The process station controller 614 is further shown in communication with process module controllers via communication bus 622. It should be evident that the other local process station controllers 616 and 618 may be configured identical or similar to controller 614 as described above. Each local process station controller is preferably delegated the responsibility for initiating the process steps performed by the process modules associated therewith, as well as controlling the motion of the corresponding continuous feed indexer.

Each of the process module controllers 620A–620L are provided for controlling and performing the physical processes that are to be performed by the associated process modules. For a battery manufacturing process application, such physical processes may include inputting cells on the continuous feed indexer, outputting cells off the continuous feed indexer, applying sealant to the battery can, inserting separators, inserting KOH, inserting anode gel, inserting collectors, crimping and closing cells, and disposing of defective cells. It should be appreciated that the process module controllers are preferably software driven and are programmed such that each process module controller drives one or more servo controlled motors to perform one or more designated processing operations.

Figure 52:
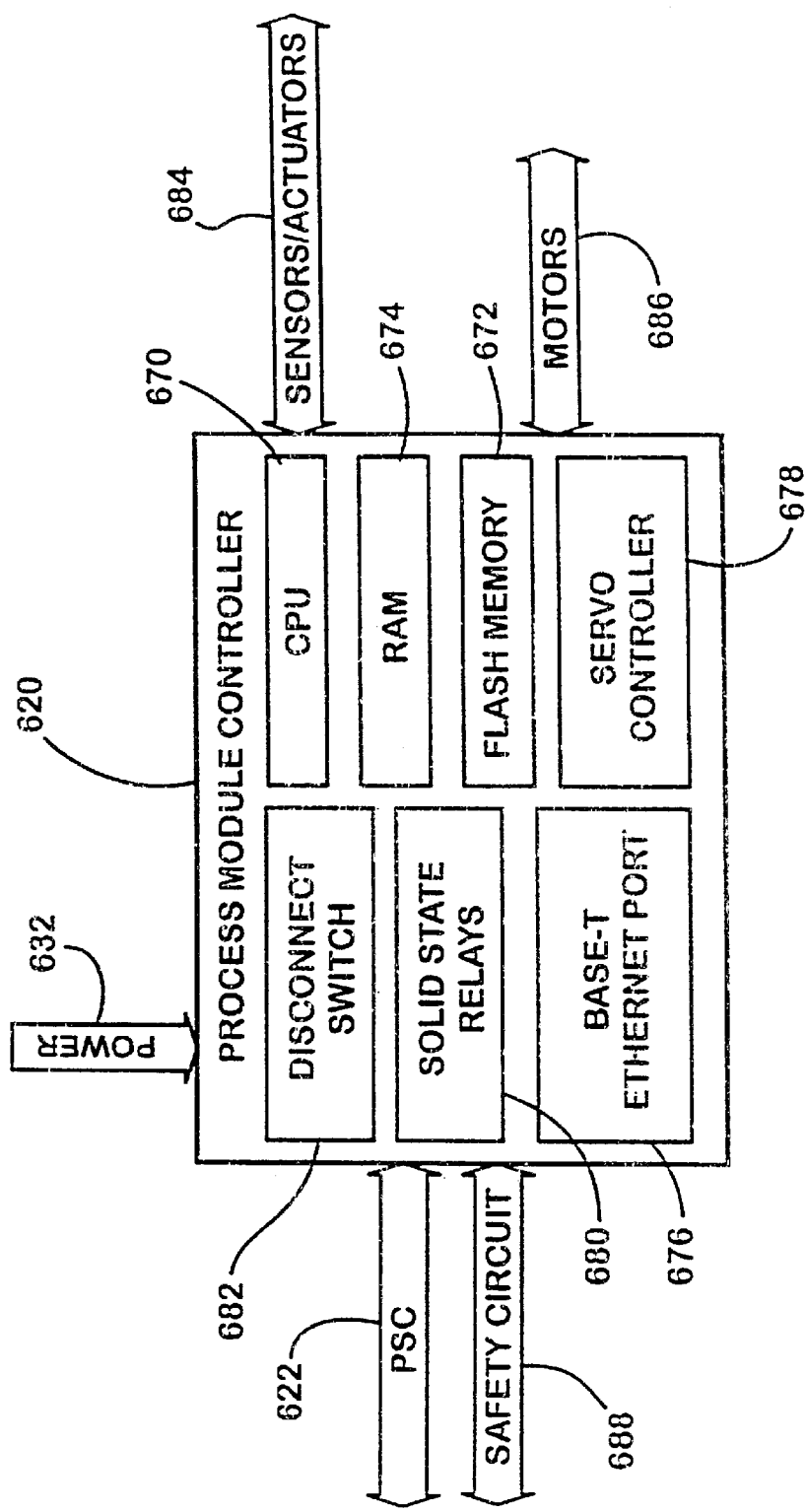
FIG. 52 is a block diagram illustrating the process module controller of the distributed control system.

One example of a process module controller 620 is shown in FIG. 52, which is representative of the hardware configured for any of process module controllers 620A–620L. The process module controller 620 includes a central processing unit (CPU) 670, flash memory 672, random access memory (RAM) 674, a servo controller 678, and a Base-T ethernet port 676. The central processing unit 670 may include a commercially available microprocessor, examples of which may include Model No. Pentium, made available from Intel Corporation, and Model No. Power PC 604E made available from Motorola. Flash memory 672 and RAM 674 store designated program software and data information, while the servo controller 678 generates servo control signals to drive one or more actuators or motors, each of which is configured to perform a designated processing operation in conjunction with the process module associated therewith. The Base-T ethernet port 676 allows communication with the corresponding process station controller via the ethernet connection bus 622. In addition, solid state relays 680 and a disconnect switch 682 are provided on the process module controller 620 to allow for shutdown of the system. The process module controller 620 is connected in communication with the corresponding process station controller to which it is assigned by way of the ethernet communication bus 622, as well as the safety circuit 688 which is a hard-wired line that allows for emergency shutdown of the system. The process module controller 620 further communicates with sensors and actuators on line 684 to receive sensed data and initiate actuation of certain devices. Further, the process module controller 620 communicates via the servo controller 678 with the designated motors associated with the process module.

Figure 53:
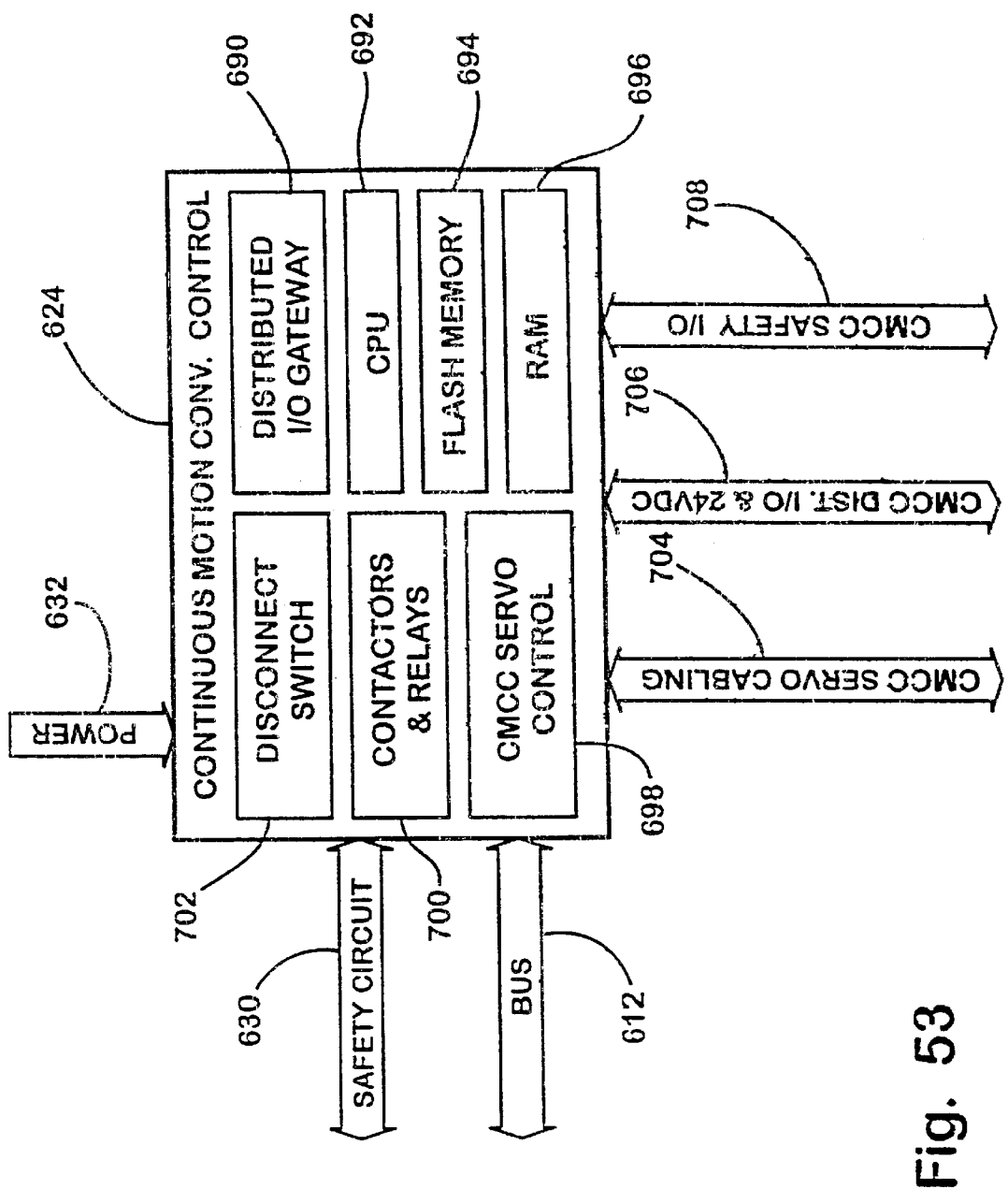
FIG. 53 is a block diagram illustrating the continuous motion conveyor controller of the distributed control system.

The continuous motion conveyor controller 624 is shown in FIG. 53 according to one example. Continuous motion conveyor controller 624 includes a distributed input/output gateway 690, a central processing unit (CPU) 692, flash memory 694, random access memory (RAM) 696, and a CMCC servo control 698. The central processing unit 692 may include a commercially available microprocessor, one example of which may include Model No. MVME 2023, made available from Motorola. Flash memory 694 and RAM 696 are available to store designated software programs as well as data information. The CMCC servo control 698 provides servo control signals to control the actuation and speed of the drive motor 288 which drives the continuous motion conveyor 18. In addition, contactors and relays 700 and a disconnect switch 702 are provided on the continuous motion conveyor controller 624 to allow for shutdown of the system during an emergency shutdown condition.

The continuous motion conveyor controller 624 communicates with the ethernet communication bus 612 as well as the hard-wired safety circuit 630. In addition, the continuous motion conveyor controller 624 has three lines 704, 706, and 708 connected to the continuous motion conveyor. Included is a CMCC servo cabling line 704 which allows servo control signals to be transmitted to the drive motor 288 associated with the continuous motion conveyor 18. CMCC Distributed I/O+24 V DC line 706 allows for two-way communication of sensor and actuator signals, as well as power signals to the continuous motion conveyor. CMCC Safety I/O line 708 provides a safety circuit connection to the continuous motion conveyor to allow for shutdown of the continuous motion conveyor during an emergency shutdown condition.

It should be appreciated that the process module controllers 620A–620L are controlled by software defined process module agents as is explained herein. According to one embodiment, the process module agents may be included with and processed by the local process station controller designated to controlling the associated branch processing station on which the corresponding process module operates. According to a second embodiment, the process module agents may be programmed into and processed by the individual process module controllers 620A–620L associated with the corresponding process module. In any event, the process module agent for controlling a specified process operation can be distributed amongst the available controllers by storing and processing the agents software in either the local process module controller associated with a particular process module or the process station controller designated to that process module.

Control System Operation

The distributed control system 600 is software-based and preferably uses an object-oriented software operating control system. According to one example, C++ object oriented programming may be employed. The use of object-oriented software programming for the control system 600 facilitates maintenance and reuse of the high speed manufacturing system. The object-oriented software identifies the physical and conceptual objects of the system and represents such objects as software agents. In addition, responsibilities, attributes, and services are assigned to principle classes. The control software is responsible for checking and configuring the control system, initiating operation of the system and monitoring the status of the system, transporting articles of manufacture to and between process stations by way of the continuous motion conveyor, transfer device, and the continuous feed indexers, and managing the global conveyor system to maximize article throughput and minimize transfer device-limit failures. In addition, the control system 600 notifies the process stations about the status of oncoming articles, actuates the process stations according to the programmed work specifications, the article status, and the conveyor status, and records information about the processing of each article of manufacture. Further, the control software effects shutdown of the control system when required, handles subsystem failures either by restoring the subsystem, replacing it, or shutting down the overall system, and resuming operation after either controlled or uncontrolled shutdowns, and provides an operating interface that supports the system operation and any problem diagnosis/resolution.

The physical objects of the system to which the control software is assigned agents include the control coordinator, the process stations, the process modules, the continuous motion conveyor, the continuous feed indexers, and the safety system. For each of these objects, which are controlled and/or monitored by the control software, object agents are defined to encapsulate their associated data and behavior and their responsibilities are specifically allocated. According to one embodiment, the main control coordinator agent is allocated the responsibilities of checking and configuring the system, initiating system operation and monitoring system status, managing the global conveyor system to maximize article throughput and minimize transfer device-limit values, notifying process stations about the status of oncoming articles, recording information about the processing of each article, effecting control system shutdown when required, handling subsystem failures either by restoring the subsystem, replacing it, or shutting down the overall system, and resuming operation after either controlled or uncontrolled shutdown. Some of these responsibilities involve checking, configuring, starting, interrogating, adjusting, and stopping subsystems such as the continuous feed indexers, continuous motion conveyor, and process stations. The main control coordinator agent delegates these responsibilities to the subsystems controlling agents that are associated with the continuous feed indexers, continuous motion conveyor, and processing station agents. Accordingly, the control coordinator 610 is responsible for the supervisory control of the entire control system.

The control system 600 also includes a process station agent corresponding to each physical process station on the high speed manufacturing system. The process station agent is responsible for instructing the corresponding process station to process articles of manufacture according to their work specification and status. There may exist separate process station agents assigned to initiate each step of the manufacturing process carried out by a corresponding process module. For the battery manufacturing application, there may be separate process station agents for initiating actuation of the inputting of cells, outputting cells, applying sealant, inserting separators, inserting KOH, inserting anode gel, inserting collectors, crimping and closing cells, and disposing of defective cells, as well as other operations.

The control system 600 further includes a process module agent corresponding to each physical process module on the high speed manufacturing system. The process module agent is responsible for controlling a designated process module to implement the specific individual steps to perform the designated operation dedicated to that particular process module. The process module agent may be viewed as a software routine which instructs the process module to perform a specified function according to the programmed routine. The process module agent further monitors the operation of the corresponding process module and sends monitored data in a work report to the process station agent assigned thereto.

The main control coordinator agent interacts with each of the process station agents, and each of the process station agents interacts with each of the process module agents that are assigned thereto. During normal manufacturing operation, the main control coordinator agent sends article notice messages to the process station agents to notify the process station agents of the oncoming articles of manufacture. A process station normally will not process the article of manufacture unless the process station agent which controls a particular process module has received an article notice message indicating that it should do so and the continuous feed indexer has returned a report that it is in proper position. In response, the process station agent notifies the designated process module agent to initiate its programmed process operation. Once the process module has completed its intended operation, the process module agent issues a work report message which is sent to the process station agent. The process station agent then broadcasts the work report message to other process stations as well as to the control coordinator 610. The control coordinator 610 preferably monitors and records each work report message for each article of manufacture. The work report messages issued by the process station agents may include information describing the results of processing individual articles of manufacture, and may indicate whether the processing operation was successful or not, may contain test results or other measurements, may report experimental processing information, and may include cell processing history data. These work report messages are sent to the control coordinator, in support of its notification and record-keeping responsibilities.

Figure 54:
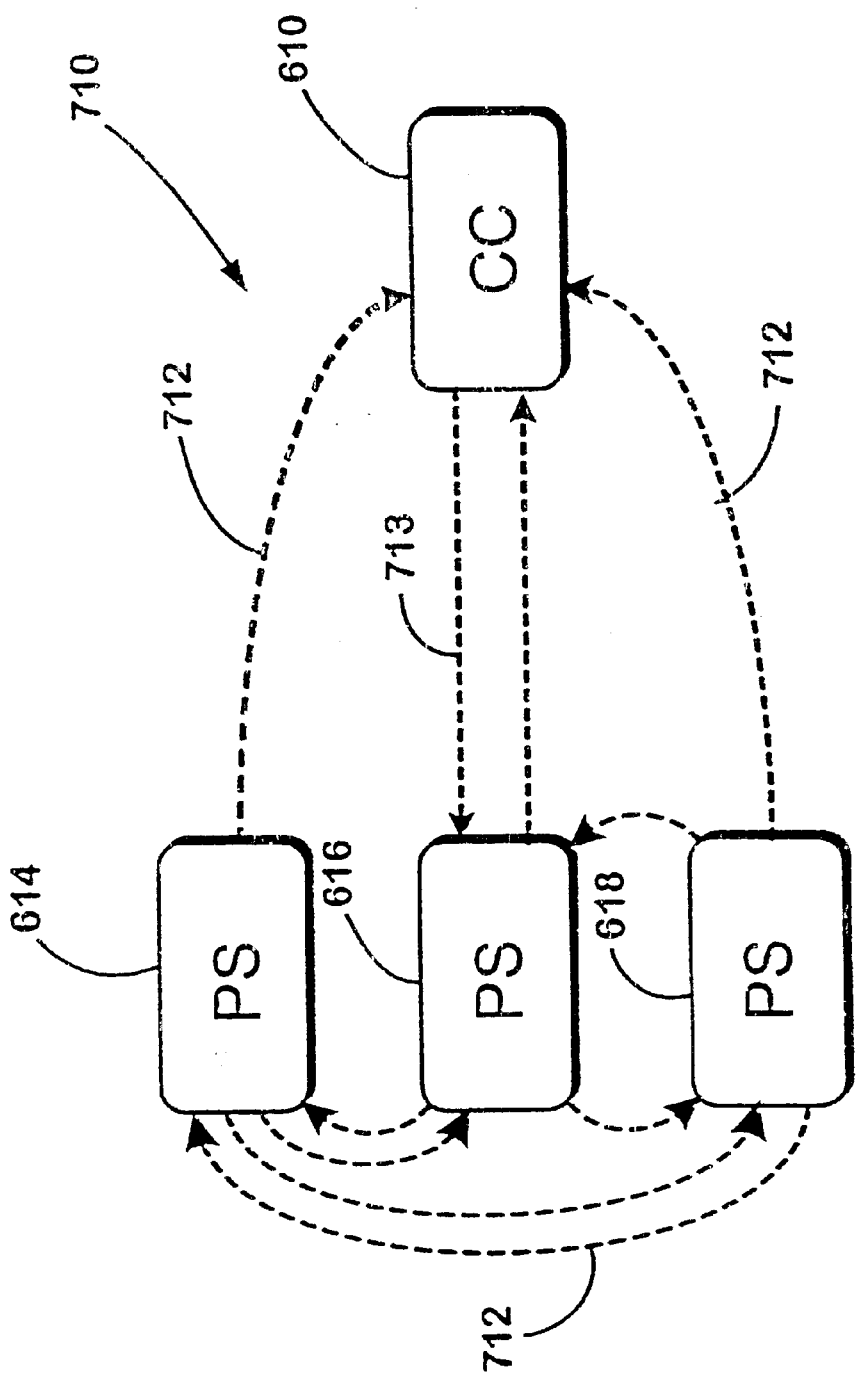
FIG. 54 is an illustration of a broadcast protocol for communicating notices and reports in the distributed control system according to a first embodiment.

To communicate article notice messages and work report messages, the control system 600 of the present invention preferably uses a protocol for communicating such information. Referring to FIG. 54, one embodiment of a protocol that could be employed is shown and is identified as a broadcast protocol 710 in which the process station 614 agent broadcasts work report messages, as shown by dashed lines 712, to the other process stations 616 and 618 agents as well as to the control coordinator 610 agent. A process station agent receiving a work report message 712 examines the information to determine whether to process the article of manufacture that it refers to. The process station agent will generally process the article of manufacture if the work report message 712 was issued by the process station agent controlling the process station that precedes its own and if the article was processed successfully. The control coordinator 610 agent initiates processing of an article by broadcasting a dummy work report message 713 for itself, and simply records the work report messages 712 that it receives. The advantage of the broadcast protocol 710 is that activating or deactivating a process station does not entail opening or closing of network connections.

Figure 55:
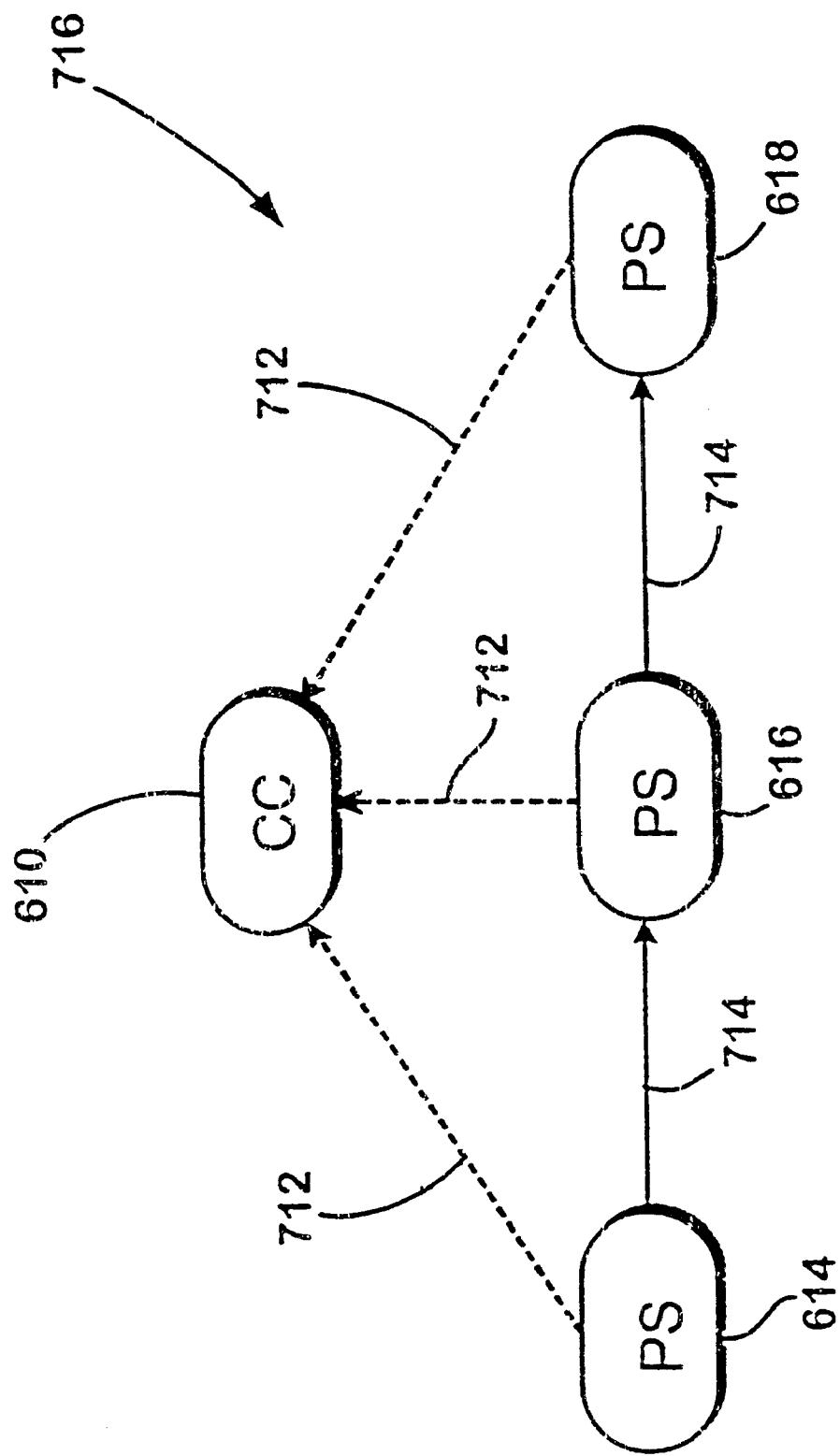
FIG. 55 is an illustration of a process station-chain protocol for communicating notices and reports in the distributed control system according to a second embodiment.

Referring to FIG. 55, a second embodiment of a protocol referred to as the process station-chain protocol 716 is shown in which each processing station determines whether an article of manufacture should be processed further or rejected, and the process station agent sends an article notice message 714 directly to the appropriate process station or disposal station, without the intervention of the control coordinator 610. In doing so, the process station agents send copies of their work report messages 712 to the control coordinator 610 agent for recording. By distributing responsibility for article-routing, the process station-chain protocol 716 reduces the workload of the control coordinator 610 and reduces network traffic.

Figure 56:
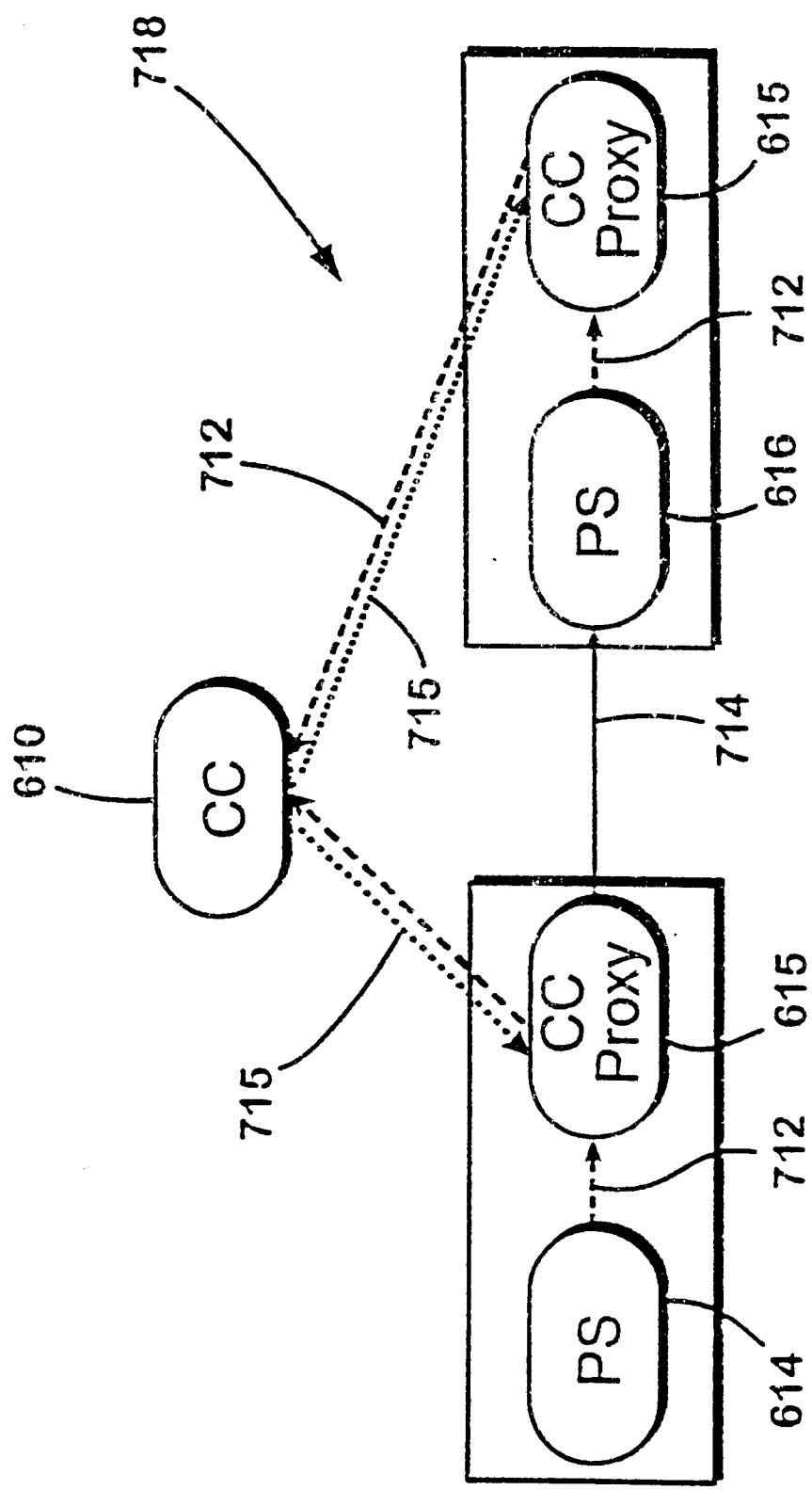
FIG. 56 is an illustration of a hybrid protocol for communicating notices and reports in the distributed control system according to a third embodiment.

A third embodiment of a protocol is shown in FIG. 56 and is referred to as the hybrid protocol 718 in which each process station agent, such as process station 614 agent, sends its work report message 712 for an article of manufacture to a local control coordinator proxy 815. The local control coordinator proxy 815 determines which process station should process the article of manufacture next and issues an article notice message 714 to the corresponding process station 616 agent. In addition, the real control coordinator 610 issues an itinerary message 715 to each process station. The control coordinator proxy 615 does not have to communicate with the real control coordinator 610 throughout each article of manufacture, although the real coordinator 610 informs the control coordinator proxy 615 of changes in the itinerary 715 for articles of manufacture. Thus, the hybrid protocol 718 reduces the workload on the real coordinator 610 but at the same time removes knowledge of the line configuration from the process station agents.

Figure 57:
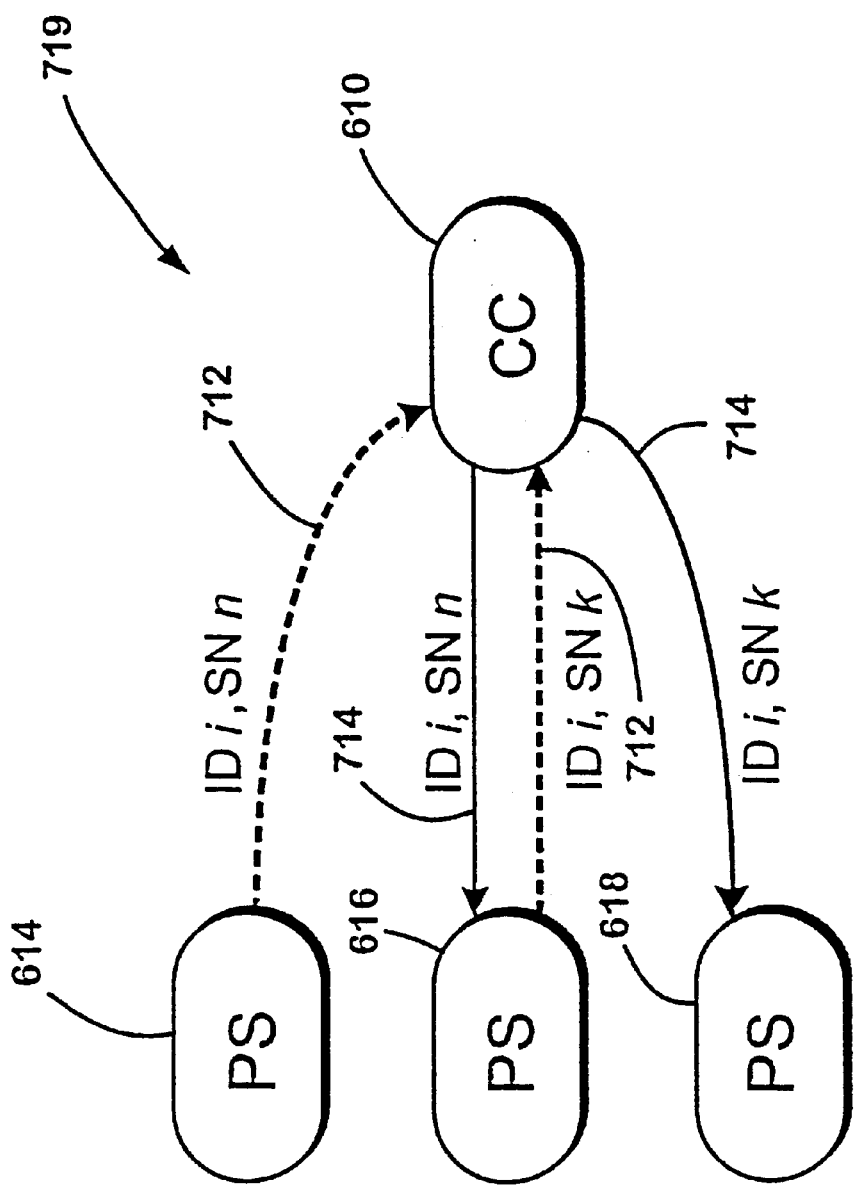
FIG. 57 is an illustration of a centralized protocol with cell identification for communication in the distributed control system according to a fourth embodiment.

A fourth embodiment of a protocol is shown in FIG. 57 and is referred to as the centralized protocol 719, which may or may not have article identification. According to the centralized protocol 719 embodiment, each process station agent sends work report messages 712 to the control coordinator 610. The control coordinator 610 examines the work report messages 712 to determine which process stations should handle the corresponding articles of manufacture next, and then directs appropriate article notice messages 714 to the process station agents associated with those process stations. The control coordinator 610 also records the work report messages 712 that are received.

In addition, an article identification scheme may be used in the centralized protocol 719 for tracking articles of manufacture on the manufacturing system line by assigning to each article a sequence number corresponding to its position in the article stream, and to use this number as an article identifier throughout the article's processing. Accordingly, a process station agent can identify arriving articles by keeping a count of the transport cleats that have passed the process station and adding the transport cleat offset to the count. Of course, this scheme requires that the order of articles on the line be preserved, or any reordering of the articles be accounted for. As long as the reordering is deterministic, it can be accommodated by using two numbers to track an article; namely, a sequence number (SN) and an article identifier (ID). These numbers are included in the article notice and work report messages. The control coordinator 610 assigns each article an article identification number upon its entry to the manufacturing system and this identification does not change during the article's processing, even if any reordering occurs. Any reordering would be accounted for by the control coordinator 610 and tracked as necessary to account for the position of each article of manufacture.

For each continuous feed indexer on the manufacturing system, there preferably exists a continuous feed indexer agent which is responsible for controlling the continuous feed indexer and its associated transfer device. The continuous feed indexer agent also interacts with the control coordinator 610 when the system is configured, started, or stopped, when a failure occurs, and when the control coordinator 610 requests its status. In addition, the continuous feed indexer agent monitors the condition of the continuous feed indexer and informs the control coordinator 610 of malfunctions, supports the control coordinator's responsibility to manage the global conveyor system, and synchronizes the operation of the continuous feed indexer and associated process stations by interacting with the process station agents.

A continuous motion conveyor agent is also provided for controlling the continuous motion conveyor. The continuous motion conveyor agent is responsible for interacting with the control coordinator 610 when the system is configured, started, or stopped, when a failure occurs, and when the control coordinator 610 requests its status. In addition, the continuous motion conveyor agent monitors the health of the continuous motion conveyor and informs the control coordinator 610 of any malfunctions, and supports the control coordinator's responsibility to manage the global conveyor system.

With the control coordinator agent and process station agents being physically distributed, remote proxies 615, such as shown in FIG. 56, may be employed. A remote proxy is a local stand-in for a remote server and provides a server interface in place of the real controller. The remote proxy 615 may be used to encapsulate the details of network communication and to make distribution of agents transparent to other controllers. It should be appreciated that each networked controller may include a remote proxy that is representative of another controller with which that controller is to communicate. This allows for interaction between controller agents as though they were residing on the same processing unit, even though the controllers are distributed. Alternately, it should be understood that communication between the distributed controllers could be achieved using message queues which are well-known in the art. It should also be appreciated that the software agents may run on one or more processing units with little configuration required.

Figure 58:
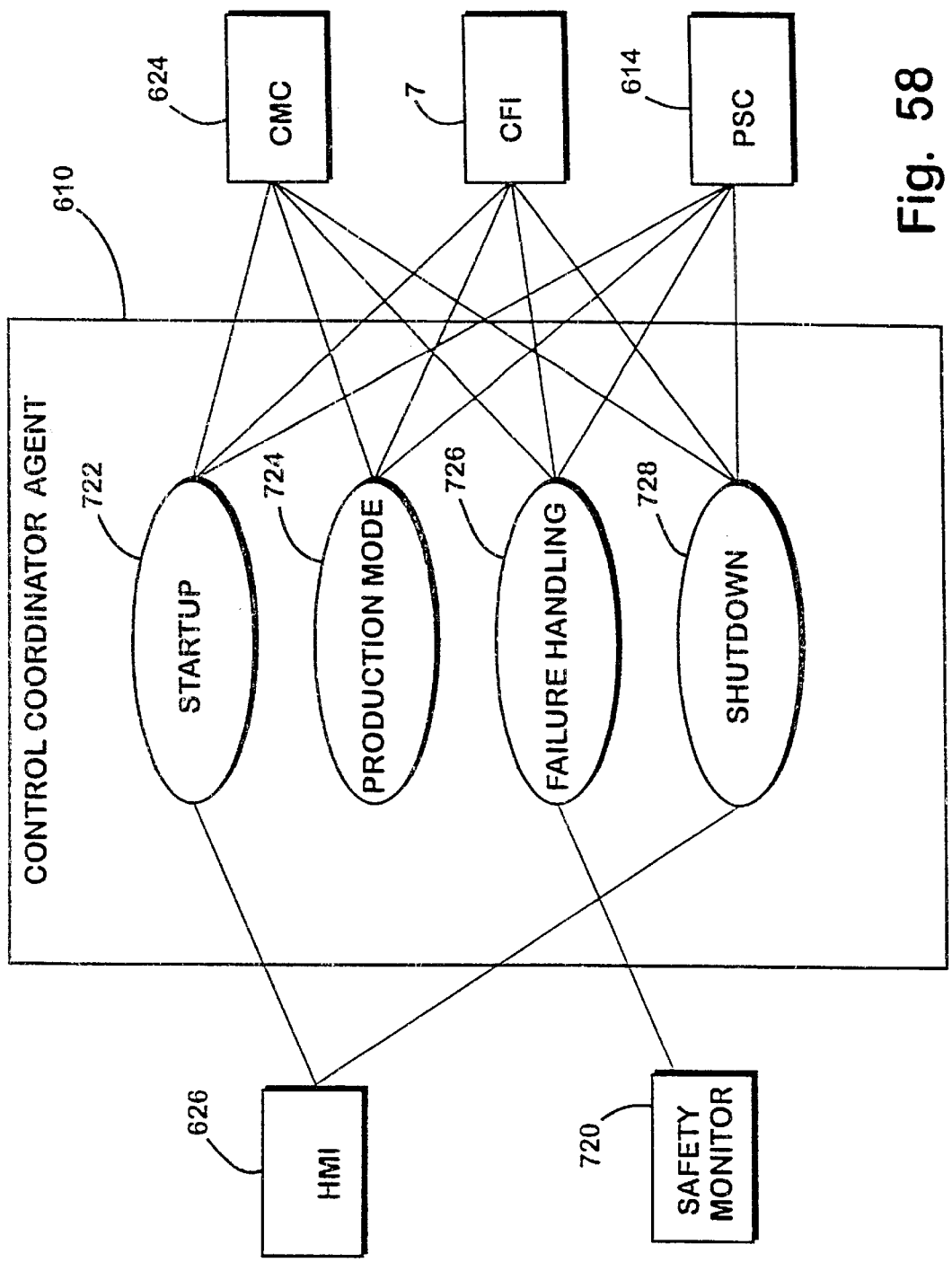
FIG. 58 is a block diagram illustrating operational modes of the control coordinator and handling tasks associated therewith.

Referring to FIG. 58, the primary operations of the control coordinator 610 agent are shown with interaction to other agents. The primary operations include startup 722, normal production mode 724, failure handling 726, and shutdown 728. During the startup operation 722, the control coordinator 610 agent receives a startup command from the human machine interface 626 and, in response, configures and initializes the various agents and data stores. This includes initializing the system data bases with information on the physical layout of the system and article itinerary. The control coordinator 610 agent is also responsible for initiating each of the continuous motion conveyor controller 624, the continuous feed indexer 7, and the process station controllers 614–618 to configure themselves through the configuration store based on the physical layout of the system.

Once the startup operation 722 is complete, the control coordinator 610 agent may begin the normal production mode operation 724 to execute the processing operations for manufacturing articles of manufacture. During normal production mode 724, the control coordinator 610 coordinates the manufacture processing operation which includes notifying each process station controller of the presence, identification, and status of articles of manufacture that are approaching the branch processing station corresponding to that process station controller, as well as recording the results of processing each article of manufacture. The control coordinator 610 also communicates with the continuous motion conveyor controller 624, as well as the continuous feed indexer 7, preferably via the corresponding process station controller.

With the failure handling operation 726, a safety monitor 720 monitors the various controllers and reports any problems to the control coordinator 610. The control coordinator 610 can evaluate and attempt to correct or adjust manufacture operations when a failure has occurred, and may initiate shutdown of the system if necessary. The human machine interface 626 may initiate a shutdown operation 728 in which the control coordinator 610 instructs the controllers to undergo a software shutdown. With a software shutdown operation 712, the control system stores the position, identification, and processing information for each article of manufacture on the manufacturing system so that processing of these articles may continue where it left off when the system is started back up. This allows for continued manufacture of partially processed articles, which reduces article waste and shutdown time.

Figure 59:
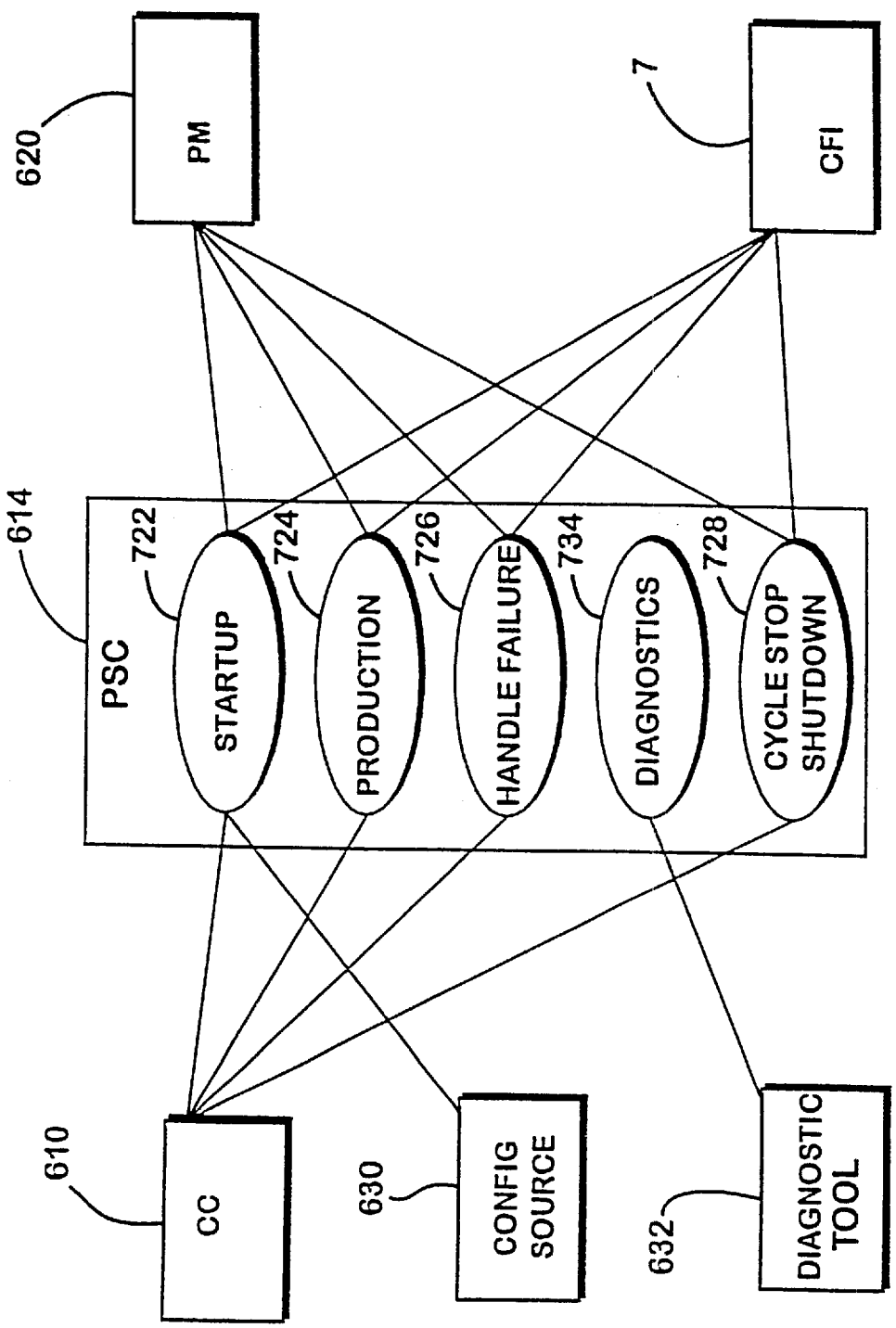
FIG. 59 is a block diagram illustrating operational modes of the process station controller and handling tasks associated therewith.

Turning to FIG. 59, the primary operations of any of the process station controller 614, 616 or 618 are shown interacting with various devices. During the startup operation 722, the process station controller is instructed by the control coordinator 610 to initiate startup. The process station controller can configure itself through the configuration source 730. In addition, the process station controller preferably configures each of the process module controllers 620 and the continuous feed indexer associated with the corresponding branch processing station.

During normal production operation 724, the process station controller receives article notice messages from the control coordinator 610, and further receives a CFI indexing status message from the continuous feed indexer 7. If the CFI position status message indicates that the continuous feed indexer 7 has indexed to the proper position for the next processing step, the process station controller instructs each process module 620 for which an article notice message was received to execute its processing operation. Upon completing its processing operation, each process module 620 sends a return message to its process station controller to inform of its processing status for that article. The process station controller in turn transmits a work report message to the control coordinator 610 for recording. In addition, the process station further instructs the continuous feed indexer 7 to move in an index and dwell intermittent motion, preferably when instructed to do so by the control coordinator 610.

During the handle failure operation 726, the process station controller interacts with the control coordinator 610, as well as the process modules and continuous feed indexer associated therewith. The cycle stop shutdown operation 728 likewise interacts with the control coordinator 610, process module controllers, and continuous feed indexer 7. Further, a diagnostics operation 734 is available with the process station controller in which a diagnostic tool 732 interacts with the process station controller to perform diagnostic functions.

Figure 60:
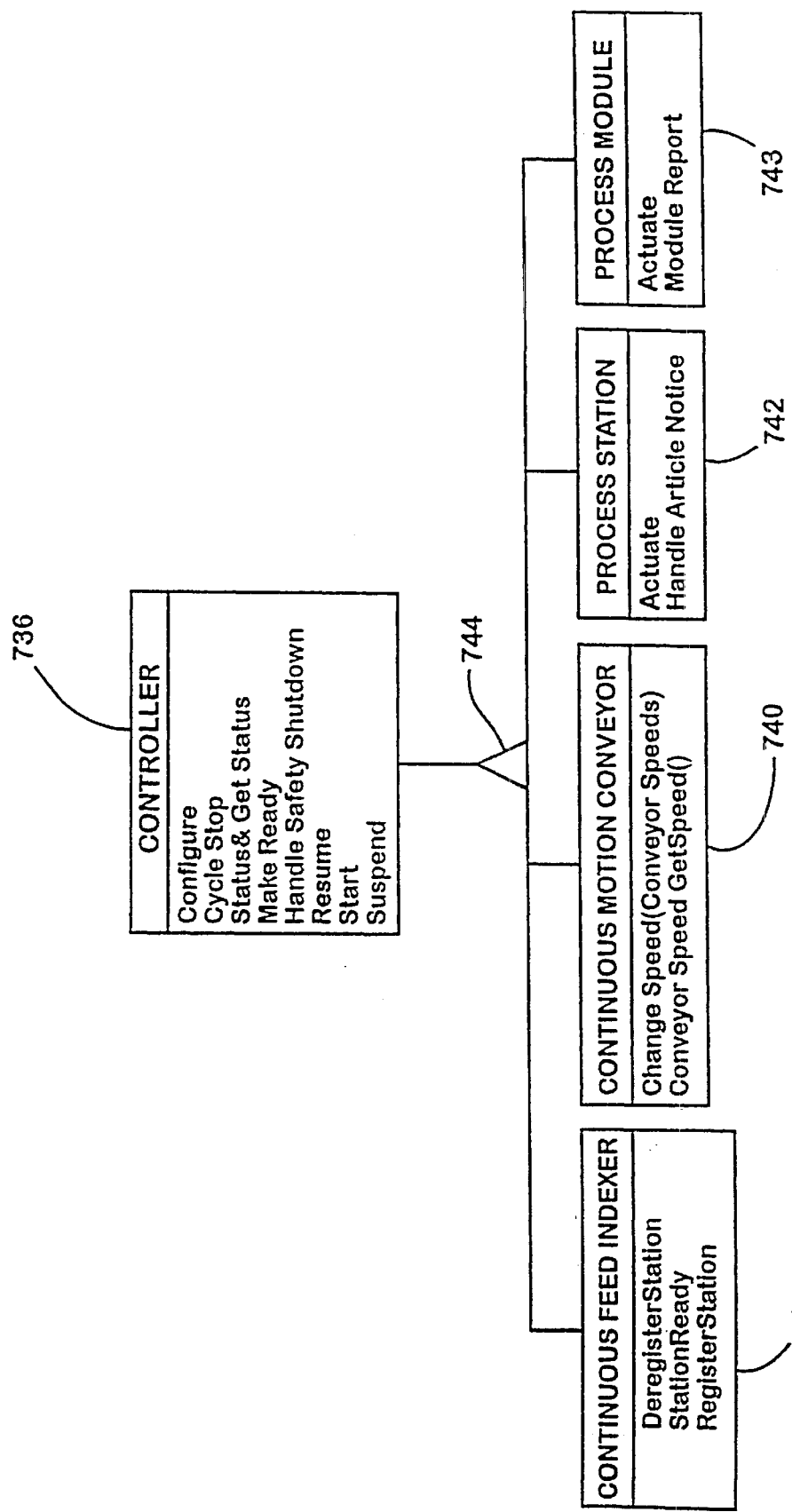
FIG. 60 is a block diagram illustrating a class hierarchy and methods associated with each class.

Referring to FIG. 60, a controller class hierarchy is illustrated with a controller class 736 and four subclasses which include the continuous feed indexer class 738, the continuous motion conveyor class 740, the process station class 742, and the process module class 743. The controller class 736 has assigned thereto primary methods which include configure, cycle stop, status and get status, make ready, handle safety shutdown, resume, start, and suspend. Each of the subclasses 738, 740, 742, and 743 contain additional methods, and each subclass further inherits all the methods of the controller class 736 as represented by inheritance 744. In addition to the inherited methods, the continuous feed indexer class 738 includes added primary methods such as the deregister station method, the station ready method, and the register station method. The continuous motion conveyor class 740 includes added primary methods such as the change speed method to change the continuous motion conveyor's speed, and the conveyor speed get speed method to acquire the conveyor's speed. The process station class 742 includes two additional primary methods, namely, the actuate method and handle article notice method. The process module class 743 includes methods for performing designated process functions.

The high speed manufacturing system of the present invention is designed and controlled to perform high speed manufacture processing of articles in a manner that is flexible in that system components are modular, easily replaceable, and reconfigurable with the distributed control system. Additionally, the manufacturing system is configured to allow expedient experimental processing of articles simultaneous to the normal manufacturing process. To achieve experimental processing, the manufacturing system platform was developed with a specified set of choices for the number of identical process modules that are employed on each branch processing station. To realize increased processing capability on each branch processing station, the number up (N), which is the number of process module operated in parallel for the same processing operation, may be increased. This allows a larger number of articles to be processed on a single branch processing station for those processes that require more time to be performed than other processes.

According to one embodiment, the high speed manufacturing system restricted the number up (N) based on the following equation: $N=2^x 3^y$, where x=0 through 5, and y=0 or 1. Alternative embodiments can restrict N to other values such as: $N=2^x 3^y$, where x=0 through 4, and y=0 through 2. Based on the aforementioned equation, the number up N for each branch processing station may be selected from the following possible set of values: 1, 2, 3, 4, 6, 8, 12, 16, 24, 32, 48 and 96. As long as the number up N for each branch processing station is selected from the available set of values, experimental processes performed on articles of manufacture can also be conducted during a normal manufacturing operation and within a reasonable period of time. According to the particular example of the manufacturing system as set forth in FIG. 1, the first branch processing station employs a number up N equal to four, while the second and third branch processing stations employ a number up N equal to six and two, respectively. In order to run an experimental process for 1,000 articles with an experimental processing module while the manufacturing system 2 is still performing normal processing at a processing rate of 700 articles per minute, the manufacturing system would take approximately 13.33 hours. This is because manufacturing system is capable of processing one experimental article for every twelve articles since, from the prime factorization, the factors of N=4 are 2*2, the factors of N=6 are 2*3, and the factors of N=2 are 2. Since the lowest common factor therefore is 2*3*2=12, one of every twelve articles may be experimental for the above example.

Figure 61:
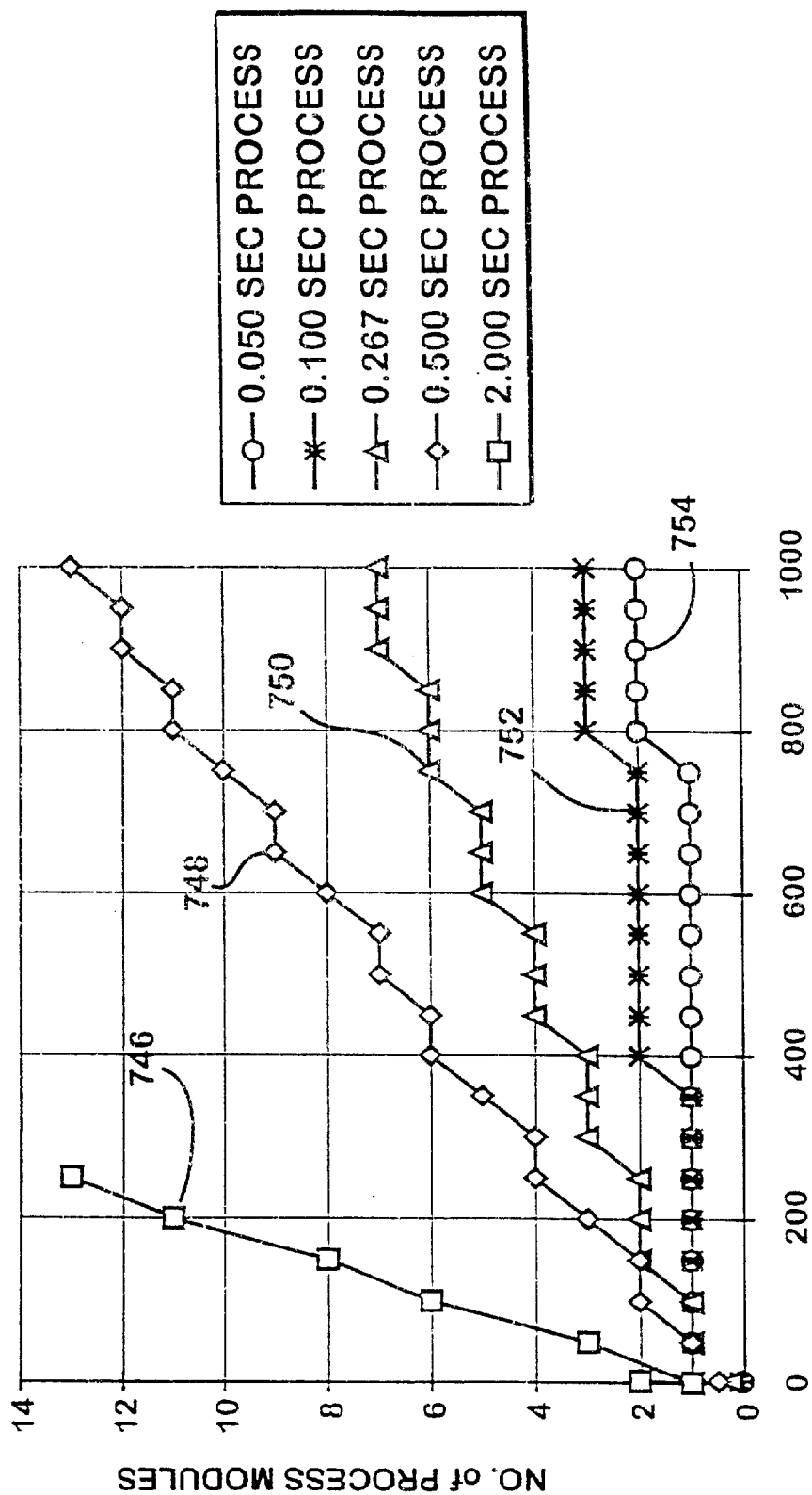
FIG. 61 is a comparative graph illustrating manufacturing article throughput realizable as a function of the number of process modules and processing time.

With particular reference to FIG. 61, examples are provided for the number of process stations that are required as a function of process time and article throughput (e.g., articles per minute), for two-third cycles provided that 67% of the cycle time is used for process operations. Process example 746 illustrates that a large number of process modules are required for a process execution time of 2.000 seconds. Process examples 748, 750 and 752 illustrate that a reduced number of process modules are required for process execution time periods of 0.500 seconds, 0.267 seconds, and 0.100 seconds, respectively. Process example 754 shows that a fast process execution time period of 0.050 seconds requires even fewer process modules. Accordingly, the number up N required for a particular branch processing station increases with the more time consuming processes.

The operation of the distributed control system 600 for controlling the high speed manufacturing system 2 of the present invention will now be described as follows. Prior to performing processing operations, the control system 600 will undergo an initial startup operation in which the control coordinator 610 initiates configuration of the various controllers and controlled devices including the continuous feed indexer, the process stations, and the process module controllers. Once configured, each controller notifies the control coordinator 610 that it is ready for operation. The control coordinator 610 then requests alignment of the transfer devices 8 to their predetermined home positions so that the control coordinator 610 can account for the position and identification of each article of manufacture as it is conveyed and processed by the manufacturing system. The control system 600 is now ready for normal processing operation.

Figure 62:
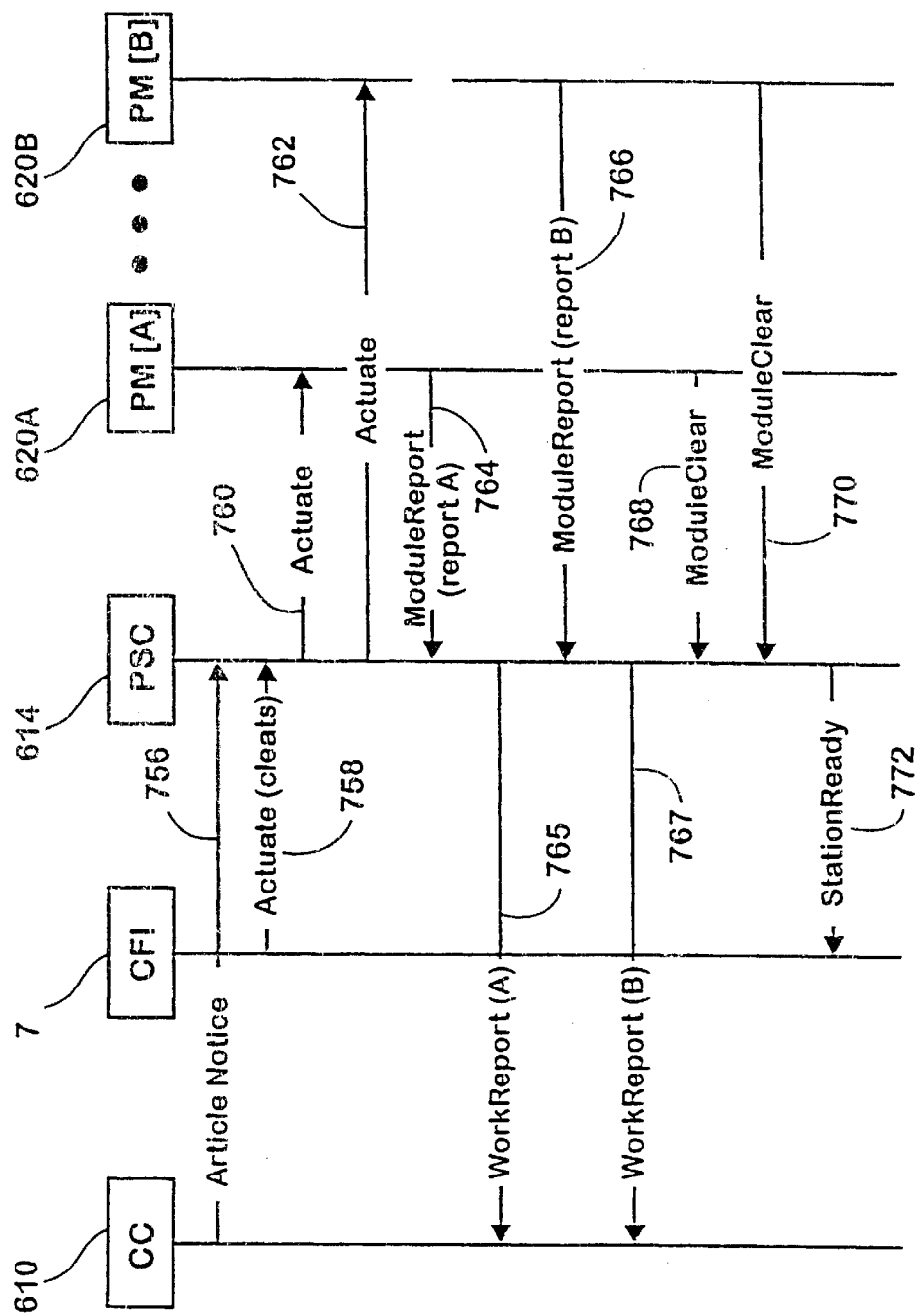
FIG. 62 is a control interaction diagram illustrating the sequence of communications between control agents during normal operation of the high speed manufacturing system.

With reference to FIG. 62, the normal processing operation of the distributed control system 600 is illustrated therein. During the normal manufacturing operation, the control coordinator 610 sends an article notice message 756 to the process station controllers, such as process station controller 614 which is shown. The process station controller 614 also receives an actuate (cleats) message 758 from the continuous feed indexer which indicates that the continuous feed indexer 7 has completed its index motion to the next processing position. When in proper position, the continuous feed indexer's transport cleats and the articles carried thereon are aligned with process modules that are to perform the next processing operation. Once the process station controller 614 received both the article notice message 756 and the actuate message 758, it sends actuate messages 760 and 762 to each corresponding process module controller such as process module controllers 620A and 620B. Actuate messages 760 and 762 instruct the receiving process module controllers 620A and 620B, respectively, to execute the process operation for its associated process module.

Upon completing its process operation, each process module controller 620 sends a return module report 764 and 766 to the corresponding process station controller 614 informing it of the completed status. The process station controller 614 in turn transmits work report messages 765 and 767 back to the control coordinator 610 which contains the work progress information for each article of manufacture. The control coordinator 610 is thereby able to track and log the history of each and every article of manufacture that is processed on the manufacturing system. In addition, each process module controller 620 also transmits module clear messages 768 and 770 to the corresponding process station controller 614 indicating that the process module has returned the article to the continuous feed indexer and is clear of the article that was previously processed. The process station controller 614 further issues a station ready message 772 to the continuous feed indexer 7 to enable the continuous feed indexer 7 to execute its index motion.

The normal processing operation is repeated for each article to be processed. The high speed manufacturing system 2 can be shutdown with a normal shutdown operation, a failure shutdown or a safety shutdown. A normal shutdown operation is executed with the control coordinator 610 broadcasting a cycle stop message to each of the process station controller, the continuous feed indexers, and the continuous motion conveyor, which instructs the devices to stop normal operation at the end of a cycle so that the normal operation can be restarted where it left off without skipping any articles. A handle failure shutdown likewise includes the control coordinator 610 broadcasting a cycle stop message to each of the process station controllers, continuous feed indexers, and the continuous motion conveyor to stop normal operation at the end of a cycle, such that a restart is possible. However, the handle failure shutdown is done in response to a handle failure signal. The handle safety shutdown involves a safety monitor, such as a transfer device limit switch or door open detector, notifying the control coordinator 610 of a problem. In response, the control coordinator 610 sends shutdown messages to each of the process station controllers, continuous feed indexers, and the continuous motion conveyor to shutdown the system immediately.

Figure 63:
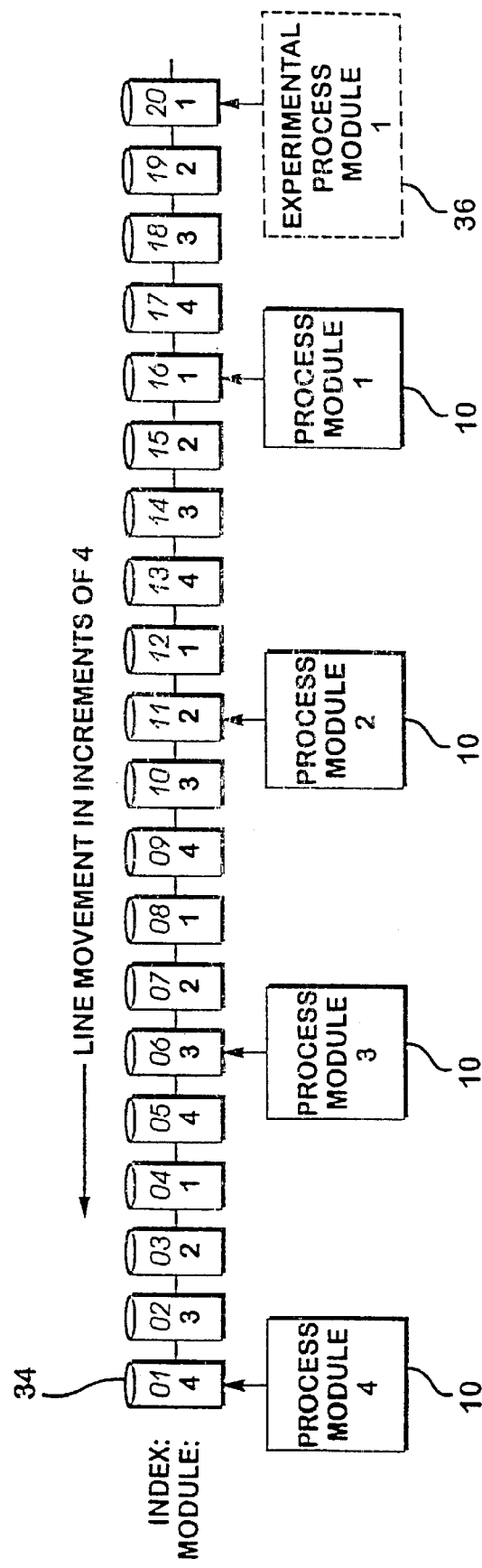
FIG. 63 is a schematic diagram illustrating the processing of articles of manufacture on a four-up continuous feed indexer with four process modules and an experimental process module.

Referring to FIG. 63, the operation of the first continuous feed indexer 7 is illustrated with line movement increments equal to the number up N=4 in which a series of articles 34 are conveyed in indexed intermittent motion to present the articles in position for processing by four normal process modules 10. The process modules 10 are successively spaced apart from each other by a distance of N+1 articles. As such, for the N=4 example shown, process modules 10 are spaced five articles apart from the next process module. During normal processing operation, each process module 10 performs its designated process operation on every fourth article.

The high speed manufacturing system of the present invention further allows for experimental processing of articles to be performed at the same time as normal processing is performed. This can be achieved by employing an experimental process module 36 as shown in parallel with one of the normal process modules 10. To perform experimental processing, the experimental process module 36 is instructed to perform processing on one article in place of one of the normal process modules. By spacing the normal process modules at N+1 articles, the experimental may be easily employed. It should also be understood that how often the experimental process module 36 can be used may depend on the number of experimental processes performed and the common denominator of N for each branch processing station as explained herein.

Figure 64:
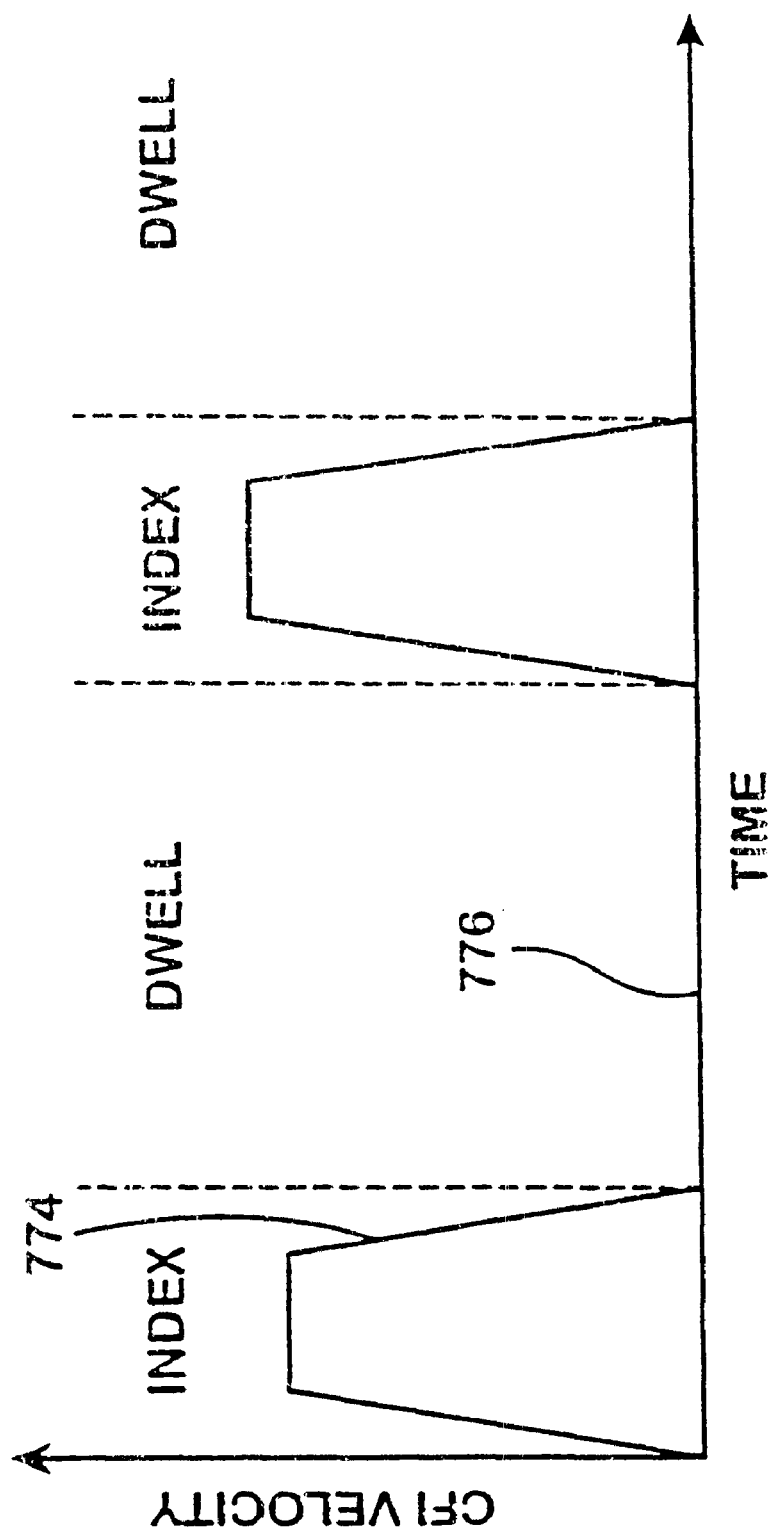
FIG. 64 is a graph illustrating the index and dwell intermittent motion of the continuous feed indexer.

As mentioned above, each of the continuous feed indexers move in an indexed intermittent motion to provide a dwell period during which processing occurs and an index period during which the continuous feed indexer moves. The indexed intermittent movement of the continuous feed indexer is illustrated in FIG. 64 as a function of velocity and time. During the index period 774, the continuous feed indexer is initially ramped up in speed, levels off, and then is ramped down in speed until the proper dwell position is reached. During the dwell period 776, the continuous feed indexer remains put while process operations are allowed to occur. The intermittent indexing motion of the continuous feed indexer is repeated throughout normal operation.

Figure 65:
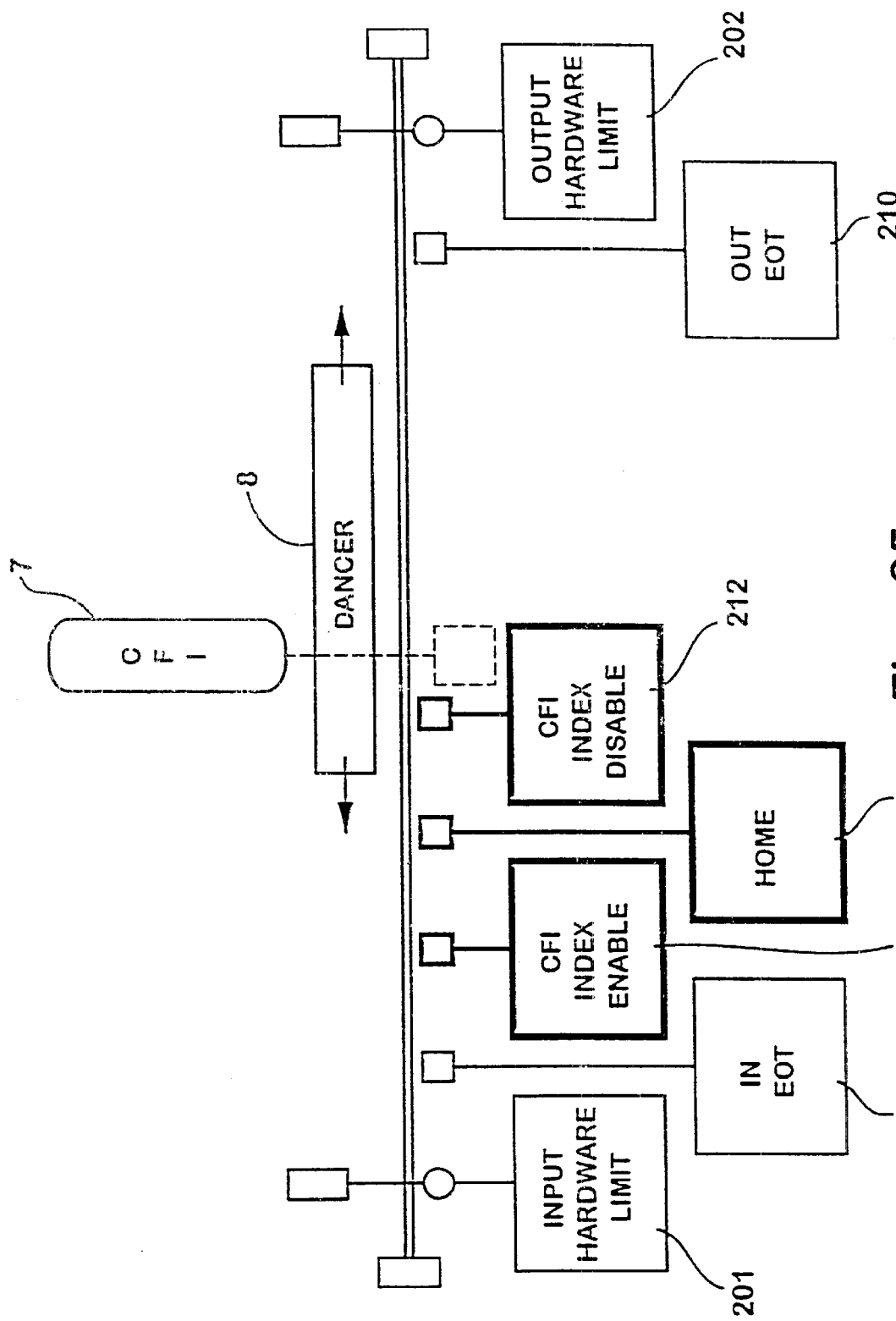
FIG. 65 is a block diagram further illustrating the various proximity sensors for monitoring the position of the transfer device.

Referring to FIG. 65, the seven proximity sensors are shown positioned along the travel path of the transfer device 8 for monitoring the transfer device's travel. The home position sensor 208 senses a predetermined home position of the transfer device 8 which allows the control system 600 to begin the normal operation of the high speed manufacturing system 2 in a known position. The CFI index enable position sensor 206 and CFI index disable sensor 212 provide position sensing that defines the normal travel limits of the transfer device 8 upon which a transfer device reset occurs. More particularly, the CFI index disable sensor 212 senses that the transfer device 8 is output rich and, upon completing the current cycle of the CFI, will cause the CFI to disable. With the CFI disabled, the input side of the transfer device 8 continues to receive articles from the continuous motion conveyor. The CFI index enable sensor 206 senses when the transfer device 8 has become input rich and then causes the CFI to be re-enabled.

The transfer device proximity sensing also includes a pair of IN EOT and OUT EOT position sensors 204 and 210, respectively, for detecting first and second end of travel limits of the transfer device 8. When either the IN EOT position sensor 204 or OUT EOT position sensor 210 detects transfer device travel beyond the limits, a software shutdown of the system is initiated. Beyond the end of travel sensors are a pair of Input and output hardware limit sensors 201 and 202 which may include hardwired limit switches. If the transfer device 8 travels beyond either of the hardware limit switch sensors 201 or 202, the manufacturing system 2 is immediately shutdown.

Figure 66:
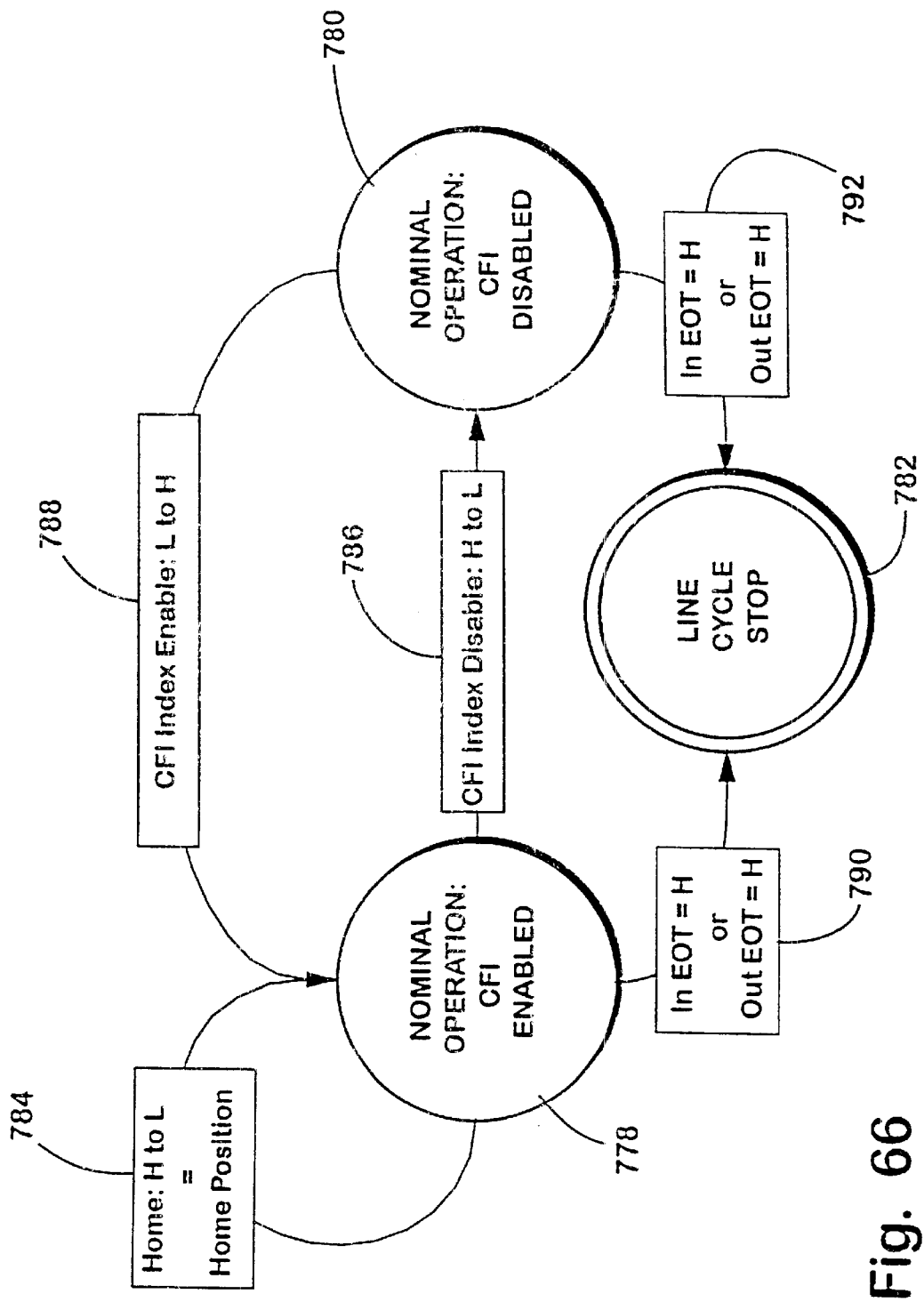
FIG. 66 is a state diagram illustrating control of the continuous feed indexer in response to the proximity sensors shown in FIG. 65.

Control of the transfer device 8 in response to the proximity sensors is further illustrated in the state diagram provided in FIG. 66. As illustrated, there is a CFI enabled state 778, a CFI disabled state 780, and a line cycle stop 782. With the home position sensor 208 detecting home position of transfer device 8, the CFI begins in the enabled state 778. When the CFI index disable position sensor 212 detects an output rich condition 786, the system transitions to the CFI disabled state 780 in which the CFI is turned off at the end of its current cycle. Once the transfer device 8 returns to an input rich condition 788, the CFI index enabled position sensor 206 returns the transfer device 8 to the CFI enabled state 778. In either the CFI enabled or disabled states 780 or 778, the system may enter the line cycle stop state 782 if either of end of travel position sensors 204 and 210 detects extended travel of the transfer device 8 as shown in blocks 790 and 792.

Figure 67:
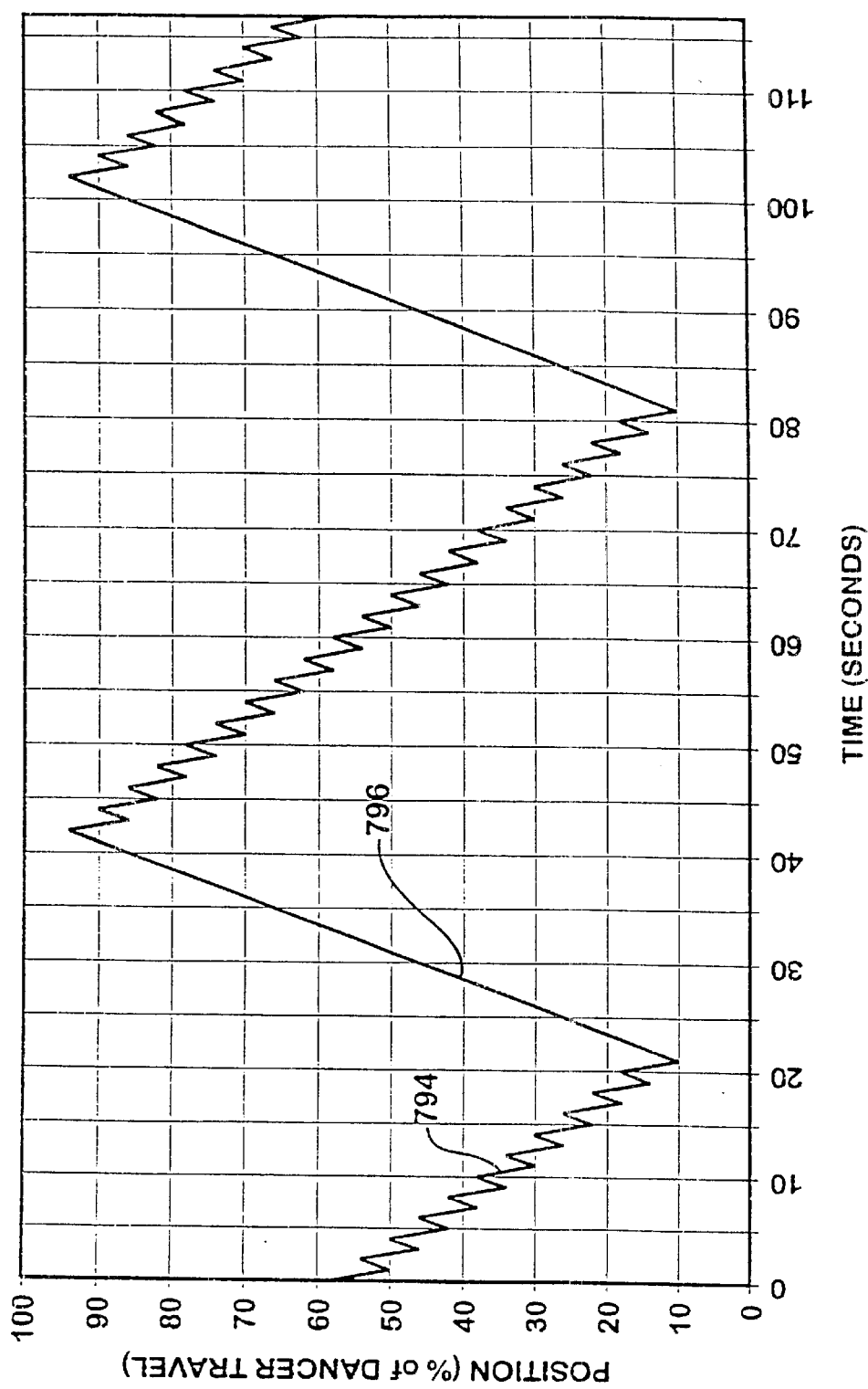
FIG. 67 is a graph illustrating the movement of the dancer as a function of time.

The relative movement of the transfer device 8 is illustrated in FIG. 67 as a function of percentage of transfer device travel and time. During normal operation, the transfer device 8 continuously receives articles of manufacture at its input side at a constant rate as determined by the continuous motion conveyor. The output side of the transfer device 8 move in sync with the continuous feed indexer in an indexed intermittent motion. The indexed intermittent motion includes index movement which is represented by the drop 794 in the sawtooth response and the continuous feed input movement during a dwell or CFI disable is shown by the rise 796. The index travel movement generally occurs at a faster rate of speed than the continuous feed input motion. Accordingly, the transfer device 8 eventually becomes output rich, at which point the CFI is disabled and the transfer device travel is ramped back to the input rich condition, whereupon the CFI is then enabled again.

Accordingly, the control system 600 provides distributed electronic control e.g., "fly by wire control," which is flexible and agile. The distributed control system 600 allows for high speed process manufacturing such as battery manufacturing at rates achievable of at least 900 to 1,800 batteries per minute. While the high speed manufacturing system has been described in connection with a battery application, it should be appreciated that the high speed manufacturing system 2 of the present invention may likewise by applied to various other applications for manufacturing desired articles of manufacture without departing from the spirit of the present invention.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the Doctrine of Equivalents.

The invention claimed is:

1. A transfer device for extracting articles of manufacture from a trunk operating in a first mode of motion and transferring the articles of manufacture for processing to a branch processing station operating at a second mode of motion and for returning the processed articles of manufacture to the trunk, said transfer device comprising:
   a first portion having a first drive source operating at said first mode of motion;
   a second portion having a second drive source operating at said second mode of motion;
   a conveyor assembly around said first portion and said second portion and supported in an operative configuration for transporting articles of manufacture between said first portion and said second portion; and
   an accumulating member separating said first portion from said second portion and responsive to said first mode of motion of said first portion thereof and to said second mode of motion of said second portion thereof.

2. The transfer device according to claim 1, wherein said transfer device is arranged as a cruciform having a longitudinal axis and a lateral axis.

3. The transfer device according to claim 2, wherein said accumulating member reciprocates along said lateral axis.

4. The transfer device according to claim 1, wherein said conveyor assembly includes carriers at regularly spaced intervals therealong for carrying the articles of manufacture.

5. The transfer device according to claim 1, wherein said second mode of motion is an indexed motion comprising translating said conveyor assembly one or more multiples of said regularly spaced intervals and alternating said conveyor assembly translation with a predefined dwell period.

6. The transfer device according to claim 5, wherein an average speed of said second mode of motion is equal to an average speed of said first mode of motion.

7. The transfer device according to claim 6, including a control element for controlling said second mode of motion and said dwell period of said second drive source.

8. The transfer device according to claim 7, further including at least one sensor generating signals responsive to reciprocating element motion and in communication with said control element.

9. The transfer device according to claim 8 further including:
   a first drive pulley driven by said first drive source and in driving engagement with said conveyor assembly; and
   a second drive pulley driven by said second drive source and in driving engagement with said conveyor assembly.

10. The transfer device according to claim 9 further including at least a first coupler adjacent to said first drive pulley and at least a second coupler adjacent to said second drive pulley for transferring of the battery cans to and from transport carriers.

11. The transfer device according to claim 10, wherein each of said couplers further includes a rotatable circular dial having a periphery defining a plurality of regularly spaced pockets therearound for carrying the articles of manufacture such that when said circular dial rotates in unison with motion of said conveyor assembly, each of said pockets comes in lateral registration with a carrier on said conveyor assembly.

12. The transfer device according to claim 11 further including:
   a stationary first dead plate adjacent said first drive pulley and interposed between said first drive pulley and said first coupler circular dial, said first dead plate having a surface spaced a predefined distance from said first drive pulley to retain the articles of manufacture in each of said carriers as said conveyor assembly is driven by said first drive pulley and further wherein said first dead plate dislodges the articles of manufacture from said first coupler dial for capture by one of said carriers on said conveyor assembly.

13. The transfer device according to claim 12 further including:
   a stationary second dead plate adjacent said second coupler and interposed between said second coupler circular dial and said second drive pulley, said second dead plate having a surface spaced a predefined distance from said second circular dial periphery to retain the articles of manufacture in each of said pockets as said second circular dial rotates and further wherein said second dead plate dislodges the articles of manufacture from said transport belt carriers at said second drive pulley for capture by one of said pockets on said second coupler circular dial.

14. The transfer device according to claim 1, wherein the trunk comprises a conveyor system for conveying the articles of manufacture to and from one or more branch processing stations.

15. The transfer device as defined in claim 14, wherein the conveyor system comprises a first continuous motion conveyor comprising a first endless transport belt.

16. The transfer device according to claim 15, wherein the conveyor system further comprises a second continuous motion conveyor comprising a second endless transport belt.

17. The transfer device according to claim 1 further comprising:
   a first coupler positioned between the trunk and the conveyor assembly for transferring articles of manufacture from the trunk to the conveyor assembly; and
   a second coupler positioned between the conveyor assembly and the branch processing station for transferring articles of manufacture from the conveyor assembly to the branch processing station.

18. The transfer device as defined in claim 17 further comprising:
   a third coupler positioned between the conveyor assembly and the branch processing station for transferring processed articles of manufacture from the branch processing station to the conveyor assembly; and
   a fourth coupler positioned between the conveyor assembly and the trunk for transferring processed articles of manufacture from the conveyor assembly to the trunk.

19. A transfer device for extracting articles of manufacture from a first conveyor assembly operating in a first mode of motion and transferring the articles of manufacture for processing to a branch processing station operating at a second mode of motion and for returning the processed articles of manufacture to the first conveyor assembly, said transfer device comprising:

a first portion having a first drive source operating at said first mode of motion;

a second portion having a second drive source operating at said second mode of motion;

a second conveyor assembly around said first portion and said second portion and supported in an operative configuration for transporting articles of manufacture between said first portion and said second portion;

a first coupler assembly positioned between the first conveyor assembly and the second conveyor assembly for transferring articles of manufacture from the first conveyor assembly to the second conveyor assembly and further transferring processed articles of manufacture from the second conveyor assembly to the first conveyor assembly;

a second coupler assembly positioned between the second conveyor assembly and the branch processing station for transferring articles of manufacture from the second conveyor assembly to the branch processing station and for further transferring processed articles of manufacture from the branch processing station to the second conveyor assembly; and an accumulating member separating said first portion from said second portion and responsive to said first mode of motion of said first portion thereof and to said second mode of motion of said second portion thereof.

20. The transfer device as defined in claim 19, wherein the first mode of motion is a substantially continuous motion and the second mode of motion is an indexed intermittent motion.

21. The transfer device as defined in claim 19, wherein the branch processing station further comprises a third conveyor assembly operating at the second mode of motion.

22. The transfer device as defined in claim 19, wherein the first conveyor assembly comprises an endless transport belt.

23. The transfer device as defined in claim 19, wherein the first conveyor assembly comprises a first transport belt and a second transport belt, wherein the first and second transport belts operate at a substantially continuous mode of motion.

24. The transfer device as defined in claim 19, wherein the first coupler assembly and the second coupler assembly each comprise a pair of couplers.

* * * * *